United States Patent
Kang et al.

(10) Patent No.: US 12,372,940 B2
(45) Date of Patent: Jul. 29, 2025

(54) COSMETIC MANUFACTURING DEVICE, AND DISCHARGE INFORMATION DETERMINATION METHOD FOR COSMETIC MANUFACTURING DEVICE

(71) Applicant: LG HOUSEHOLD & HEALTH CARE LTD., Seoul (KR)

(72) Inventors: Yun Jeong Kang, Seoul (KR); Ju Ae Kim, Seoul (KR); Kyung Sik Jang, Seoul (KR); Hyung Kyu Kim, Seoul (KR); Anna Cho, Seoul (KR); Hyun Hye Kim, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 449 days.

(21) Appl. No.: 17/775,771

(22) PCT Filed: Nov. 4, 2020

(86) PCT No.: PCT/KR2020/015349
§ 371 (c)(1),
(2) Date: May 10, 2022

(87) PCT Pub. No.: WO2021/125551
PCT Pub. Date: Jun. 24, 2021

(65) Prior Publication Data
US 2022/0382241 A1 Dec. 1, 2022

(30) Foreign Application Priority Data
Dec. 18, 2019 (KR) ........................ 10-2019-0170260

(51) Int. Cl.
*G05B 19/18* (2006.01)
*A45D 44/00* (2006.01)
(Continued)

(52) U.S. Cl.
CPC .......... *G05B 19/188* (2013.01); *A45D 44/00* (2013.01); *B01F 33/844* (2022.01);
(Continued)

(58) Field of Classification Search
CPC ........ G05B 19/188; G05B 2219/45002; A45D 44/00; A45D 2044/007; A45D 44/005;
(Continued)

(56) References Cited

U.S. PATENT DOCUMENTS 5,992,686 A * 11/1999 Cline .................. B29B 7/94
222/63
8,593,634 B1 * 11/2013 Igarashi ................ B01F 33/844
356/402
(Continued)

FOREIGN PATENT DOCUMENTS

| CN | 101146512 A | 3/2008 |
|---|---|---|
| CN | 101432748 A | 5/2009 |

(Continued)

*Primary Examiner* — Alicia M. Choi
(74) *Attorney, Agent, or Firm* — Birch, Stewart, Kolasch & Birch, LLP

(57) ABSTRACT

The present disclosure relates to a cosmetic manufacturing device and a discharge information determination method for the cosmetic manufacturing device, wherein the device and method provide a method for determining discharge information for providing customized cosmetics. The method can include determining a target color, determining a coverage level, determining a texture, and determining discharge information on the basis of the target color, the coverage level, and the texture, wherein the determining the discharge information may include determining cartridges of interest such that the cartridge discharging a cosmetic material varies according to the coverage level even if the target color is the same.

20 Claims, 48 Drawing Sheets

(51) Int. Cl.
*B01F 33/84* (2022.01)
*B01F 101/21* (2022.01)

(52) U.S. Cl.
CPC ........ *B01F 33/848* (2022.01); *B01F 2101/21* (2022.01); *G05B 2219/45002* (2013.01)

(58) Field of Classification Search
CPC ..... A45D 34/04; B01F 33/844; B01F 33/848; B01F 2101/21; Y02P 90/30; G06Q 30/0621; G06Q 50/04; A61K 8/02; A61K 2800/805; A61K 8/19; A61Q 1/02; A61Q 1/14; A61Q 5/12; A61Q 17/04; A61Q 19/00; A61Q 19/10
See application file for complete search history.

(56) References Cited

U.S. PATENT DOCUMENTS

| | | | |
|---|---|---|---|
| 2005/0173003 A1* | 8/2005 | Laverdiere | G05D 16/2013 137/487.5 |
| 2006/0292193 A1* | 12/2006 | Lee | A61K 8/11 424/401 |
| 2008/0146478 A1* | 6/2008 | Lei | A61Q 13/00 510/130 |
| 2015/0314141 A1* | 11/2015 | Choi | B41J 3/407 347/110 |
| 2016/0236189 A1* | 8/2016 | Izumo | G01F 25/0084 |
| 2017/0208921 A1* | 7/2017 | Thiebaut | B01F 33/841 |
| 2017/0228892 A1* | 8/2017 | Nichol | G06T 7/90 |
| 2017/0290406 A1* | 10/2017 | Shimanov | B67D 7/14 |
| 2018/0027950 A1* | 2/2018 | Choi | G01F 13/00 |
| 2018/0357695 A1* | 12/2018 | Wolff | A45D 44/005 |
| 2018/0368558 A1* | 12/2018 | Park | A45D 44/005 |
| 2019/0065531 A1* | 2/2019 | Shen | G06Q 10/087 |
| 2019/0080480 A1* | 3/2019 | Nichol | B01F 35/754251 |
| 2019/0191844 A1* | 6/2019 | Dreher | A46B 15/0059 |
| 2019/0295728 A1 | 9/2019 | Jeong et al. | |
| 2019/0318505 A1 | 10/2019 | Lasalle et al. | |
| 2020/0405039 A1 | 12/2020 | Jung | |
| 2021/0076807 A1 | 3/2021 | Pack et al. | |
| 2021/0085060 A1 | 3/2021 | Matsui et al. | |
| 2021/0298442 A1* | 9/2021 | Jang | B01F 35/2202 |
| 2023/0354983 A1* | 11/2023 | Matsuda | A61K 8/02 |

FOREIGN PATENT DOCUMENTS

| | | | | |
|---|---|---|---|---|
| CN | 105208998 A | 12/2015 | | |
| CN | 105378781 A | 3/2016 | | |
| CN | 105848724 A | 8/2016 | | |
| CN | 107521779 A | 12/2017 | | |
| CN | 108378525 A | 8/2018 | | |
| CN | 108430451 A | 8/2018 | | |
| CN | 108473336 A | 8/2018 | | |
| CN | 108882787 A | 11/2018 | | |
| CN | 108885134 A | 11/2018 | | |
| CN | 108985873 A | 12/2018 | | |
| CN | 110036403 A | 7/2019 | | |
| JP | 2002-189918 A | 7/2002 | | |
| JP | 2010-503724 A | 2/2010 | | |
| JP | 2010-249731 A | 11/2010 | | |
| JP | 2023-103413 A * | 11/2017 | | A61K 8/00 |
| KR | 10-1778437 B1 | 9/2017 | | |
| KR | 10-2017-0140648 A | 12/2017 | | |
| KR | 10-2018-0110257 A | 10/2018 | | |
| KR | 10-2018-0127697 A | 11/2018 | | |
| KR | 10-1943066 B1 | 1/2019 | | |
| KR | 10-1936751 B1 | 4/2019 | | |
| KR | 10-2019-0050832 A | 5/2019 | | |
| KR | 10-2034194 B1 | 10/2019 | | |
| KR | 10-2019-0138546 A | 12/2019 | | |
| WO | WO 2017/139319 A1 | 8/2017 | | |
| WO | WO 2018/101572 A1 | 6/2018 | | |
| WO | WO 2018/216860 A1 | 11/2018 | | |
| WO | WO 2018/231915 A1 | 12/2018 | | |
| WO | WO 2019/026942 A1 | 2/2019 | | |

\* cited by examiner

FIG. 35

| | | | |
|---|---|---|---|
| NUTRITIONAL MOISTURIZING | [ - ] | 1 | [+] |
| MOISTURE-MOISTURIZING | [ - ] | 2 | [+] |
| STICKY ADHESION | [ - ] | 1 | [+] |
| SILKY | [ - ] | 1 | [+] |
| MATTE | [ - ] | 2 | [+] |
| Total | | 7 | 15g PLEASE SELECT |

FIG. 48

```
S201 — <HAS BARCODE BEEN INPUT?> —NO→ DETERMINE TARGET COLOR — S205
           │YES                              ↓
S203 — DETERMINE DISCHARGE          DETERMINE COVERAGE LEVEL — S207
       INFORMATION ACCORDING TO BARCODE     ↓
                                    DETERMINE TEXTURE — S209
                                            ↓
                                    DETERMINE DISCHARGE INFORMATION
                                    ACCORDING TO TARGET COLOR,       — S211
                                    COVERAGE, AND TEXTURE
```

| MXING RATIO | pink | | | | yellow |
|---|---|---|---|---|---|
| bright | 20:0:0:0:0 | 15:5:0:0:0 | 10:10:0:0:0 | 5:15:0:0:0 | 0:20:0:0:0 |
| | 15:0:5:0:0 | 5:5:10:0:0 | 10:5:5:0:0 | 5:10:5:0:0 | 0:15:5:0:0 |
| | 10:0:10:0:0 | 5:0:15:0:0 | 0:0:20:0:0 | 0:5:15:0:0 | 0:10:10:0:0 |
| | 15:0:0:5:0 | 5:10:0:5:0 | 0:15:0:5:0 | 0:0:20:0:0 | 0:5:15:0:0 |
| | 10:0:5:5:0 | 0:5:10:5:0 | 0:10:5:5:0 | 10:0:5:0:5 | 0:10:5:0:5 |
| | 0:10:0:10:0 | 5:0:10:5:0 | 10:0:0:5:5 | 0:0:15:0:5 | 5:0:10:0:5 |
| | 5:0:5:10:0 | 0:0:15:5:0 | 5:5:0:5:5 | 0:10:0:5:5 | 10:0:0:0:10 |
| | 5:0:0:15:0 | 0:0:10:10:0 | 0:5:5:10:0 | 0:5:5:5:5 | 0:5:0:5:10 |
| dark | 0:0:0:20:0 | 0:0:0:15:5 | 0:5:0:10:5 | 0:0:0:10:10 | 0:0:0:0:20 |

FIG. 51

| BRIGHTNESS/COLOR | 8(8:0) Pinky | 7(7:1) | 6(6:2) | 5(5:3) | 4(4:4) | 3(3:5) | 2(2:6) | 1(1:7) | 0 Yellowish |
|---|---|---|---|---|---|---|---|---|---|
| 8(8:0) Bright | 20-0-0-0-0 | | 15-5-0-0-0 | | 10-10-0-0-0 | | 5-15-0-0-0 | | 0-20-0-0-0 |
| 7(7:1) | 15-0-0-5-0 | 15-0-5-0-0 | 10-0-10-0-0 | 10-5-5-0-0 | 5-5-10-0-0 | 5-10-5-0-0 | 0-10-10-0-0 | 0-15-5-0-0 | 0-15-0-0-5 |
| 6(6:2) | | | 10-5-5-5-0 | | 5-10-0-5-0 | | 0-15-0-5-0 | | |
| | | | 15-0-0-0-5 | | 10-5-0-0-5 | | 5-10-0-0-5 | | |
| 5(5:3) | | 10-0-5-5-0 | | 5-0-15-0-0 | | 0-5-15-0-0 | | 0-10-5-0-5 | |
| | | | | 5-5-5-5-0 | | 0-10-5-5-0 | | | |
| | | | | 10-0-5-0-5 | | 5-5-5-0-5 | | | |
| 4(4:4) | 10-0-0-10-0 | | 5-0-10-5-0 | | 0-0-20-0-0 | | 0-5-10-0-5 | | 0-10-0-0-10 |
| | | | 5-5-0-10-0 | | 0-5-10-5-0 | | 0-10-0-5-5 | | |
| | | | 10-0-0-5-5 | | 0-10-0-0-10 | | 5-5-0-0-10 | | |
| | | | | | 5-0-10-0-5 | | | | |
| | | | | | 5-5-5-5-5 | | | | |
| | | | | | 10-0-0-0-10 | | | | |
| 3(3:5) | | 5-0-5-10-0 | | 0-0-15-5-0 | | | | 0-5-5-0-10 | |
| | | | | 0-5-5-10-0 | | | | | |
| | | | | 5-0-5-5-5 | | | | | |
| 2(2:6) | 5-0-0-15-0 | | 0-0-10-10-0 | | 0-0-10-5-5 | | 0-0-10-0-10 | | 0-5-0-0-15 |
| | | | 0-5-0-15-0 | | 0-5-0-10-5 | | 0-5-5-5-10 | | |
| | | | 5-0-0-10-5 | | 5-0-0-5-10 | | 5-0-0-0-15 | | |
| 1(1:7) | | 0-0-5-15-0 | | 0-0-5-10-5 | | 0-0-5-5-10 | | 0-0-5-0-15 | |
| 0(0:8) dark | 0-0-0-20-0 | | 0-0-0-15-5 | | 0-0-0-10-10 | | 0-0-0-5-15 | | 0-0-0-0-20 |

COSMETIC MANUFACTURING DEVICE, AND DISCHARGE INFORMATION DETERMINATION METHOD FOR COSMETIC MANUFACTURING DEVICE

CROSS REFERENCE TO RELATED APPLICATIONS

This application is the National Phase of PCT/KR2020/015349 filed on Nov. 4, 2020, which claims priority under 35 U.S.C. § 119 (a) to Patent Application No. 10-2019-0170260 filed in the Republic of Korea on Dec. 18, 2019, all of which are hereby expressly incorporated by reference into the present application.

TECHNICAL FIELD

The present invention relates to a cosmetic manufacturing device and a method for determining discharge information of the cosmetic manufacturing device.

BACKGROUND ART

Recently, the kinds of cosmetics have become very diverse according to the development of beauty industry. Specifically, there are cosmetics for dry skin, neutral skin and oily skin, and the like according to a skin type, cosmetics such as beige and pink beige according to a skin color, and various cosmetics for whitening, for improving wrinkles, for blocking ultraviolet rays, and the like according to functions.

However, since each user has different skin features or skin troubles, it is limited to meet the needs of all users by providing of various cosmetics. That is, since ingredients and contents of a cosmetic composition may be required differently depending on a skin condition of each user, it is difficult to provide cosmetics that may meet the needs of all users.

DISCLOSURE

Technical Problem

The present disclosure is directed to providing a method for a cosmetic manufacturing device to determine discharge information for providing customized cosmetics.

Technical Solution

A method of determining discharge information of a cosmetic manufacturing device according to the present disclosure includes determining a target color, determining a coverage level, determining a texture, and determining the discharge information based on the target color, the coverage level, and the texture, wherein the determining of the discharge information, even when the target color is the same, may include determining a target cartridge so that the cartridge for discharging a cosmetic material is different according to the coverage level.

The differently determining of the target cartridge may include determining the target cartridge within cartridges of a first group when the coverage level is a first coverage level, and determining the target cartridge within cartridges of a second group when the coverage level is a second coverage level.

A titanium dioxide content of the cosmetic material representing a first color among the cartridges of the first group may be different from a titanium dioxide content of the cosmetic material representing the first color among the cartridges of the second group.

The method of determining the discharge information of the cosmetic manufacturing device may further include generating a barcode including the discharge information.

The method of determining the discharge information of the cosmetic manufacturing device may further include receiving an input of the barcode, and the determining of the discharge information may include determining the discharge information according to the input barcode.

The method of determining the discharge information of the cosmetic manufacturing device may further include discharging the cosmetic material according to the determined discharge information.

The determining of the discharge information may further include discharging sample cosmetics so that a total discharge amount becomes a sample weight with a mixing ratio according to the determined discharge information, and receiving a correction command or a confirmation command of the discharge information after discharging the sample cosmetics, and the discharge information may be determined according to the correction command or the confirmation command.

The plurality of cartridges may include a plurality of cartridges for determining a color and a plurality of cartridges for determining the texture, and the plurality of cartridges for determining the color may include cartridges of a first group for a first coverage level and cartridges of a second group for a second coverage level, wherein the determining of the target cartridge may include selecting one of the first group and the second group according to the determined coverage level, selecting at least one of the cartridges in the group selected according to the determined target color as a target cartridge for discharging the cosmetic material, and selecting at least one of a plurality of cartridges that determine the texture according to the determined texture as the target cartridge for discharging the cosmetic material.

The determining of the discharge information may further include selecting a mixing ratio corresponding to the target color determined from a predetermined table.

The selecting of the mixing ratio may include, when there are a plurality of mixing ratios corresponding to the determined target color in the predetermined table, selecting any one of a plurality of mixing ratios based on a remaining amount of each selected target cartridge.

A cosmetic manufacturing device according to the present disclosure may include a plurality of cartridges and a controller for determining a target color, a coverage level, and a texture and determining discharge information based on the target color, the coverage level, and the texture, wherein the controller, even when the target color is the same, may determine a target cartridge so that the cartridge for discharging the cosmetic material is different according to the coverage level.

The controller may determine the target cartridge within cartridges of a first group when the coverage level is a first coverage level and determine the target cartridge within cartridges of a second group when the coverage level is a second coverage level.

The controller may generate a barcode including the discharge information.

The cosmetic manufacturing device may further include a barcode reader for receiving the barcode, and the controller may determine the discharge information according to the barcode input through the barcode reader.

The cosmetic manufacturing device may further include a driving unit that drives the cosmetic material to be discharged according to the determined discharge information.

The controller may discharge sample cosmetics so that a total discharge amount is a first weight with a mixing ratio according to the determined discharge information, may receive a correction command or a confirmation command of the discharge information after discharging the sample cosmetics, and may determine the discharge information according to the correction command or the confirmation command The plurality of cartridges may include a plurality of cartridges for determining a color and a plurality of cartridges for determining the texture, wherein the plurality of cartridges for determining the color may include cartridges of a first group for a first coverage level and cartridges of a second group for a second coverage level, and the controller may select any one of the first group and the second group according to the determined coverage level, may select at least one of the cartridges in the selected group according to the determined target color as the target cartridge for discharging the cosmetic material, and may select at least one of a plurality of cartridges that determine the texture according to the texture as a target cartridge for discharging the cosmetic material.

The controller may select a mixing ratio corresponding to a target color determined from a predetermined table.

When there are a plurality of mixing ratios corresponding to the determined target color in the predetermined table, the controller may select any one of a plurality of mixing ratios based on the remaining amount of each selected target cartridge.

Advantageous Effects

According to the present disclosure, there is an advantage that it is possible to manufacture customized cosmetics that satisfy a color, a coverage level, and a texture desired by a user.

According to the present disclosure, there is an advantage that it is possible to manufacture customized cosmetics close to the determined color, coverage level, and texture.

DESCRIPTION OF DRAWINGS

FIG. 35 is a view illustrating a sixth modified example of the texture selection icon according to the embodiment of the present disclosure.

FIG. 48 is a flowchart illustrating a method in which the cosmetic manufacturing device according to the present disclosure determines discharge information.

FIG. 49 is a view for describing an example of a method of determining a target color by the cosmetic manufacturing device according to the present disclosure.

FIG. 50 is a first exemplary view of a table illustrating a mixing ratio according to a target color according to the present disclosure.

FIG. 51 is a second exemplary view of a table illustrating a mixing ratio according to a target color according to the present disclosure.

MODES OF THE PRESENT INVENTION

Figure 1:
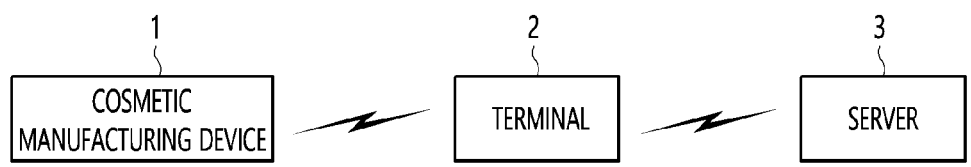
FIG. 1 is a block diagram of a cosmetic manufacturing system according to an embodiment of the present disclosure.

Hereinafter, embodiments will be described in detail with reference to the accompanying drawings, however, the same components are designated by the same reference numerals, and redundant description thereof will be omitted.

Suffixes "module" and "part" for elements used in the following descriptions are given or used just for convenience in writing the specification, and do not have meanings or roles distinguishable between them.

In addition, in describing embodiments of the present disclosure, when detailed description of a known function is deemed to unnecessarily blur the gist of the present disclosure, the detailed description will be omitted. Further, accompanying drawings are only for easily understanding embodiments disclosed in the present disclosure, and the technical spirit disclosed in the present disclosure are not limited by the accompanying drawings, and it should be understood that the present invention includes all modifications, equivalents, and alternatives falling within the spirit and scope of the claims.

It should be understood that, although the terms first, second, and the like may be used herein to describe various elements, these elements are not limited by these terms. The terms are only used to distinguish one element from another.

Elements referred to in singular may be number one or more, unless the context clearly indicates otherwise.

It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

FIG. 1 is a block diagram of a cosmetic manufacturing system according to an embodiment of the present disclosure.

The cosmetic manufacturing system may include at least some or all of a cosmetic manufacturing device 1, a terminal 2, and a server 3.

According to the embodiment, the cosmetic manufacturing system may further include a container 51 (see FIG. 4) for receiving a cosmetic composition discharged from at least one of a plurality of cartridges 11 provided in the cosmetic manufacturing device 1. At this time, the container 51 may be said to be an exclusive product used only for the use of the cosmetic manufacturing device 1 of the present disclosure.

The cosmetic manufacturing device 1 may manufacture customized cosmetics suitable for individual users.

The cosmetic manufacturing device 1 may include the plurality of cartridges 11 accommodating the cosmetic composition (see FIG. 2) and manufacture cosmetics by discharging the cosmetic composition from at least one of the plurality of cartridges 11.

The cosmetic manufacturing device 1 may manufacture different cosmetics by respectively adjusting a type of the cosmetic composition and a discharge amount of the cosmetic composition.

The cosmetic manufacturing device 1 may receive a cosmetic manufacturing method from the terminal 2 or the server 3. The cosmetic manufacturing method may include information on the type and amount of the cosmetic composition to be discharged from the plurality of cartridges 11.

For example, the cosmetic manufacturing method may be a code generated by a preset rule. The code may consist of numbers or letters, and the number or letter of the code may refer to the type of cosmetic composition and the discharge amount of the cosmetic composition to be discharged from the plurality of cartridges 11.

The terminal 2 may transmit the cosmetic manufacturing method to the cosmetic manufacturing device 1.

The terminal 2 may acquire the cosmetic manufacturing method in order to manufacture cosmetics suitable for individual users and transmit the cosmetic manufacturing method to the cosmetic manufacturing device 1.

According to an embodiment, the terminal 2 may calculate the cosmetic manufacturing method based on data stored therein. In this case, the server 3 may be omitted from the cosmetic manufacturing system.

According to another embodiment, the terminal 2 may calculate the cosmetic manufacturing method through communication with the server 3. In this case, the terminal 2 may transmit at least one of skin information, color information, and texture information to the server 3, and the server 3 may calculate the cosmetic manufacturing method based on a server database (not shown) and transmit the calculated cosmetic manufacturing method to the terminal 2.

The server 3 may store cosmetic manufacturing information for each user.

Next, a structure of a cosmetic manufacturing device according to an embodiment of the present disclosure will be described with reference to FIGS. 2 to 12.

Figure 2:
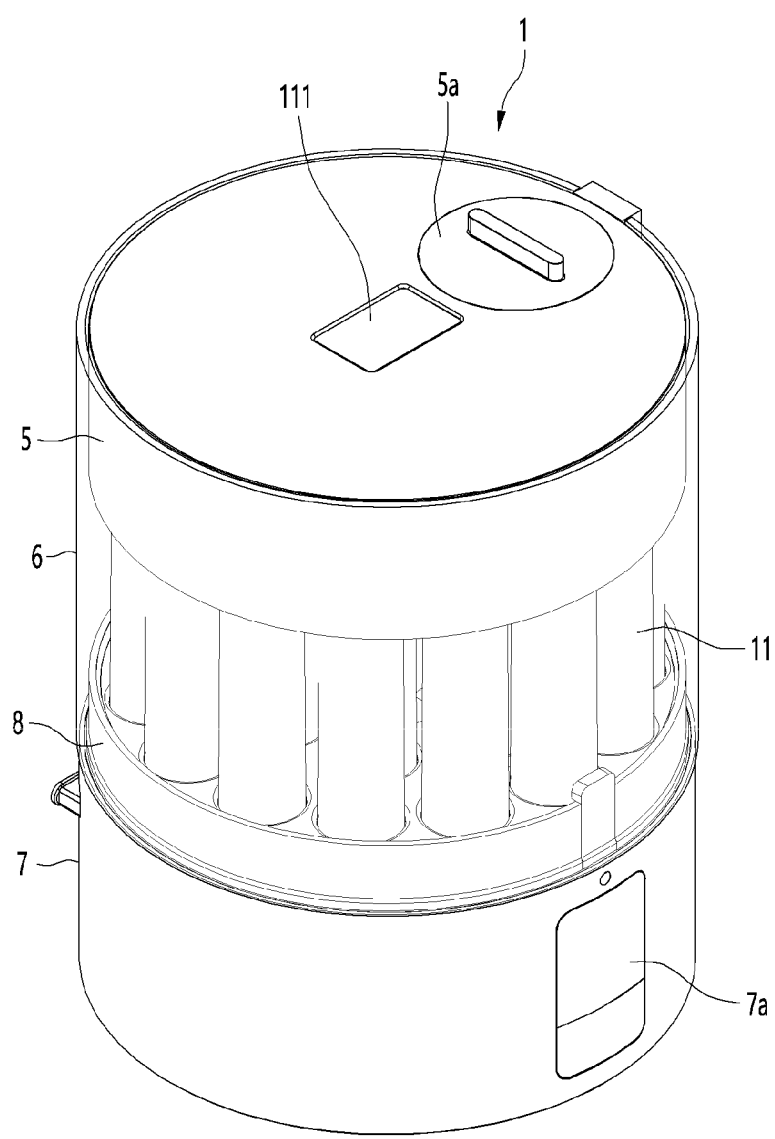
FIG. 2 is a perspective view of the cosmetic manufacturing device according to the embodiment of the present disclosure.
Figure 3:
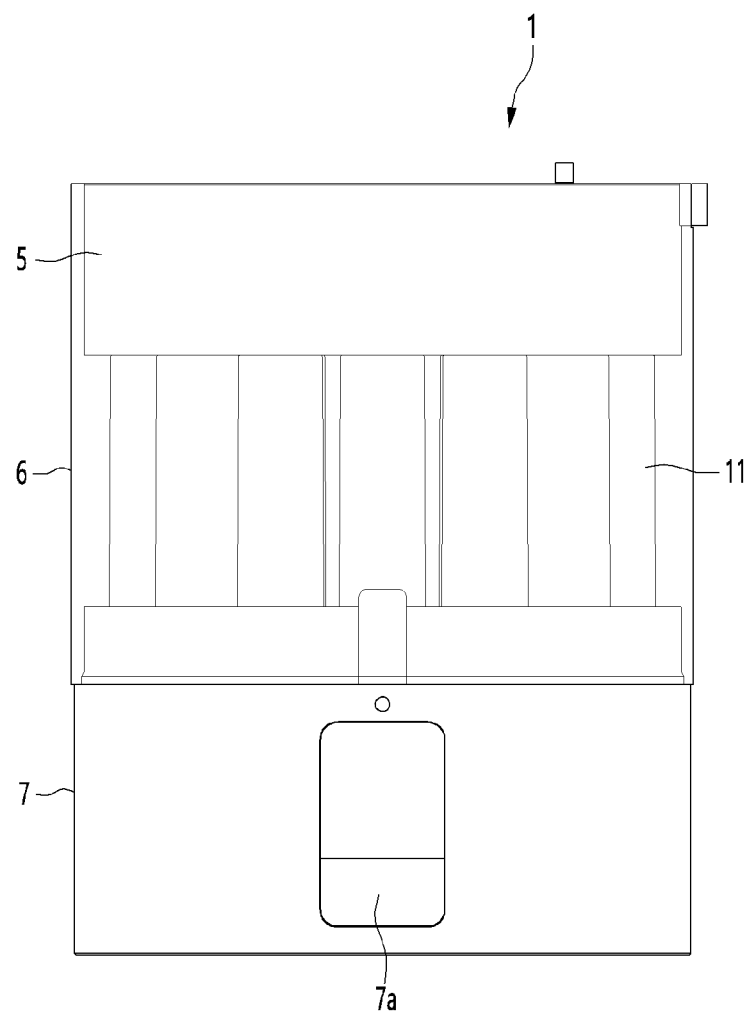
FIG. 3 is a front view of the cosmetic manufacturing device according to the embodiment of the present disclosure.
Figure 4:
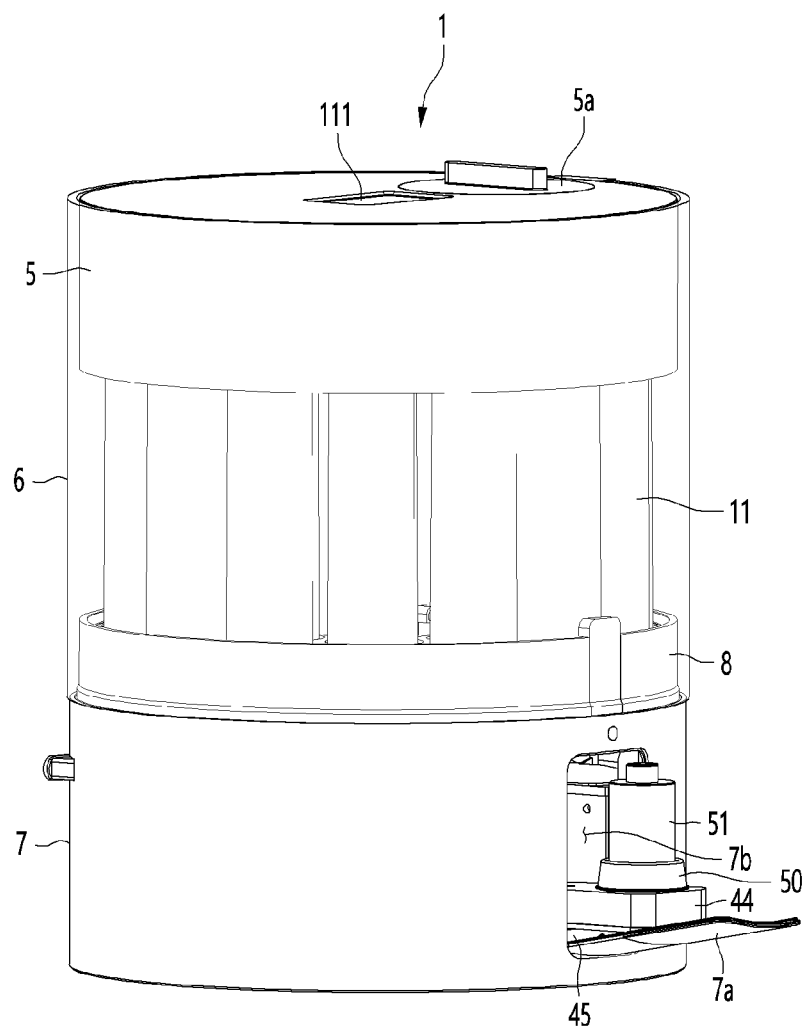
FIG. 4 is a view illustrating the cosmetic manufacturing device and a container transport module according to the embodiment of the present disclosure.

FIG. 2 is a perspective view of the cosmetic manufacturing device according to the embodiment of the present disclosure, FIG. 3 is a front view of the cosmetic manufacturing device according to the embodiment of the present disclosure, and FIG. 4 is a view illustrating the cosmetic manufacturing device and a container transport module according to the embodiment of the present disclosure.

The cosmetic manufacturing device 1 may include cases 5, 6, and 7.

The cases 5, 6, and 7 may form the appearance of the cosmetic manufacturing device 1. The cases 5, 6 and 7 may protect components provided inside the cosmetic manufacturing device 1. For example, a plurality of cartridges 11, a cartridge rotation motor 48, and a discharge module 120, which will be described later, may be disposed inside the cases 5, 6, and 7.

The cases 5, 6, and 7 may be divided into an upper case 5, a middle case 6, and a lower case 7, but the present disclosure is not limited thereto. That is, according to the embodiment, unlike those shown in FIGS. 2 to 4, the cases 5, 6 and 7 may be formed in one piece or two pieces, or may be formed three or more pieces. In the present specification, it is assumed that the cases 5, 6, and 7 are divided into an upper case 5, a middle case 6, and a lower case 7.

The upper case 5 may form an upper surface of the cosmetic manufacturing device 1. An opening and closing part 5a may be formed on an upper surface of the upper case 5.

The opening and closing part 5a may be opened or closed for replacement of the cartridge 11. The opening and closing part 5a may be in a form of a detachable cap or a slide door. That is, the form of the opening/closing portion 5a is not limited.

A user may replace the cartridge 11 by opening the opening and closing part 5a.

A display 111 may be formed in the upper case 5. However, this is merely an example, and the display 111 may be formed in the middle case 6 or the lower case 7.

Information related to an operation of the cosmetic manufacturing device 1 on the display 111 may be displayed.

The display 111 may be formed of a touch screen, and in this case, the touch screen may receive a user input.

A lower surface of the upper case 5 may be opened, and the discharge module 120 may be disposed inside the upper case 5. The upper case 5 may protect the discharge module 120. In addition, the upper case 5 may block exposure of the discharge module 120 to the outside, and in this case, a simple appearance may be formed.

The middle case 6 may be disposed on the lower case 7.

The middle case 6 may be formed of a transparent material or a translucent material. In this case, the user may see a state that the cartridge 11 is rotated through the middle case 6.

When the middle case 6 is made of a transparent material or a translucent material, it may further include an inner case 8 that covers a mounter 21, a discharge guide 12, and the like, which will be described later.

The lower case 7 may form a lower portion of the cosmetic manufacturing device 1.

A case cover 7a may be formed in the lower case 7. The case cover 7a may be opened and closed when the container 51 is inserted or removed. The container 51 may pass through a container gate 7b, and the case cover 7a may control the container gate 7b in an open or closed state. The case cover 7a may be opened and closed when providing the manufactured cosmetics to the user.

The case cover 7a may be opened or closed according to a position of a slider 44. According to an embodiment, a spring (not shown) is connected to a lower end of the case cover 7a, and thus the case cover 7a may be inclined in a direction in which the case cover 7a is opened by being pushed by the slider 44 when the slider 44 moves toward the outside of the case 5, 6, and 7 and may be inclined in a direction in which the case cover 7a is closed by an elastic force of the spring (not shown). It will be described in more detail in FIGS. 12 to 14.

Figure 5:
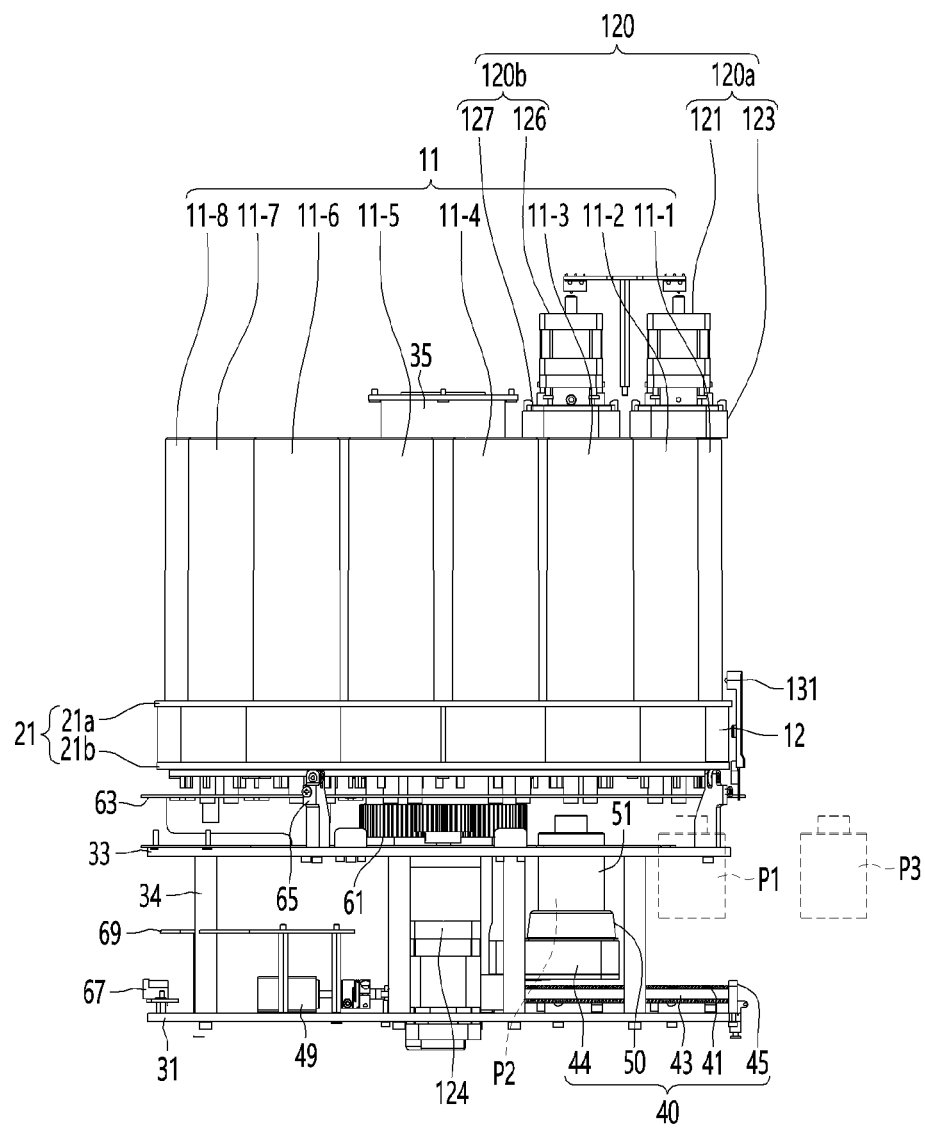
FIG. 5 is a side view illustrating an internal structure of the cosmetic manufacturing device according to the embodiment of the present disclosure.
Figure 6:
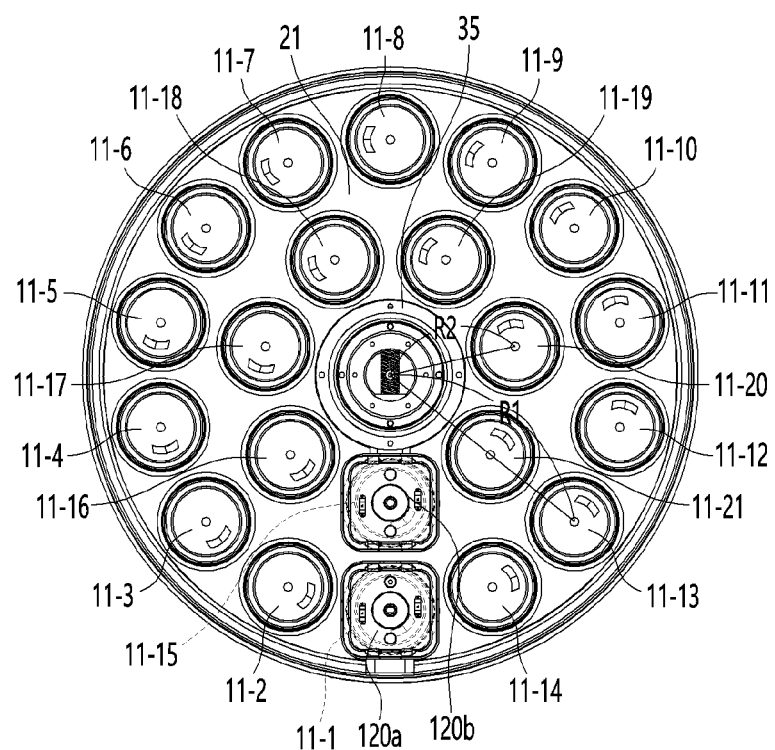
FIG. 6 is a plan view illustrating the internal structure of the cosmetic manufacturing device according to the embodiment of the present disclosure.

FIG. 5 is a side view illustrating an internal structure of the cosmetic manufacturing device according to the embodiment of the present disclosure, and FIG. 6 is a plan view illustrating the internal structure of the cosmetic manufacturing device according to the embodiment of the present disclosure.

The cosmetic manufacturing device 1 may include the plurality of cartridges 11, the cartridge rotation motor 48 for rotating the plurality of cartridges 11, the discharge module 120 for discharging the cosmetic composition accommodated in at least one of the plurality of cartridges 11, a container transfer module 40 for moving the container 51 accommodating the cosmetic composition discharged from the plurality of cartridges 11.

The plurality of cartridges 11 may each accommodate the cosmetic composition.

The cosmetic composition may be a raw material, a semi-finished product, or a finished product used in the manufacture of cosmetics. The cosmetics may be various compositions used for the user's skin and hair, such as skin, lotion, cream, cleansing cream, cleansing water, cleansing foam, sunscreen, foundation, body lotion, body scrub, body wash, shampoo, conditioner, hair conditioner, etc.

The plurality of cartridges 11 may be mounted on the mounter 21.

The cosmetic manufacturing device 1 may further include the mounter 21, and at least one mounting hole (not shown) through which each of the plurality of cartridges 11 passes may be formed in the mounter 21. The number of mounting holes (not shown) may be the same as the number of cartridges 11.

The cosmetic manufacturing device 1 may further include a rotation part 35 connected to the mounter 21 and a lower base 31 and an upper base 33 that support the rotation part 35.

The lower base 31 may support the internal structure of the cosmetic manufacturing device 1. At least some or all of a power module 67, a PCB module 69, the container transfer module 40, the container transfer motor 49, and the cartridge rotation motor 48 may be seated on the lower base 31.

The container transfer module 40 may move the slider 44 so that the container 51 is positioned at a first discharge position P1, a second discharge position P2, or a user position P3.

The first discharge position P1, the second discharge position P2, and the user position P3 may be formed on a straight line. In this case, there is an advantage that a movement distance and movement of the container 51 are minimized.

In addition, at least one base supporter 34 may seated on the lower base 31, and the base supporter 34 may support the upper base 33.

At least one mounter supporter 65 for supporting the mounter 21 may be seated on the upper base 33.

In addition, a gear 61 for rotating the mounter 21 may be seated on the upper base 33.

The gear 61 may rotate by receiving power from the cartridge rotation motor 48, and the rotation part 35 and the mounter 21 connected to the rotation part 35 may rotate together by the rotation of the gear 61.

The cartridge rotation motor 48 may rotate the plurality of cartridges 11 by rotating the mounter 21.

The plurality of cartridges 11 may be mounted on the mounter 21. Referring to FIG. 6, it is illustrated that 21 cartridges 11 mounted on the mounter 21, but the number of cartridges is merely an example, and thus it is appropriate that the present disclosure is not limited thereto. In the present specification, it is assumed that 21 cartridges 11 are mounted on the mounter 21 for convenience of description.

Next, a method in which the plurality of cartridges 11 are mounted on the mounter 21 according to various embodiments of the present disclosure will be described.

According to a first embodiment, as shown in FIG. 6, the plurality of cartridges 11 may be disposed along a first circle having a first radius R1 and a second circle having a second radius R2. The first circle and the second circle may be virtual circles exemplified for convenience of description.

An outer circumference of the mounter 21 may have a circular shape.

Referring to an example of FIG. 6, first to fourteenth cartridges 11-1 to 11-14 may be disposed along the first circle, and fifteenth to twenty-first cartridges 11-15 to 11-21 may be disposed along the second circle.

A cartridge arrangement method according to the first embodiment may be a secondary rotary method.

According to the first embodiment, there is an advantage that it is possible to maximize the number of cartridges 11 disposed within a certain area. That is, when the cartridge 11 is disposed as in the first embodiment when a volume of the cosmetic manufacturing device 1 is constant, there is an advantage that it is possible to maximize the number of cartridges 11 disposed in the cosmetic manufacturing device 1. Therefore, there is an advantage that it is possible to minimize the volume of the cosmetic manufacturing device 1.

In this case, the discharge module 120 may include a first discharge module 120*a* for discharging the cosmetic composition accommodated in any one of the cartridges disposed along the first circle and a second discharge module 120*b* for discharging the cosmetic composition accommodated in any one of the cartridges disposed along the second circle.

For example, when the cosmetic manufacturing device 1 discharges the cosmetic composition accommodated in any one of the first to fourteenth cartridges 11-1 to 11-14, it is possible to rotate the mounter 21 so that the cartridge including the cosmetic composition to be discharged is disposed in parallel with the first discharge position P1 in a vertical direction, and the first discharge module 120*a* may press the cartridge disposed in parallel with the first discharge position P1 in the vertical direction.

Similarly, when the cosmetic manufacturing device 1 discharges the cosmetic composition accommodated in any one of the fifteenth to twenty-first cartridges 11-15 to 11-21, it is possible to rotate the mounter 21 so that the cartridge including the cosmetic composition to be discharged is disposed in parallel with the second discharge position P2 in the vertical direction, and the second discharge module 120*b* may press the cartridge disposed in parallel with the second discharge position P2 in the vertical direction.

That is, the first discharge module 120*a* may be disposed in parallel with the first discharge position P1 in the vertical direction, and the second discharge module 120*b* may be disposed in parallel with the second discharge position P2 in the vertical direction.

Meanwhile, unlike the described-above, the cosmetic manufacturing device 1 may include only one discharge module, and one discharge module may also move a position for pressing the cartridge disposed along the first circle and a position for pressing the cartridge disposed along the second circle.

According to a second embodiment, the plurality of cartridges 11 may be mounted on a mounter having an outer circumference with a quadrangular shape.

Figure 7:
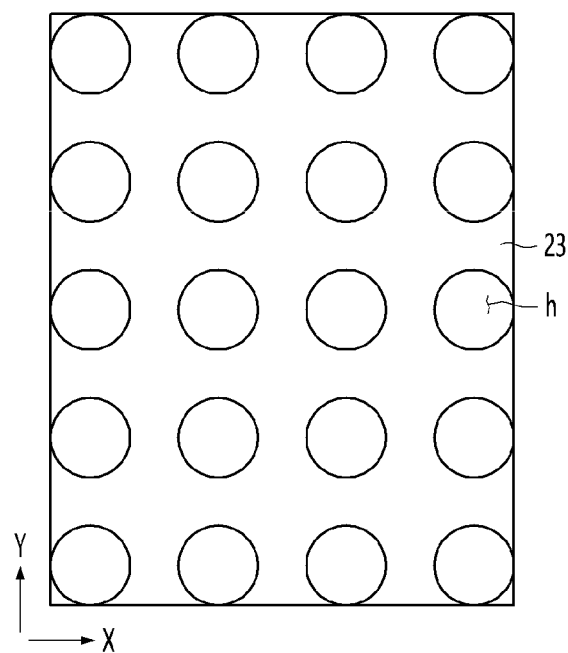
FIG. 7 is a view for describing another example of a method of mounting a cartridge on a mounter.

FIG. 7 is a view for describing another example of a method of mounting a cartridge on a mounter.

FIG. 7 may be a view illustrating an upper surface of a mounter 23 for mounting the plurality of cartridges 11 in a stage method. The cartridge arrangement method according to the second embodiment may be the stage method.

According to the second embodiment, a plurality of mounting holes h through which the cartridge 11 may be mounted are formed in the mounter 23, and the mounting holes h may be formed along an X-axis and a Y-axis. That is, the plurality of cartridges 11 may be mounted along the X-axis and the Y-axis.

According to an example of FIG. 7, the plurality of cartridges 11 may be mounted in the mounter with a total of twenty cartridges 11 along five rows and four columns.

In this case, the container transfer module 40 and the discharge module 120 may move to a position parallel in the vertical direction with the cartridge accommodating the cosmetic composition to be discharged, respectively.

According to the second embodiment, there is an advantage that it is possible to maximize the number of cartridges 11 disposed within a certain area. In addition, according to the second embodiment, there is an advantage that the cartridge rotation motor for rotating the mounter 23 is unnecessary, and accordingly, it is possible to reduce the manufacturing cost.

Next, a discharge module according to an embodiment of the present disclosure will be described with reference to FIGS. 8 to 9.

Figure 8:
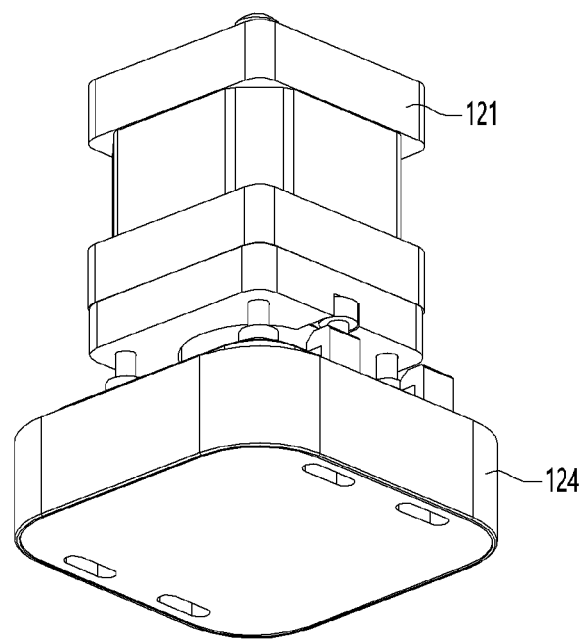
FIG. 8 is a perspective view of a discharge module according to an embodiment of the present disclosure.
Figure 9:
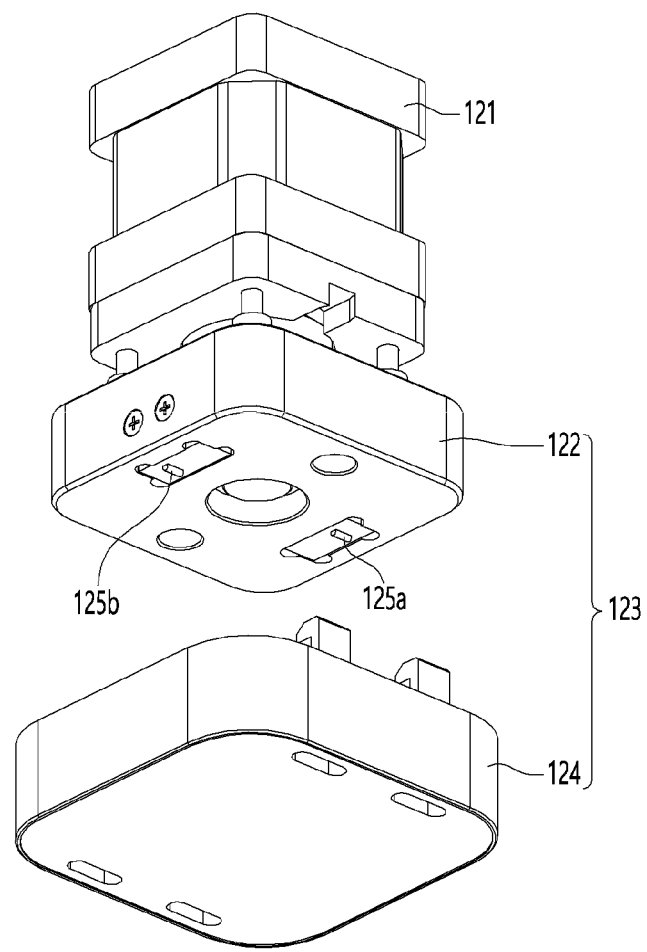
FIG. 9 is a view illustrating a state in which a contact body is separated from the discharge module shown in FIG. 8.

FIG. 8 is a perspective view of the discharge module according to the embodiment of the present disclosure, and FIG. 9 is a view illustrating a state in which a contact body is separated from the discharge module shown in FIG. 8.

The discharge module 120 may include an elevating motor 121 and an elevating member 123 that is raised or lowered by the elevating motor 121.

The elevating motor 121 may elevate the elevating member 123. The elevating motor 121 may be a linear motor.

The elevating member 123 may be in contact with an upper end of any one of the plurality of cartridges 11. The elevating member 123 may vertically press any one of the plurality of cartridges 11 while the elevating member 123 is lowered, and the cosmetic composition may be discharged from the cartridge 11 that is pressed by the elevating member 123.

The discharge module 120 may further include cartridge detection sensors 125a and 125b for detecting whether the elevating member 123 and the cartridge 11 are in contact with each other.

The elevating member 123 may include a main body 122 and a contact body 124 covering the main body 122, and the cartridge detection sensors 125a and 125b may be mounted on the main body 122.

The cartridge detection sensors 125a and 125b may be mounted on a lower surface of the main body 122.

The cartridge detection sensors 125a and 125b may be limit switches.

The contact body 124 may cover the lower surface and a side surface of the main body 122. The contact body 124 may cover the limit switch, and in this case, the limit switch may be protected.

When the elevating member 123 does not press the cartridge 11, a gap may be formed between the lower surface of the main body 122 and an upper surface of the contact body 124. Therefore, in a state in which the elevating member 123 does press the cartridge 11, the cartridge detection sensors 125a and 125b may determine as a state in which the elevating member 123 and the cartridge 11 are not in contact with each other.

Meanwhile, when the elevating member 123 is lowered, the contact body 124 is first in contact with an upper end of the cartridge 11, the contact body 124 is lifted by contact with the cartridge 11 and presses the cartridge detection sensors 125a and 125b, and accordingly, the cartridge detection sensors 125a and 125b may determine whether the elevating member 123 and the cartridge 11 are in contact with each other.

Therefore, the discharge module 120 first detects whether the contact body 124 and the cartridge 11 are in contact with each other by first contacting the contact body 124 with the cartridge 11, and then when the contact body 124 and the cartridge 11 are detected in contact with each other, the elevating member 123 may be controlled to press the cartridge 11.

Meanwhile, although the description has been made by assuming that the discharge module 120 is the first discharge module 120a in FIGS. 8 and 9, the second discharge module 120b may be the same as the first discharge module 120a.

That is, like the first discharge module 120a, the second discharge module 120b may include an elevating motor 126 and an elevating member 127.

Specifically, the first discharge module 120a may have a first elevating member 123 in contact with an upper end of any one of the plurality of cartridges 11 disposed along the first circle, cartridge detection sensors 125a and 125b for detecting whether the first elevating member 123 is in contact with the cartridge, and a first elevating motor 121 for raising and lowering the first elevating member 123, and the second discharge module 120b may have a second elevating member 127 in contact with the upper end of any one of the plurality of cartridges 11 disposed along the second circle, a second cartridge detection sensor (not shown) for detecting whether the second elevating member 127 is in contact with the cartridge, and a second elevating motor 126 for raising and lowering the second elevating member 127.

Since the detailed structure and internal structure of the second elevating member 127 are the same as those of the first elevating member 123 described with reference to FIGS. 8 and 9, redundant descriptions will be omitted.

Next, with reference to FIG. 10, the cartridge 11 for discharging the cosmetic composition by the discharge module 120 will be described.

Figure 10:
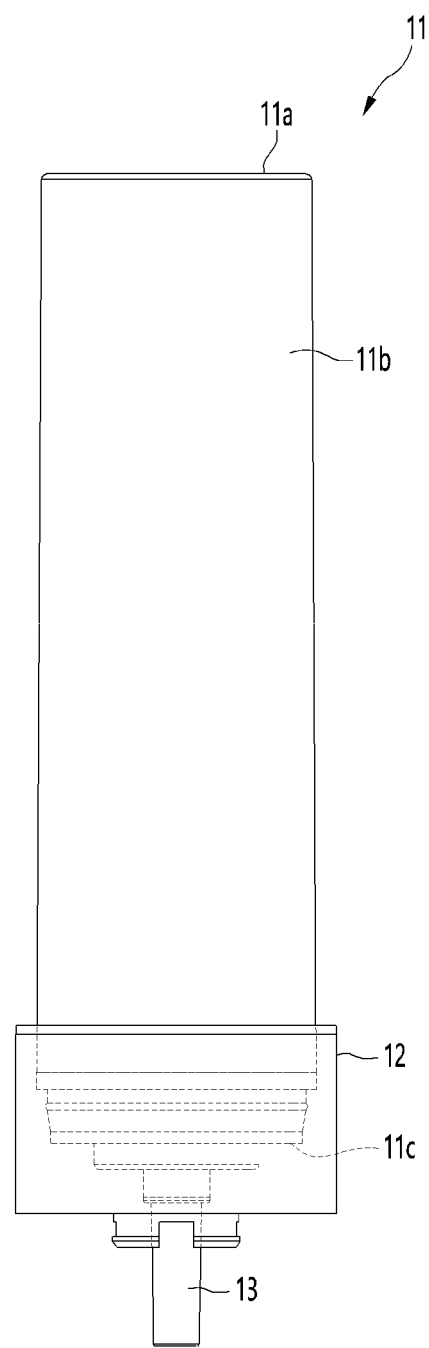
FIG. 10 is a view illustrating a cartridge according to an embodiment of the present disclosure.

FIG. 10 is a view illustrating a cartridge according to an embodiment of the present disclosure.

Each of the plurality of cartridges 11 may be an airless pump container.

The plurality of cartridges 11 may include a receiving part 11b in which the cosmetic composition is accommodated, an operating part 11c for discharging the cosmetic composition inside the receiving part 11b from the receiving part 11b, a nozzle part 13 through which the cosmetic composition discharged by the operating part 11c passes, respectively.

In addition, the cartridge 11 may further include the discharge guide 12. A through-hole (not shown) through which the nozzle part 13 passes may be formed in a lower plate of the discharge guide 12.

In addition, the discharge guide 12 may be disposed around the operating part 11c. A lower end of the operating part 11c may be accommodated in the discharge guide 12.

The operating part 11c may include a spring (not shown).

The discharge guide 12 may be fixed by the mounter 21.

Therefore, when the elevating member 123 presses an upper surface 11a of the cartridge 11, the receiving part 11b and the operating part 11c may be lowered, and at this time, the operating part 11c is caught on the lower plate of the discharge guide 12 and the spring (not shown) is compressed, so that a piston (not shown) inside the receiving part 11b may be pushed upward. When the elevating member 123 is spaced apart from the upper surface 11a of the cartridge 11, the piston (not shown) moves down while the spring (not shown) is released, and at this time, the air pressure generated when the piston (not shown) pushes the cosmetic composition, so that the cosmetic composition may be discharged to the outside of the receiving part 11b through the nozzle part 13.

Therefore, each of the plurality of cartridges 11 may include the discharge guide 12.

The discharge guide 12 may be disposed between an upper plate 21a and a lower plate 21b of the mounter 21.

Meanwhile, when the elevating member 123 applies pressure to the cartridge 11, since the pressure of the elevating member 123 is also applied to the mounter 21, a problem that the mounter 21 becomes loose in the vertical direction may occur.

To this end, the cosmetic manufacturing device 1 may further include the mounter supporter 65 for supporting the mounter 21.

Figure 11:
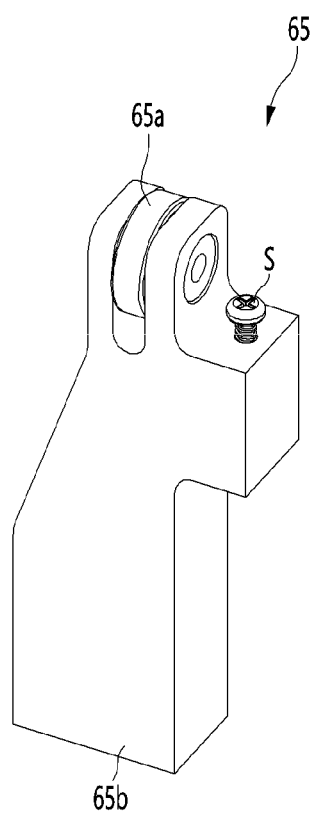
FIG. 11 is a view illustrating a mounter supporter according to an embodiment of the present disclosure.

FIG. 11 is a view illustrating the mounter supporter according to an embodiment of the present disclosure.

The cosmetic manufacturing device 1 may include at least one mounter supporter 65. The mounter supporter 65 may be fixed to the upper base 33 by a screw (S).

The mounter supporter 65 may be supported by the upper base 33. That is, a lower end 65b of the mounter supporter 65 may be in contact with an upper surface of the upper base 33 to be supported.

A bearing 65a in contact with the mounter 21 may be formed in the mounter supporter 65. The bearing 65a may support a lower plate 21b of the mounter 21, and when the mounter 21 rotates, the bearing 65a may minimize friction between the mounter 21 and the mounter supporter 65.

The cosmetic manufacturing device 1 may include an even number of mounter supporters 65, and each of the even number of mounter supporters 65 may be uniformly disposed to have a predetermined distance from adjacent mounter supporters 65. In this case, the mounter supporter 65 may minimize a case in which the mounter 21 is biased to either one.

Alternatively, the cosmetic manufacturing device 1 may include a plurality of mounter supporters 65, and at least some of the plurality of mounter supporters 65 are disposed close to the first discharge position P1 and the second discharge position P2. In this case, it is possible to minimize a gap in a portion of the mounter 21 to which the pressure is more strongly applied by the elevating member 123.

Meanwhile, the cosmetic manufacturing device 1 may control the container transport module 40 so as to move the container 51 to receive the cosmetic composition from the cartridge disposed along the first circle or the cartridge disposed along the second circle.

Next, the container transport module 40 of the cosmetic manufacturing device 1 will be described with reference to FIGS. 12 to 14.

Figure 12:
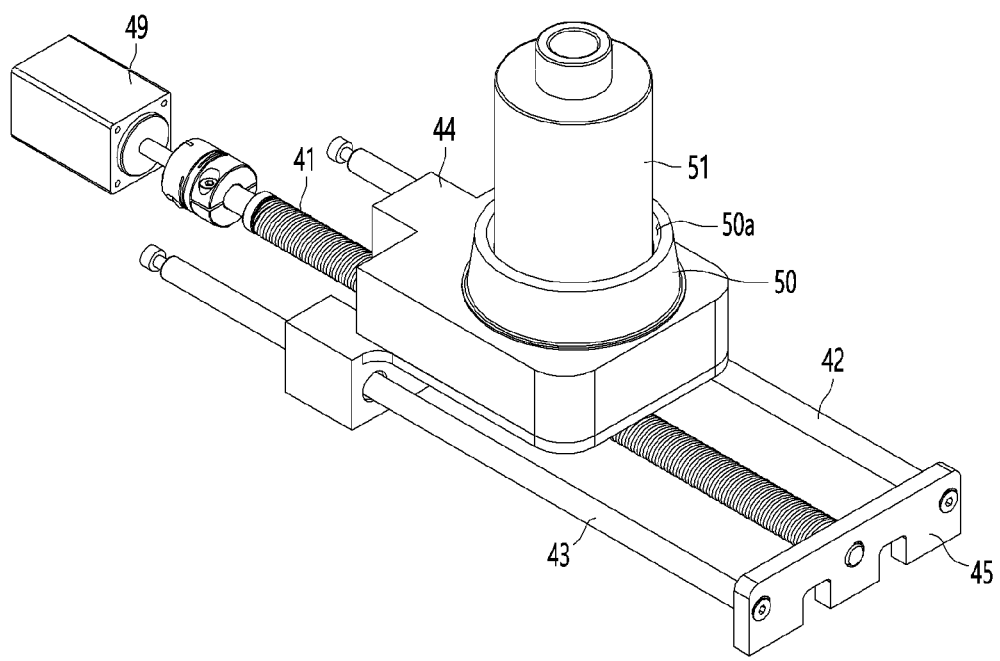
FIG. 12 is a perspective view of a container transport module according to an embodiment of the present disclosure.
Figure 13:
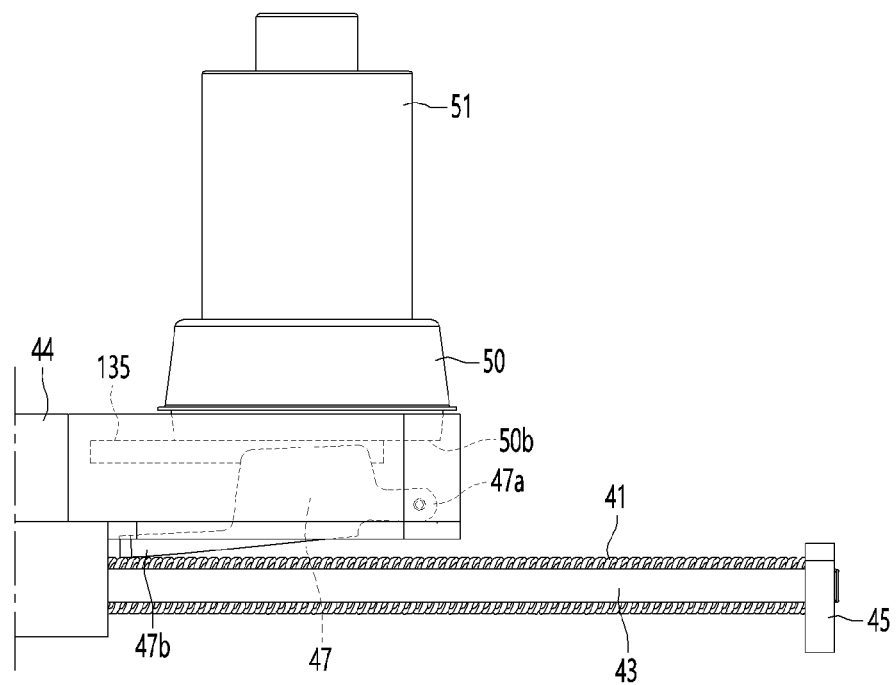
FIG. 13 is a view illustrating a state win which a load cell protection part is in a first state according to the embodiment of the present disclosure.
Figure 14:
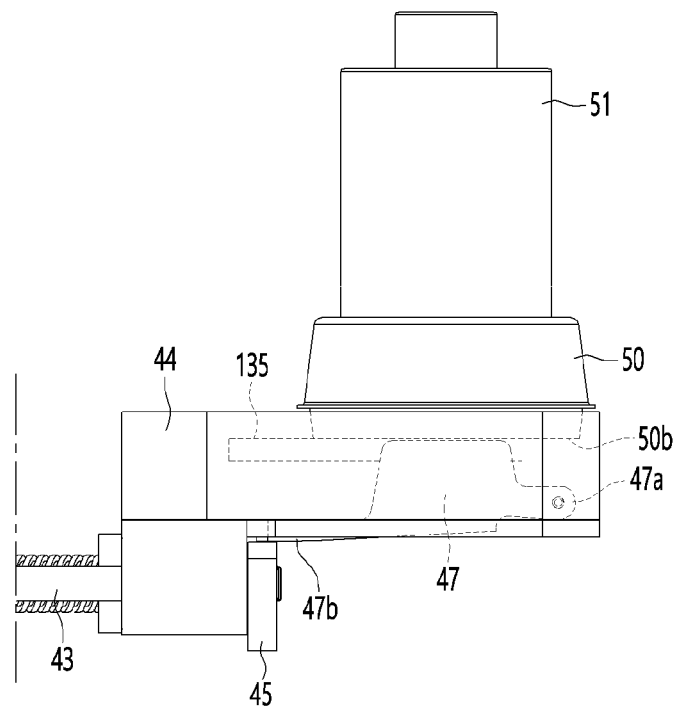
FIG. 14 is a view illustrating a state in which the load cell protection part is in a second state according to the embodiment of the present disclosure.

FIG. 12 is a perspective view of the container transfer module according to an embodiment of the present disclosure, FIG. 13 is view illustrating a state win which a load cell protection part is in a first state according to the embodiment of the present disclosure, and FIG. 14 is view illustrating a state in which the load cell protection part is in a second state according to the embodiment of the present disclosure.

The container transfer module 40 may include the slider 44 on which the container 51 is seated, a shaft 41 for moving the slider 44 forward and backward, and the container transfer motor 49 for moving the slider 44 along the shaft 41. May include.

The container 51 may be seated on the slider 44.

According to an embodiment, a container holder 50 on which the container 51 is seated may be formed on the slider 44. The container holder 50 may be formed detachably from the slider 44.

A container space 50a in which the container 51 is accommodated may be formed in a container holder 50.

A size of a horizontal cross-sectional area of the container space 50a may be greater than a size of a horizontal cross-sectional area of the container 51. Therefore, the container 51 may be more easily accommodated in the container space 50a.

In addition, when the cosmetic composition discharged from the cartridge 11 is not accommodated inside the container 51 and flows down the container 51, the cosmetic composition that flows down the container 51 may be stored in the container holder 50. In this case, it is possible to minimize a case in which the cosmetic composition discharged from the cartridge 11 falls on other components except for the container 51 and the container holder 50 and causes contamination, and there is an advantage that the cosmetic manufacturing device 1 may be maintained in a clean state by only separating and washing of the container holder 50.

The slider 44 may move along the shaft 41. The slider 44 may move along the shaft 41 to any one of the first discharge position P1 (see FIG. 5), the second discharge position P2 (see FIG. 5), and the user position P3 (see FIG. 5).

The first discharge position P1 may be a position for accommodating the cosmetic composition discharged from any one of the cartridges disposed along the first circle having the first radius R1. The first discharge position P1 may refer to not only a position of the container 51 for receiving the cosmetic composition from any one of the cartridges 11 disposed along the first circle, but also a position in parallel with the container 51 in the vertical direction.

The second discharge position P2 may be a position for accommodating the cosmetic composition discharged from any one of the cartridges disposed along the second circle having the second radius R2. The second discharge position P2 may refer to not only a position of the container 51 for receiving the cosmetic composition from any one of the cartridges 11 disposed along the second circle, but also the position in parallel with the container 51 in the vertical direction.

The user position P3 may be a position at which the container 51 is inserted or removed from the container transport module 40, in particular, the slider 44. The user position P3 may refer not only the position of the container 51 inserted or removed by the user, but also the position in parallel with the container 51 in the vertical direction.

The first discharge position P1 and the second discharge position P2 may be formed inside the cases 5, 6 and 7, and the user position P3 may be formed outside the cases 5, 6 and 7. Since the first discharge position P1 and the second discharge position P2 are formed inside the cases 5, 6 and 7, it is possible to minimize a problem that contaminants are included in manufacturing cosmetics, and since the user position P3 is formed outside the cases 5, 6 and 7, it is possible to provide a user convenience that allows the user to more easily insert/remove the container 51, and there is an advantage that the user conveniently receives the manufactured cosmetics.

When the slider 44 is at the first discharge position P1 or the second discharge position P2, the case cover 7a (see FIG. 4) may be in a closed state.

Meanwhile, when the slider 44 moves from the first discharge position P1 or the second discharge position P2 to the user position P3, the slider 44 may push the case cover 7a, and when the slider 44 is positioned at the user position P3, the case cover 7a may be opened.

That is, the case cover 7a may be closed when the slider 44 is at the first discharge position P1 or the second discharge position P2 and may be opened when the slider 44 is at the user position P3.

Meanwhile, the container transfer module 40 may further include a pair of slider guides 42 and 43 for guiding the movement of the slider 44. The pair of slider guides 42 and 43 may be disposed with the shaft 41 interposed therebetween.

The slider guides 42 and 43 may guide the slider 44 to move along the shaft 41 without losing balance. In this case, it is possible to minimize a case in which the cosmetic composition is discharged from the container 51 according to the movement of the container 51.

The container transport motor 49 may transmit power for moving the slider 44 to the shaft 41. For example, the container transport motor 49 may rotate the shaft 41, and the slider 44 may move according to the rotation of the shaft 41.

A moving direction of the slider 44 may vary according to a rotating direction of the shaft 41.

A load cell 135 may be disposed inside the slider 44. The load cell 135 may be disposed inside the slider 44 to receive a load of the container holder 50. When the container 51 is accommodated in the container holder 50, the load cell 135 may receive both a load of the container 51 and the load of the container holder 50. Therefore, the load cell 135 may measure a weight of the container 51 when the container 51 is accommodated in the container holder 50.

Meanwhile, when the user puts the container 51 into the container holder 50, a case of applying excessive pressure may occur. When an excessive load is transmitted to the container holder 50 by the container 51 while the load cell 135 receives the load of the container holder 50, a load greater than a threshold value is transmitted to the load cell 135, and thus it may be a cause of malfunction of the load cell 135.

In order to protect the load cell 135 from the above-described problems, the container transfer module 40 may further include a load cell protection body 47 and a protection body guide 45 for guiding the load cell protection body 47.

The protective body guide 45 may be formed at the end of the shaft 41.

The load cell protection body 47 may selectively transmit the load of the container 51 to the load cell 135.

As shown in FIGS. 13 and 14, a fixing portion 47a and an inclined portion 47b may be formed in the load cell protection body 47. When the fixing portion 47a is formed at one end of the load cell protection body 47, the inclined portion 47b may be formed at the other end of the load cell protection body 47.

The fixing portion 47a may be fixed to the slider 44. A position of the fixing portion 47a may be fixed regardless of the position of the slider 44. The inclined portion 47b may be inclined in the direction of gravity. When the slider 44 is positioned at the first discharge position P1 or the second discharge position P2, the inclined portion 47b may be placed on an upper end of the shaft 41 and may be moved along the shaft 41 together the slider 44.

As shown in FIG. 14, when the slider 44 moves toward the user position P3, the inclined portion 47b may move along the shaft 41, ride on the protective body guide 45, and may be placed on an upper surface of the protective body guide 45. That is, when the slider 44 is positioned at the user position P3, the inclined portion 47b may be positioned on the upper surface of the protective body guide 45.

As shown in FIG. 13, when the inclined portion 47b is positioned at the upper end of the shaft 41, an upper end of the load cell protection body 47 may be spaced apart from a lower end 50b of the container holder 50. Accordingly, all of the load of the container holder 50 may be transferred to the load cell 135. In this case, the load cell 135 may measure a weight of the container holder 50, and when the container 51 is accommodated in the container holder 50, the weight measured by the load cell 135 may be a sum of the weight of the container 51 and the weight of the container holder 50.

Meanwhile, as shown in FIG. 14, when the inclined portion 47b is positioned on the upper surface of the protective body guide 45, the upper end of the load cell protective body 47 may support the lower end 50b of the container holder 50. Accordingly, at least a portion of the load of the container holder 50 may be transferred to the load cell protection body 47. Therefore, when excessive pressure is applied to the container holder 50, at least a portion of the pressure applied to the container holder 50 is distributed to the load cell protection body 47, and thus the load cell 135 may be protected. That is, the load cell protection body 47 may distribute the pressure applied to the load cell 135 disposed inside the slider 44.

The cosmetic manufacturing device 1 may detect a remaining amount of the cosmetic composition accommodated in any one of the plurality of cartridges 11.

According to the first embodiment, the cosmetic manufacturing device 1 may further include a cartridge remaining amount sensor and detect the remaining amount of each of the cartridges 11 through the cartridge remaining amount sensor.

According to an embodiment, the cartridge remaining amount sensor may be a level sensor 131 that determines whether the remaining amount of the cosmetic composition accommodated in the cartridge 11 is less than a preset reference amount.

The level sensor 131 may include a first water level sensor that determines whether the remaining amount of the cosmetic composition accommodated in any one of the cartridges disposed along the first circle is less than the preset reference amount and a second water level sensor (not shown) that determines whether the remaining amount of the cosmetic composition accommodated in any one of the cartridges disposed along the second circle is less than the preset reference amount.

The level sensor 131 may be mounted on the mounter 21 or the contact body 124.

First, a case in which the level sensor 131 is mounted on the mounter 21 will be described.

The level sensor 131 may be an infrared sensor for detecting infrared rays reflected after emitting infrared rays to the inside of any one of the plurality of cartridges 11. The infrared sensor may detect whether the remaining amount of the cartridge is less than the preset reference amount according to whether the reflected infrared rays are sensed. For example, the infrared sensor may determine the remaining amount of the cartridge to be greater than or equal to the preset reference amount when the reflected infrared rays are sensed and determine the remaining amount of the cartridge to be less than the preset reference amount when the reflected infrared rays are not sensed.

The infrared sensor may be mounted on the mounter 21 toward a level corresponding to the reference amount in the cartridge 11.

Meanwhile, the infrared sensor may include one or a plurality of sensing elements. When the infrared sensor includes only one sensing element, the infrared sensor may only determine whether the remaining amount of the cartridge is less than the predetermined reference amount. When the infrared sensor includes the plurality of sensing elements, an estimated remaining amount of the cartridge 11 may be calculated. For example, N sensing elements may be mounted to face different heights in the cartridge 11, and it is possible to detect whether the remaining amount of the cartridge is a first reference amount or more, less than the first reference amount and a second reference amount or more, . . . , or less than a N-lth reference amount and a Nth reference amount or more based on the detection result of each of the N sensing elements.

Next, a case in which the level sensor 131 is mounted on the contact body 124 will be described.

Similarly, the level sensor 131 may be an infrared sensor, and in this case, the infrared sensor may emit infrared rays from the contact body 124 and then detect reflected infrared rays, and a height of the piston (not shown) inside the cartridge 11 may be calculated through a detection time of the reflected infrared rays. The cosmetic manufacturing device 1 may calculate the remaining amount of the cartridge through the height of the piston (not shown).

According to the second embodiment, the cosmetic manufacturing device 1 may calculate the remaining amount of the cartridge by subtracting the discharge amount of the cosmetic composition sensed through the load cell 135 from a previous remaining amount of the cartridge.

According to the third embodiment, the cosmetic manufacturing device 1 may detect the remaining amount of the cartridge through magnetic force sensing. In this case, the cartridge remaining amount sensor may be a magnet detection sensor.

Specifically, a magnet (not shown) may be attached to the piston (not shown) provided inside each of the plurality of cartridges 11. The magnet detection sensor for detecting the magnet in a height direction of the cartridge 11 may be mounted on the cosmetic manufacturing device 1, and the cosmetic manufacturing device 1 may acquire the height of the piston (not shown) by detecting the magnet through the magnet detection sensor to detect the remaining amount.

Meanwhile, the above-described method for detecting the remaining amount of the cartridge is merely an example, and the cosmetic manufacturing device 1 may detect the remaining amount of the cosmetic composition accommodated in any one of the plurality of cartridges 11 in more various methods.

Figure 15:
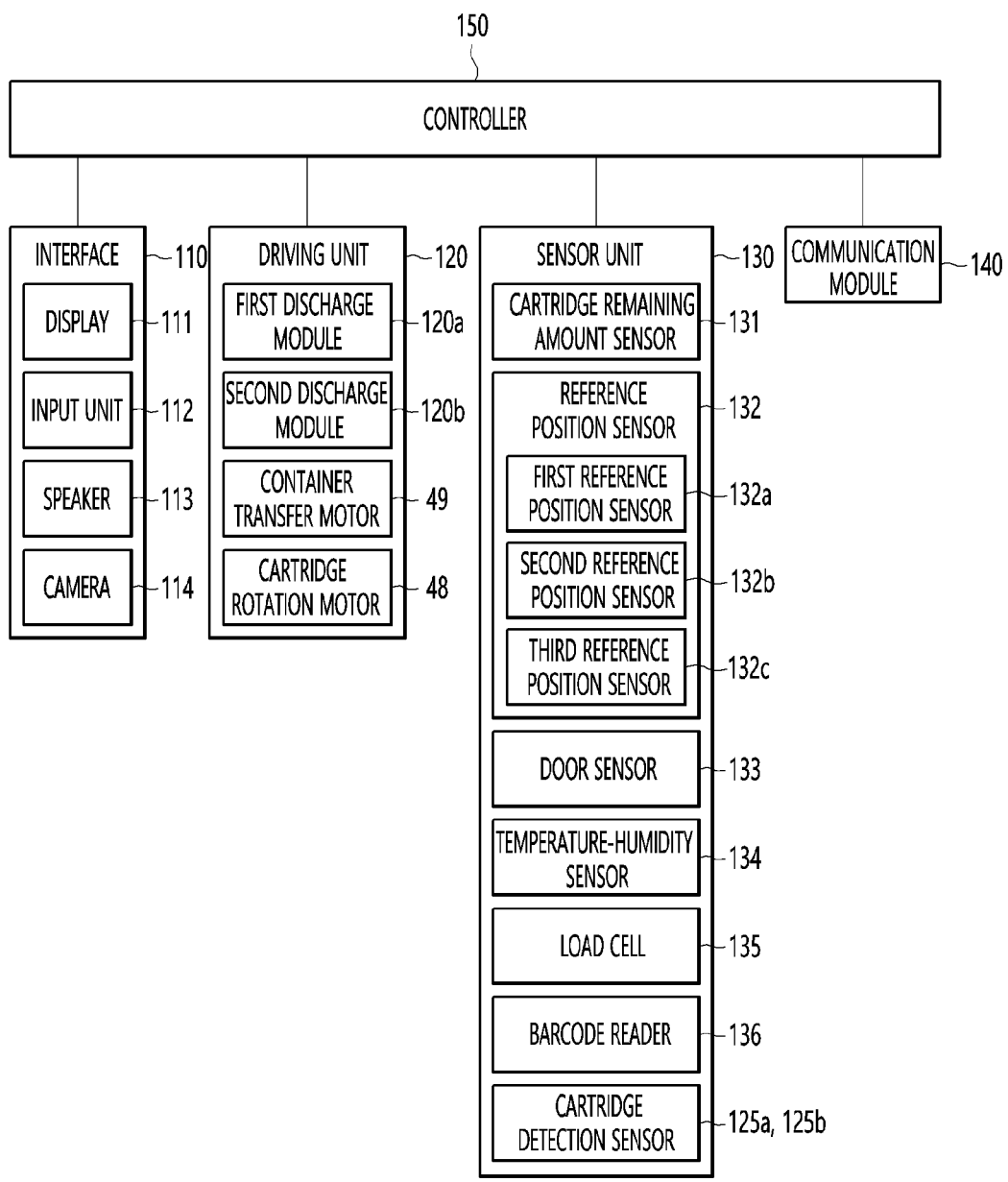
FIG. 15 is a control block diagram of a cosmetic manufacturing device according to an embodiment of the present disclosure.

Next, FIG. 15 is a control block diagram of a cosmetic manufacturing device according to an embodiment of the present disclosure.

The cosmetic manufacturing device 1 may include at least some or all of an interface 110, a driving unit 120, a sensor unit 130, a communication module 140, and a controller 150.

The controller 150 may control the overall operation of the cosmetic manufacturing device 1. The controller 150 may control each of the interface 110, the driving unit 120, the sensor unit 130, and the communication module 140.

The interface 110 may receive information input by a user or may output information.

The interface 110 may include at least some or all of a display 111, an input unit 112, a speaker 113, and a camera 114.

The display 111 may display various information related to the operation of the cosmetic manufacturing device 1. Referring to FIG. 2, the display 111 may be disposed on the upper surface of the upper case 5, but this is merely an example. That is, the display 111 may not only be disposed at a position other than the upper surface of the upper case 5, but may also be disposed on the middle case 6 or the lower case 7. In addition, it is reasonable that the position of the display 111 is not limited to the cases 5, 6, and 7.

The input unit 112 may receive a user input. The input unit 112 may be a physical key button. Alternatively, the input unit 112 may be a touch screen capable of receiving a touch input. The type of the input unit 112 may be various.

The speaker 113 may output sound. The speaker 113 may audibly output various information related to the operation of the cosmetic manufacturing device 1. For example, the speaker 113 may output information to be provided to the user by voice.

The camera 114 may capture the user's face.

The driving unit 120 may include at least some or all of the first discharge module 120a, the second discharge module 120b, the container transfer motor 49, and the cartridge rotation motor 48.

The first discharge module 120a may discharge the cosmetic composition accommodated in any one of the cartridges disposed along the first circle and the first to fourteenth cartridges 11-1 to 11-14 in the example of FIG. 6. The second discharge module 120b may discharge the cosmetic composition accommodated in any one of the cartridges disposed along the second circle and the fifteenth to twenty-first cartridges 11-15 to 11-21 in the example of FIG. 6.

The container transport motor 49 may move the container 51 to the first discharge position P1, the second discharge position P2, or the user position P3.

A cartridge rotation motor 124 may rotate the mounter 21 so as to position the cartridge accommodating the cosmetic composition to be discharged above the first discharge position P1 or the second discharge position P2.

The sensor unit 130 may sense various information related to the operation of the cosmetic manufacturing device 1.

The sensor unit 130 may include at least some or all of the cartridge remaining amount sensor 131, a reference position sensor 132, a door sensor 133, a temperature-humidity sensor 134, a barcode reader 136, and the cartridge detection sensors 125a and 125b.

The cartridge remaining amount sensor 131 is a sensor for detecting the remaining amount of the cosmetic composition accommodated in the cartridge 11, and since it is the same as described above, redundant descriptions will be omitted.

The reference position sensor 132 may include at least some or all of a first reference position sensor 132c, a second reference position sensor 132b, and a third reference position sensor 133c.

The first reference position sensor 132c may detect whether the first elevating motor 121 and the second elevating motor 126 are positioned at a predetermined first reference position.

The second reference position sensor 132b may detect whether the container transfer motor 49 is positioned at a predetermined second reference position.

The third reference position sensor 132c may detect whether the cartridge rotation motor 48 is positioned at a predetermined third reference position.

The door sensor 133 may detect whether at least one of the opening and closing part 5a and the case cover 7a is opened or closed.

The temperature-humidity sensor 134 may detect at least one of temperature and humidity inside the cases 5, 6, and 7.

The load cell 135 may sense the weight of the container holder 50. When the container 51 is not inserted into the container holder 50, the weight sensed by the load cell 135 may refer to the weight of the container holder 50 itself, and when the container 51 is inserted into the container holder 50, the weight sensed by the load cell 135 may refer to the sum of the weight of the container holder 50 itself and the weight of the container 51.

The barcode reader 136 may scan a code indicating a cosmetic manufacturing method.

The cartridge detection sensors 125a and 125b may detect whether each of the first elevating member 123 and the second elevating member 127 is in contact with the cartridge 11.

The communication module 140 may communicate with the terminal 2. Alternatively, the communication module 140 may communicate with the server 3.

The communication module 140 may include at least some or all of a Bluetooth module (not shown), a USC (not shown), an SD card reader (not shown), and a Wi-Fi module (not shown). For example, the cosmetic manufacturing device 1 may communicate with the terminal 2 through the Bluetooth module (not shown) and communicate with the server 3 through the Wi-Fi module (not shown), but this is merely an example, and thus the present disclosure is not limited thereto.

Figure 16:
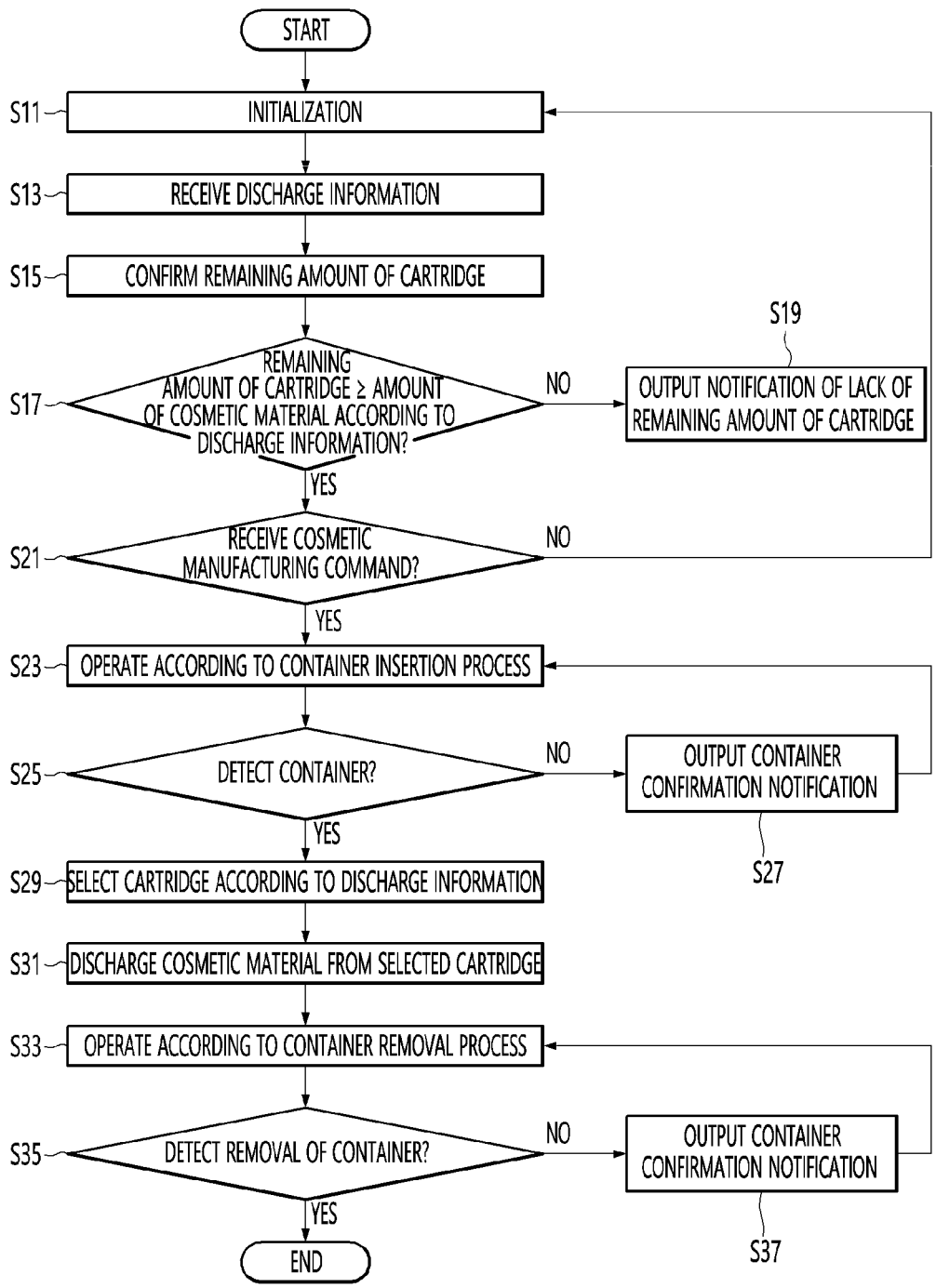
FIG. 16 is a flowchart illustrating a method of operating a cosmetic manufacturing device according to an embodiment of the present disclosure.

Next, FIG. 16 is a flowchart illustrating a method of operating a cosmetic manufacturing device according to an embodiment of the present disclosure.

The controller 150 may perform initialization (S11).

The controller 150 may perform at least one of initialization of the driving unit 120, initialization of the sensor unit 130, and initialization of the communication module 140.

The controller 150 may perform initialization of the driving unit 120 for positioning the first elevating motor 121, the second elevating motor 126, the container transfer motor 49, and the cartridge rotation motor 28 at the reference position, respectively.

The controller 150 may perform initialization of each of the cartridge remaining amount sensor 131, the reference position sensor 132, the door sensor 133, the temperature-humidity sensor 134, the load cell 135, the barcode reader 136, and the cartridge detection sensors 125a and 125b.

The controller 150 may perform initialization of the communication module 140 by switching the Bluetooth module (not shown) to the Bluetooth connection standby state. That is, the controller 150 may initialize the communication module 140 by interworking with the terminal 2 after controlling to a standby state for interworking with the terminal 2.

The controller 150 may perform initialization when a power state of the cosmetic manufacturing device 1 is switched from an off-state to an on-state. Alternatively, the controller 150 may also perform initialization when the manufacture of cosmetics according to discharge information is completed or the manufacture of cosmetics according to the discharge information is stopped.

The controller 150 may receive the discharge information (S13).

According to the first embodiment, the controller 150 may receive the discharge information from the terminal 2 through the communication module 140.

According to the second embodiment, the controller 150 may receive the discharge information through the barcode reader 136.

According to the third embodiment, the controller 150 may receive the discharge information through the input unit 112.

Meanwhile, the above-described first to third embodiments are merely examples for convenience of description, and the controller 150 may receive the discharge information in more various methods.

The discharge information may include a cosmetic manufacturing method.

That is, the discharge information may include information on the cartridge discharging the cosmetic composition and information on the discharge amount of the cosmetic composition to be discharged from the cartridge. Hereinafter, the target cartridge may be a cartridge for discharging the cosmetic composition.

The controller 150 may confirm the remaining amount of the cartridge (S15).

The controller 150 may confirm the remaining amount of each of the plurality of cartridges 11. More Specifically, the controller 15 may acquire the remaining amount of at least one cartridge 11 from which the cosmetic composition is to be discharged among the plurality of cartridges 11.

The controller 150 may determine whether the remaining amount of the cartridge is greater than or equal to an amount of cosmetic material according to the discharge information (S17).

The amount of cosmetic material according to the discharge information may be a predetermined discharge amount of the cosmetic composition acquired according to the discharge information.

The controller 150 may acquire whether the remaining amount of each cartridge 11 to be discharged is greater than or equal to the predetermined discharge amount.

For example, when the remaining amount of the first cartridge 11-1 is 30 g, and the predetermined discharge amount of the cosmetic composition from the first cartridge 11-1 in the discharge information is 20 g, the controller 150 may determine that the remaining amount of the cartridge is greater than or equal to the amount of cosmetic material according to the discharge information. However, as another example, when the remaining amount of the first cartridge 11-1 is 10 g, and the predetermined discharge amount of the cosmetic composition from the first cartridge 11-1 in the discharge information is 20 g, the controller 150 may determine that the remaining amount of the cartridge is less than the amount of cosmetic material according to the discharge information.

When the remaining amount of the cartridge is less than the amount of cosmetic material according to the discharge information, the controller 150 may output a notification of the lack of the remaining amount of the cartridge (S19).

That is, when a target weight of the target cartridge according to the discharge information is greater than the remaining amount of the target cartridge, the controller 150 may output the notification of the lack of the remaining amount of the cartridge.

According to the first embodiment, the controller 150 may output the notification of the lack of the remaining amount of the cartridge through the interface 110. For example, the controller 150 may control the display 111 to display a message indicating the lack of the remaining amount of the cartridge. As another example, the controller 150 may control the speaker 113 so that the message indicating the lack of the remaining amount of the cartridge is output as a voice.

According to the second embodiment, the controller 150 may output the notification of the lack of the remaining amount of the cartridge through the communication module 140. For example, the controller 150 may transmit a signal for controlling to output the notification of the lack of the remaining amount of the cartridge to the terminal 2, and the terminal 2 may output the notification of the lack of the remaining amount of the cartridge.

Meanwhile, the above-described first to second embodiments are merely examples for convenience of description, and the controller 150 may output the notification of the lack of the remaining amount of the cartridge in more various methods.

When the remaining amount of the cartridge is greater than or equal to the amount of cosmetic material according to the discharge information, the controller 150 may acquire whether a cosmetic manufacturing command is received (S21).

The controller 150 may receive the cosmetic manufacturing command through the input unit 112.

According to the embodiment, when receiving the cosmetic manufacturing command, the input unit 112 may receive a command for selecting one of a basic discharge command and a sample discharge command.

The basic discharge command may be a command for discharging a sufficient amount for the user to use corresponding cosmetics, and the sample discharge command may be a command for discharging a relatively small amount for testing before the user uses the corresponding cosmetics.

When the basic discharge command is received, the controller 150 may set the total discharge amount of the cosmetic composition according to the discharge information to the first weight, and when the sample discharge command is received, the controller 150 may set the total discharge amount of the cosmetic composition according to the discharge information to the second weight smaller than the first weight.

When the cosmetic manufacturing command is received, the controller 150 may operate according to a container insertion process (S23).

Hereinafter, a method of operating the controller 150 according to the container insertion process will be described.

First, the controller 150 may control the load cell 135 to measure the weight of the container 51. At this time, the container 51 may not be inserted into the container holder 50. The controller 150 may perform zero-point correction based on the measurement value of the load cell 135. The controller 150 may control the container transport module 40 so that the slider 44 is positioned at the user position P3 after performing the zero-point correction.

After positioning the slider 44 at the user position P3, the controller 150 may output a message for guiding the insertion of the container through at least one of the display 111 and the speaker 113. After outputting the message for guiding the insertion of the container, the controller 150 may enter into a standby state for receiving an input indicating completion of container insertion. After inserting the container 51 into the slider 44, the user may input completion of the container insertion into the input unit 112.

The controller 150 may detect the container 51 (S25).

The controller 150 may detect whether the container 51 is seated on the slider 44.

When the controller 150 receives the input indicating completion of the container insertion, the controller 150 may detect the container 51. The controller 150 may detect the container 51 through a measurement value of the weight of the container 51 through the load cell 135. Specifically, the controller 150 may control the load cell 135 to measure the weight of the container 51. The controller 150 may detect that the container 51 is not inserted when the measurement value of the load cell 135 is less than or equal to the zero-point. When the measurement value of the load cell 135 exceeds the zero-point, the controller 150 may detect that the container 51 is inserted.

The controller 150 may output a container confirmation notification when the container 51 is not detected (S27).

The controller 150 may output the container confirmation notification when detecting that the container 51 is not inserted. The controller 150 may control at least one of the display 111 and the speaker 113 to output the container confirmation notification.

When the container 51 is detected, the controller 150 may select the cartridge according to the discharge information (S29).

The controller 150 may select at least one of the plurality of cartridges 11 as the target cartridge based on the discharge information, and the target cartridge may be the cartridge 11 for discharging the cosmetic composition.

The controller 150 may control the cartridge rotation motor 48 so that the cartridge 11 for discharging the cosmetic composition is positioned in parallel with the first discharge position P1 or the second discharge position P2 in the vertical direction.

Specifically, when the target cartridge is a cartridge disposed along the first circle, the controller 150 rotates the cartridge mounter 21 in which the plurality of cartridges 11 are mounted so that the target cartridge moves to a position corresponding to the first discharge position P1, and when the target cartridge is a cartridge disposed along the second circle, the controller 150 rotates the cartridge mounter 21 so that the target cartridge moves to a position corresponding to the second discharge position P2.

In addition, the controller 150 may control the container transfer module 40 so that the container 51 moves according to the position of the cartridge 11. That is, the controller 150 may drive the container transfer module 40 so that the container 51 moves to a position for accommodating the cosmetic composition accommodated in the target cartridge.

For example, when the cartridge 11 is positioned in parallel with the cartridge 11 in the first discharge position P1 in the vertical direction, the container 51 is positioned at the first discharge position P1, and when the cartridge 11 is positioned in parallel with the second discharge position P2 in the vertical direction, the controller 150 may control the container transfer module 40 so that the container 51 is positioned at the second discharge position P2.

The controller 150 may discharge the cosmetic material from the selected cartridge 11 (S31).

The controller 150 may discharge the cosmetic composition accommodated in the target cartridge.

The controller 150 may discharge the cosmetic composition from the cartridge 11 after positioning the cartridge 11 and the container 51 that discharge the cosmetic composition in parallel in the vertical direction. For example, when the cartridge 11 and the container 51 are positioned in parallel with the first discharge module 120a in the vertical direction, the controller 150 may control the first discharge module 120a to discharge the cosmetic composition of the cartridge 11, and when the cartridge 11 and the container 51 are positioned in parallel with the second discharge module 120b in the vertical direction, the controller 150 may control the second discharge module 120b to discharge the cosmetic composition of the cartridge 11.

The controller 150 detects whether the elevating members 123 and 127 are in contact with the target cartridge, and when the contact between the elevating members 123 and 127 and the target cartridge is detected, it is possible to perform a discharge mode in which the elevating members 123 and 127 are controlled so as to apply pressure to the target cartridge. A method for the controller 150 to perform the discharge mode will be described in detail with reference to FIG. 17.

When there are a plurality of cartridges 11 from which the cosmetic composition is to be discharged according to the discharge information, the controller 150 may select the plurality of cartridges 11 in step S29 and sequentially perform operations according to step S31 and step S33 for each of the selected plurality of cartridges 11.

Meanwhile, after discharging the cosmetic composition from the target cartridge, the controller 150 may detect the remaining amount of the target cartridge and store the remaining amount in a memory (not shown).

After discharging all of the cosmetic composition according to the discharge information, the controller 150 may operate according to a container removal process (S33).

The controller 150 may perform the container removal process after discharging the cosmetic composition from each of the at least one target cartridge selected according to the discharge information is completed.

Hereinafter, a method of operating the controller 150 according to the container removal process will be described.

First, the controller 150 may control the container transfer module 40 so as to move the container 51 to the user position P3. After moving the container 51 to the user's position, the controller 150 may output a message guiding the container removal through at least one of the display 111 and the speaker 113. After outputting the message guiding the container removal, the controller 150 may enter a standby state for receiving an input indicating completion of the container removal. After the user removes the container 51 from the slider 44, the user may input completion of the container removal into the input unit 112.

When the controller 150 receives the input indicating completion of the container removal, the controller 150 may acquire the measurement value of the load cell 135 after moving the slider 44 to the first discharge position P1 or the second discharge position P2. When the measurement value of the load cell 135 exceeds the zero-point, the controller 150 may detect that the container 51 has not been removed. When the measurement value of the load cell 135 is less than or equal to the zero-point, the controller 150 may detect that the container 51 has been removed.

The controller 150 may detect the removal of the container 51 (S35).

When it is detected that the container 51 has not been removed, the controller 150 may output the container confirmation notification. The controller 150 may control at least one of the display 111 and the speaker 113 so as to output the container confirmation notification.

When the controller 150 may complete the manufacture of cosmetics when detecting the removal of the container 51.

Figure 17:
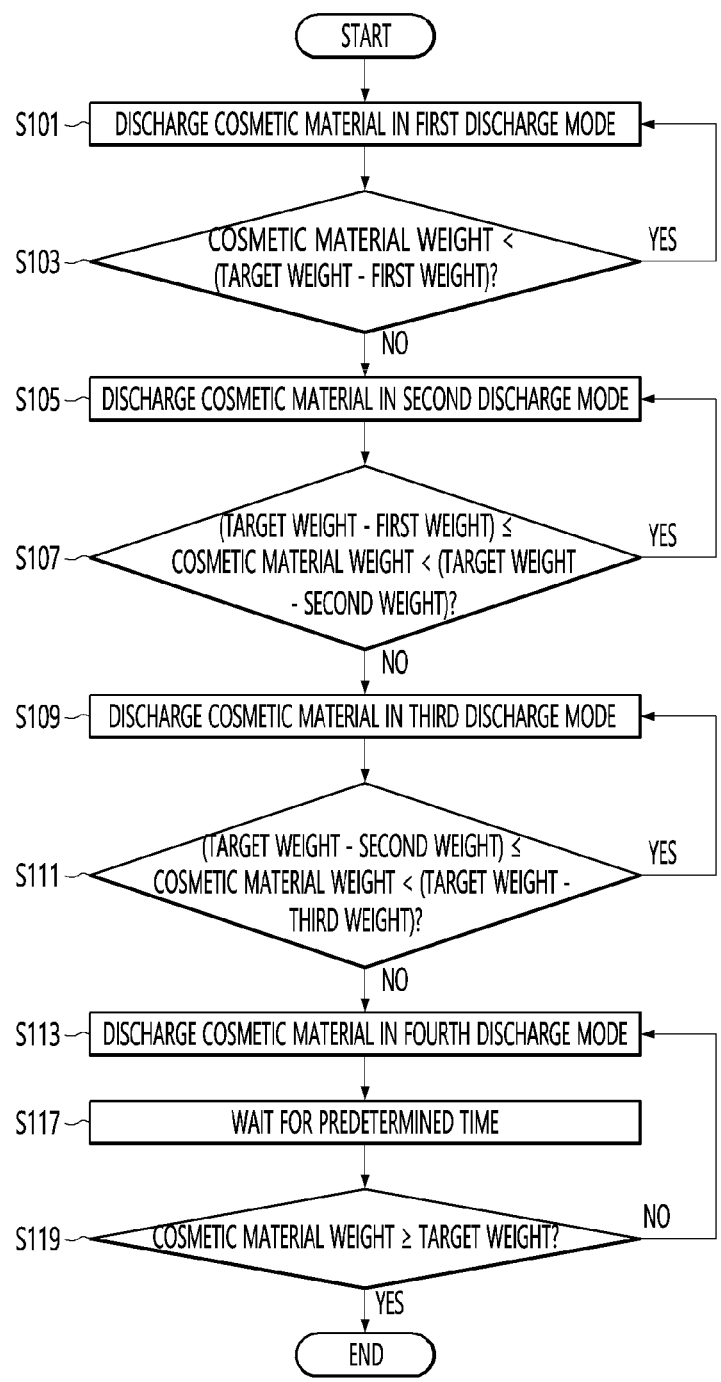
FIG. 17 is a flowchart illustrating a method of discharging a cosmetic composition from a cartridge according to an embodiment of the present disclosure.

Next, FIG. 17 is a flowchart illustrating a method of discharging a cosmetic composition from a cartridge according to an embodiment of the present disclosure.

FIG. 17 may be a detailed method of step S31 in FIG. 16.

Hereinafter, for convenience of description, it is assumed that the first discharge module 120a discharges the cosmetic composition from the cartridge 11 positioned at the first discharge position P1. That is, the second discharge module 120b may discharge the cosmetic composition from the cartridge 11 positioned at the second discharge position P2 in the same method as described below.

In addition, hereinafter, the discharge mode is divided into four steps, but this is merely an example. That is, the method of discharging the cosmetic composition of the cosmetic manufacturing device 1 according to the embodiment of the present disclosure may include a method of discharging the cosmetic composition in two or more discharge modes, and the controller 150 may control in one of two or more discharge modes according to a weight of the discharged cosmetic composition.

The controller 150 may control the first discharge module 120a so as to discharge the cosmetic material in the first discharge mode (S101).

A first discharge mode may be a mode in which a relatively large amount of the cosmetic composition is discharged when the cosmetic composition is discharged once. There is an advantage that a time required for discharging the cosmetics may be shortened by discharging the cosmetic composition according to the first discharge mode.

For example, the controller 150 may detect whether the cartridge 11 is in contact therewith through the cartridge detection sensors 150a and 150b, and then the controller 150 may control the first elevating motor 121 so that the first elevating member 123 is lowered with a first pulse. The first elevating member 123 may apply pressure to the target cartridge with the first pulse.

The first pulse may be the largest among first to fourth pulses to be described later.

After discharging the cosmetic material in the first discharge mode, the controller 150 may determine whether a cosmetic material weight is smaller than a difference between a target weight and a first weight (S103).

The cosmetic material weight may be a cosmetic material weight discharged to the container 51.

The target weight may be a total amount of the cosmetic material to be discharged from the corresponding cartridge.

The first weight is a preset weight and may be the largest among first to third weights to be described later.

When the cosmetic material weight is smaller than the difference between the target weight and the first weight, the controller 150 may discharge the cosmetic material in the first discharge mode again.

That is, the controller 150 may discharge the cosmetic material in the first discharge mode until the cosmetic material weight is greater than or equal to the difference between the target weight and the first weight.

When the cosmetic material weight is greater than or equal to the difference between the target weight and the first weight, the controller 150 may control the first discharge module 120a so as to discharge the cosmetic material in a second discharge mode (S105).

The second discharge mode may be a mode in which a relatively medium amount is discharged when the cosmetic composition is discharged once.

For example, the controller 150 may control the first elevating motor 121 so that the first elevating member 123 is lowered with the second pulse after detecting whether the cartridge 11 is in contact therewith through the cartridge detection sensors 150a and 150b. The first elevating member 123 may apply pressure to the target cartridge with the second pulse.

The second pulse may be smaller than the first pulse and may be greater than third to fourth pulses to be described later.

After discharging the cosmetics in the second discharge mode, the controller 150 may determine whether the cosmetic material weight is greater than or equal to the difference between the target weight and the first weight and is smaller than the difference between the target weight and the second weight (S107).

The cosmetic material weight may be the cosmetic material weight discharged to the container 51.

The target weight may be the total amount of the cosmetic material to be discharged from the corresponding cartridge.

The second weight is a preset weight and may be smaller than the first weight and greater than the third weight to be described later.

When the cosmetic material weight is greater than or equal to the difference between the target weight and the first weight and is smaller than the difference between the target weight and the second weight, the controller 150 may discharge the cosmetic material in the second discharge mode again.

That is, the controller 150 may discharge the cosmetic material in the second discharge mode until the cosmetic material weight is greater than or equal to the difference between the target weight and the second weight.

When the cosmetic material weight is greater than or equal to the difference between the target weight and the second weight, the controller 150 may control the first discharge module 120a so as to discharge the cosmetic material in a third discharge mode (S109).

The third discharge mode may be a mode in which a relatively small amount is discharged when the cosmetic composition is discharged once.

For example, the controller 150 may control the first elevating motor 121 so that the first elevating member 123 is lowered with the third pulse after detecting whether the cartridge 11 is in contact therewith through the cartridge detection sensors 150a and 150b. The first elevating member 123 may apply pressure to the target cartridge with the third pulse.

The third pulse may be smaller than the first and second pulses and may be greater than the fourth pulse to be described later.

After discharging the cosmetic material in the third discharge mode, the controller 150 may determine whether the cosmetic material weight is greater than or equal to the difference between the target weight and the second weight and is smaller than the difference between the target weight and the third weight (S111).

The cosmetic material weight may be the cosmetic material weight discharged to the container 51.

The target weight may be the total amount of the cosmetic material to be discharged from the corresponding cartridge.

The third weight is a preset weight and may be smaller than the first and second weights.

When the cosmetic material weight is greater than or equal to the difference between the target weight and the second weight and is smaller than the difference between the target weight and the third weight, the controller 150 may discharge the cosmetic material in the third discharge mode again.

That is, the controller 150 may discharge the cosmetic material in the third discharge mode until the cosmetic material weight is greater than or equal to the difference between the target weight and the third weight.

When the cosmetic material weight is greater than or equal to the difference between the target weight and the third weight, the controller 150 may control the first discharge module 120a so as to discharge the cosmetic material in a fourth discharge mode (S113).

The fourth discharge mode may be a mode in which a relatively small amount is discharged when the cosmetic composition is discharged once. It is possible to minimize a case in which the cosmetic composition is discharged more than the target discharge amount by discharging the cosmetic composition according to the fourth discharge mode.

For example, the controller 150 may control the first elevating motor 121 so that the first elevating member 123 is lowered with the fourth pulse after detecting whether the cartridge 11 is in contact therewith through the cartridge detection sensors 150a and 150b. The first elevating member 123 may apply pressure to the target cartridge with the fourth pulse.

The fourth pulse may be smaller than the first to third pulses.

The controller 150 may wait for a predetermined time (S117).

This is to accommodate the cosmetic composition attached to the nozzle part 13 of the cartridge 11 in the container 51.

Meanwhile, according to FIG. 16, although it is illustrated that waiting for a predetermined time is performed only after the cosmetic material is discharged in the fourth discharge mode, it is reasonable that the present disclosure is not limited thereto. According to the embodiment, an operation of waiting for the predetermined time may be performed even after at least one of the first discharge mode, the second discharge mode, and the third discharge mode is performed.

After waiting for the predetermined time, the controller 150 may determine whether the cosmetic material weight is greater than or equal to the target weight (S119).

When the cosmetic material weight is less than the target weight, the controller 150 may discharge the cosmetic material again in the fourth discharge mode and wait for the predetermined time.

That is, the controller 150 may discharge the cosmetic material in the fourth discharge mode until the cosmetic material weight is greater than or equal to the target weight.

The controller 150 may terminate a discharge operation of the cosmetic material when the cosmetic material weight is greater than or equal to the target weight.

As described above, there is an advantage that a time required for discharging the cosmetic material may be shortened and the discharge amount of the cosmetic material may be more accurately adjusted by discharging the cosmetic composition of the cartridge 11 while gradually reducing the discharge amount.

Next, various screens displayed by the display 111 of the cosmetic manufacturing device 1 according to an embodiment of the present disclosure will be described with reference to FIGS. 18 to 22.

Figure 18:
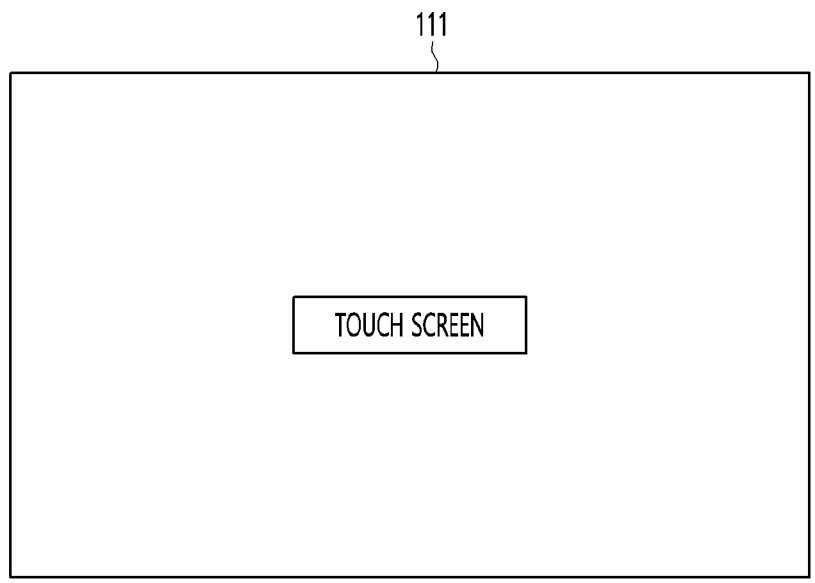
FIG. 18 is an exemplary view of a standby screen displayed by the cosmetic manufacturing device according to the embodiment of the present disclosure.

FIG. 18 is an exemplary view of a standby screen displayed by the cosmetic manufacturing device according to the embodiment of the present disclosure.

A screen shown in FIG. 18 may be an example of the standby screen. The standby screen may be a screen for minimizing power use. That is, the standby screen may be a power saving mode screen. For example, the standby screen may include a message such as 'touch the screen'.

The controller 115 may control the display 111 so as to display the standby screen immediately after initialization, when an operate is not performed for a predetermined time or more, or when an input is not received for a predetermined time or more.

Figure 19:
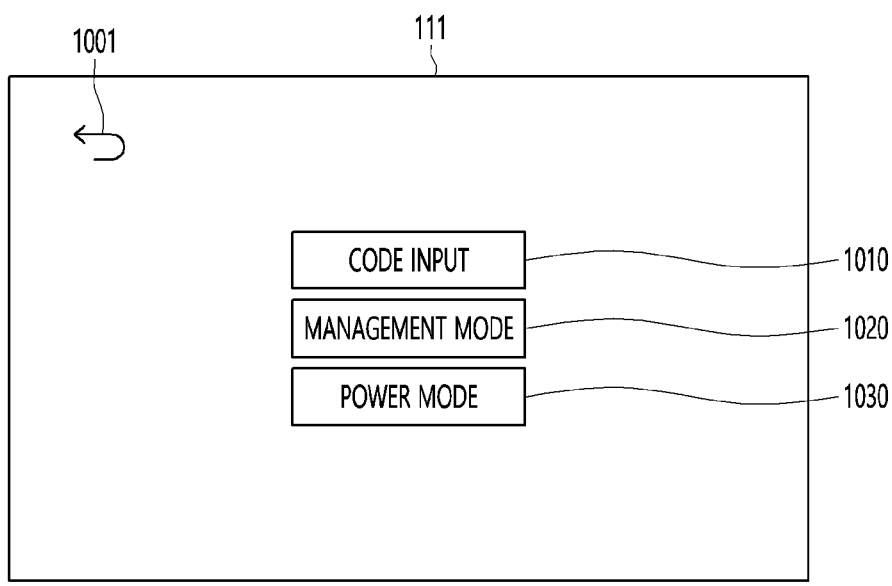
FIG. 19 is an exemplary view of a basic screen displayed by the cosmetic manufacturing device according to the embodiment of the present disclosure.

FIG. 19 is an exemplary view of a basic screen displayed by the cosmetic manufacturing device according to the embodiment of the present disclosure.

When a user input is detected on the standby screen, the controller 150 may display the basic screen as shown in FIG. 19.

The basic screen may include at least one of a return icon 1001, a code input icon 1010, a management mode icon 1020, and a power mode icon 1030.

The return icon 1001 may be an icon for displaying a previous screen. The controller 150 may control the display 111 so as to display the standby screen when receiving a selection command of the return icon 1001.

The code input icon 1010 may be an icon for receiving a code indicating the cosmetic manufacturing method. When receiving a selection command of the code input icon 1010, the controller 150 may control a display 111 so as to display a code input screen to be described later.

The management mode icon 1020 may be an icon for device management of the cosmetic manufacturing device 1.

When receiving a selection command of the management mode icon 1020, the controller 150 may control the display 111 so as to display a management mode screen to be described later.

The power mode icon 1030 may be an icon for setting an operation related to power of the cosmetic manufacturing device 1. When receiving a selection command of the power mode icon 1030, the controller 150 may control the display 111 so as to display a power mode screen to be described later.

Figure 20:
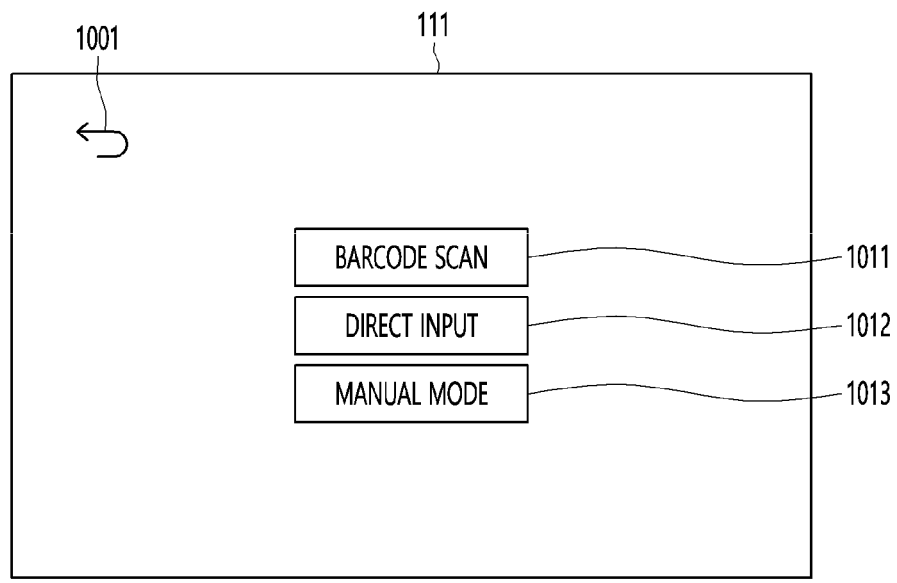
FIG. 20 is an exemplary view of a code input screen displayed by the cosmetic manufacturing device according to the embodiment of the present disclosure.

FIG. 20 is an exemplary view of the code input screen displayed by the cosmetic manufacturing device according to the embodiment of the present disclosure.

When the controller 150 receives the selection command of the code input icon 1010, the controller 150 may display the code input screen as shown in FIG. 20.

The code input screen may include at least one of a return icon 1001, a barcode scan icon 1011, a direct input icon 1012, and a manual mode icon 1013.

The return icon 1001 may be an icon for displaying a previous screen. The controller 150 may control the display 111 so as to display the basic screen when receiving a selection command of the return icon 1001 on the code input screen.

The barcode scan icon 1011 may be an icon for scanning a barcode including the cosmetic manufacturing method. When receiving a selection command of the barcode scan icon 1011, the controller 150 may control the display 111 so as to display a barcode screen (not shown) and control the barcode reader 136 in a scan mode.

The direct input icon 1012 may be an icon for directly receiving an input of the code including the cosmetic manufacturing method. When receiving a selection command of the direct input icon 1012, the controller 150 may control the display 111 so as to display a screen (not shown) for receiving an input of numbers or characters constituting the code.

The manual mode icon 1013 may be an icon for manually inputting the target cartridge and the discharge amount from the target cartridge. When receiving a selection command of the manual mode icon 1013, the controller 150 may control the display 111 so as to display a screen (not shown) for receiving an input of the target cartridge and a discharge amount from each of the target cartridges.

Figure 21:
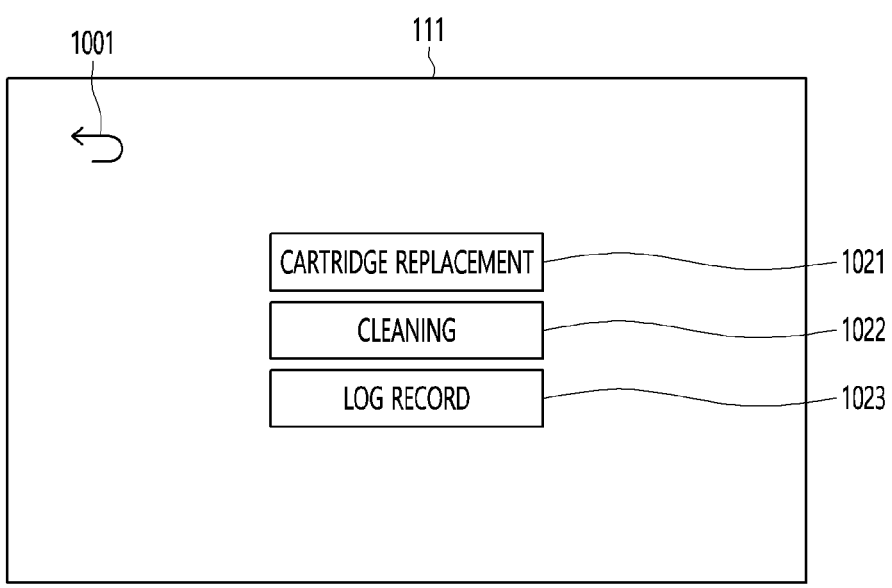
FIG. 21 is an exemplary view of a management mode screen displayed by the cosmetic manufacturing device according to the embodiment of the present disclosure.

FIG. 21 is an exemplary view of a management mode screen displayed by the cosmetic manufacturing device according to the embodiment of the present disclosure.

When receiving the selection command of the management mode icon 1020, the controller 150 may control the display 111 so as to display the management mode screen as shown in FIG. 21.

The management mode screen may include at least one of a return icon 1001, a cartridge replacement icon 1021, a cleaning icon 1022, and a log record icon 1023.

The return icon 1001 may be an icon for displaying a previous screen. When receiving the selection command of the return icon 1001 on the management mode screen, the controller 150 may control the display 111 so as to display the basic screen.

The cartridge replacement icon 1021 may be an icon for replacing at least one of the plurality of cartridges 11 mounted in the cosmetic manufacturing device 1. When receiving a selection command of the cartridge replacement icon 1021, the controller 150 may display a screen (not shown) for receiving an input of a cartridge number to be replaced, and when the cartridge number is input, the controller 150 may control the cartridge rotation motor 48 so that the cartridge corresponding to the input cartridge number moves to a position corresponding to the opening/closing part 5*a*.

The cleaning icon 1022 may be an icon for operating the cosmetic manufacturing device 1 in a cleaning mode. The controller 150 may operate in the cleaning mode when receiving a selection command of the cleaning icon 1022.

According to the embodiment, the controller 150 may recognize a cartridge that is not used for a certain time during operating in the cleaning mode, and may discharge a small amount of the cosmetic composition from the recognized unused cartridge.

According to another embodiment, the cosmetic manufacturing device 1 may further include a UV LED module (not shown), and the controller 150 may control the UV LED module (not shown) so that the nozzle part 13 of each cartridge 11 is sterilized while rotating the mounter 21 when operating in the cleaning mode.

According to still another embodiment, the cosmetics manufacturing device 1 may further include a brush module (not shown) such as a cleaning brush or sponge and may control the brush module (not shown) so that the brush module (not shown) cleans the nozzle part 13 of each cartridge 11 while rotating the mounter 21 when operating in the cleaning mode.

The log record icon 1023 may be an icon for displaying a usage record of the cosmetic manufacturing device 1. When receiving a selection command of the log record icon 1023, the controller 150 may control the display 111 so as to display the usage time of the cosmetic manufacturing device 1, information on the cosmetics manufactured by the cosmetic manufacturing device 1, and the like.

Figure 22:
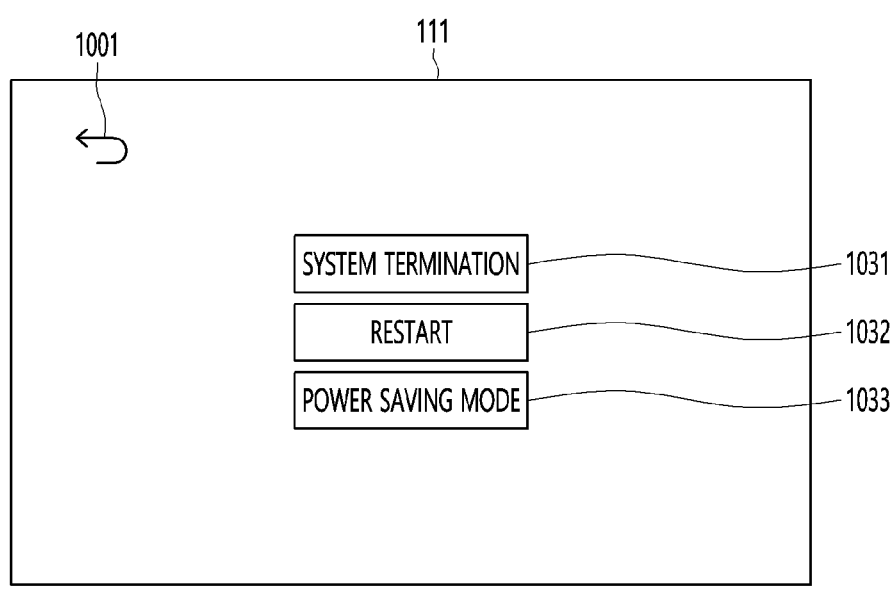
FIG. 22 is an exemplary view of a power mode screen displayed by the cosmetic manufacturing device according to the embodiment of the present disclosure.

FIG. 22 is an exemplary view of a power mode screen displayed by the cosmetic manufacturing device according to the embodiment of the present disclosure.

When receiving the selection command of the power mode icon 1030, the controller 150 may control the display 111 so as to display the power mode screen as shown in FIG. 22.

The power mode screen may include at least one of a return icon 1001, a system termination icon 1031, a restart icon 1032, and a power saving mode icon 1033.

The return icon 1001 may be an icon for displaying a previous screen. The controller 150 may control the display 111 so as to display the basic screen when receiving a selection command of the return icon 1001 on the power mode screen.

A system termination icon 1031 may be an icon for terminating the cosmetic manufacturing device 1. The controller 150 may turn off the power when receiving a selection command of the system termination icon 1031.

The restart icon 1032 may be an icon for restarting the cosmetic manufacturing device 1 after terminating. When receiving a selection command of the restart icon 1032, the controller 150 may turn off the power and then turn on the power.

The power saving mode icon 1033 may be an icon for controlling the cosmetic manufacturing device 1 in a power saving mode. When receiving a selection command of the power saving mode icon 1033, the controller 150 may control the display 111 so as to display the standby screen as shown in FIG. 18 after controlling in the standby mode.

Figure 23:
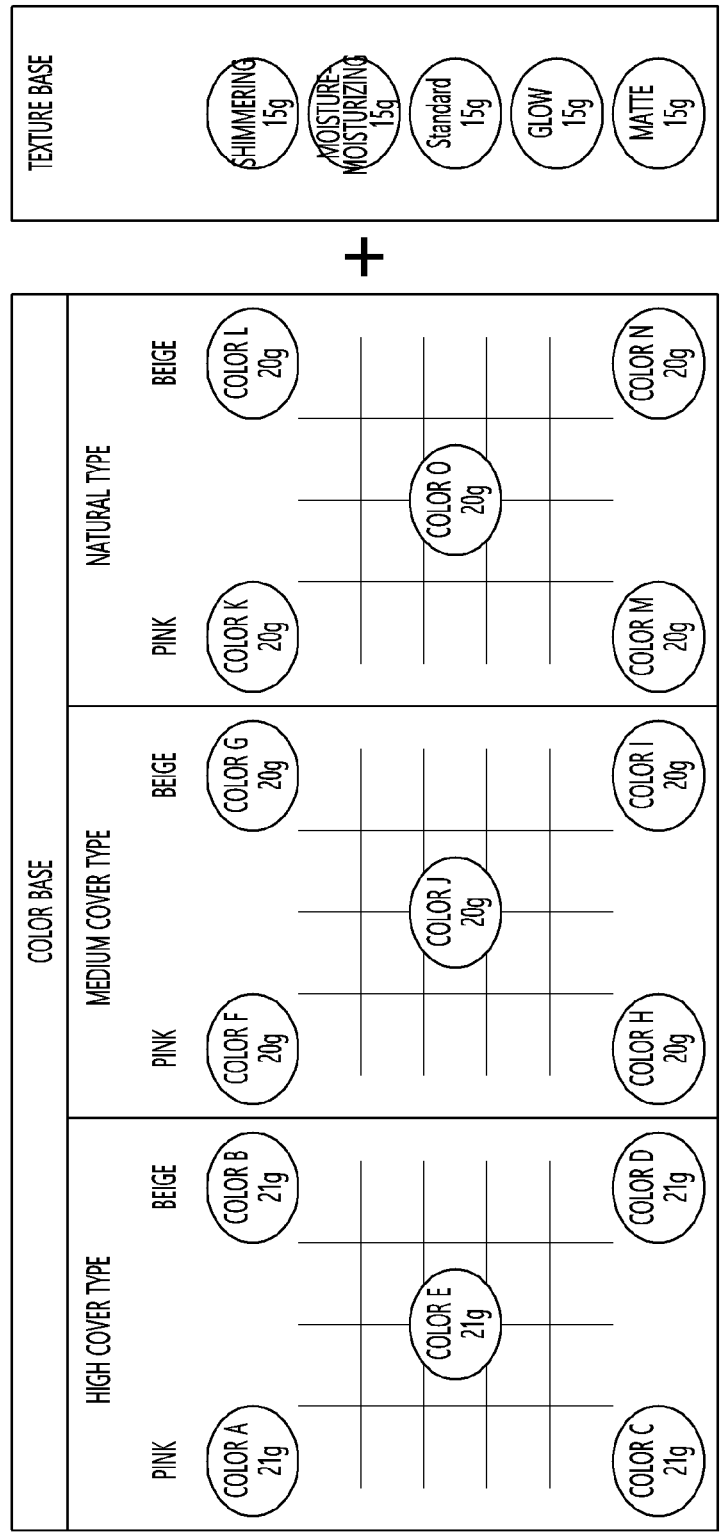
FIG. 23 is an exemplary view for describing a method for the cosmetic manufacturing device according to an embodiment of the present disclosure to select a target cartridge according to a cosmetic manufacturing method.

FIG. 23 is an exemplary view for describing a method for the cosmetic manufacturing device according to an embodiment of the present disclosure to select a target cartridge according to a cosmetic manufacturing method.

The cosmetic manufacturing method may include at least one of color information, coverage level information, and texture information.

When the coverage level information is a high cover type, the controller 150 selects at least one of a cartridge having a color A, a cartridge having a color B, a cartridge having a color C, a cartridge having a color D, and a cartridge having a color E and selects the discharge amount of each of the selected cartridges, and accordingly, the controller 150 may generate discharge information for manufacturing cosmetics in which a color is developed according to the color information.

When the coverage level information is a medium cover type, the controller 150 selects at least one of a cartridge having a color F, a cartridge having a color G, a cartridge having a color H, a cartridge having a color I, and a cartridge having a color J and selects the discharge amount of each of the selected cartridges, and accordingly, it is possible to generate discharge information for manufacturing cosmetics in which a color is developed according to the color information.

When the coverage level information is a natural type, the controller 150 selects at least one of a cartridge having a color K, a cartridge having a color L, a cartridge having a color M, a cartridge having a color N, and a cartridge having a color O and selects the discharge amount of each of the selected cartridges, and accordingly, it is possible to generate discharge information for manufacturing cosmetics in which a color is developed according to the color information.

Meanwhile, the controller 150 may select at least one of a cartridge having a shimmering cosmetic material, a cartridge having a moisturizing cosmetic material, a cartridge having a standard cosmetic material, a cartridge having a glow cosmetic material, and a cartridge having a matte cosmetic material according to the texture information separately from the color information and the coverage level information to reflect in the discharge information according to the above-described color information and coverage level information.

Next, a method of acquiring the discharge information through the terminal 2 with which the cosmetic manufacturing device 1 according to an embodiment of the present disclosure is interlocked will be described with reference to FIGS. 24 to 29.

Figure 24:
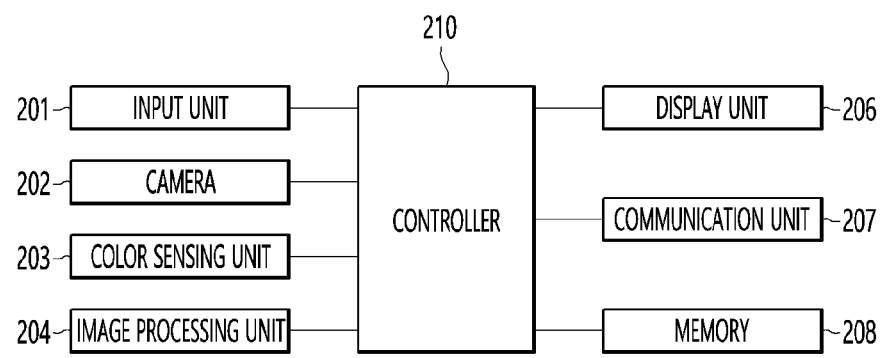
FIG. 24 is a control block diagram of a terminal 2 according to an embodiment of the present disclosure.

FIG. 24 is a control block diagram of the terminal 2 according to an embodiment of the present disclosure.

The terminal 2 may include at least some or all of an input unit 201, a camera 202, a color sensing unit 203, an image processing unit 204, a display unit 206, a communication unit 207, a memory 208, and a controller 210.

The terminal 2 may be a smart phone, but this is merely an example, and may include a wearable device such as a smart watch, a tablet PC, a laptop computer, a desktop, and the like.

The input unit 201 may receive an input command from the user. The input command may include at least one piece of information. For example, the input unit 201 may receive at least one of an input command for selecting a color of a cosmetic to be manufactured, an input command for selecting a coverage level of the cosmetic to be manufactured, and an input command for selecting a texture of the cosmetic to be manufactured.

The input unit 201 may be formed of a touch screen or the like or may include a physical key button.

The camera 202 may capture the user. The camera 202 may capture a facial image of the user so that a face of the user is included.

The color sensing unit 203 may detect a skin color from the image captured by the camera 202.

The image processing unit 204 may perform calibration on the image captured by the camera 202.

The display unit 206 may display various information related to cosmetics manufacturing.

For example, the display unit 206 may display the user's skin color sensed by the color sensing unit 203, a color developed according to the cosmetic to be manufactured, skin analysis information, coverage level information, texture information, and the like.

The communication unit 207 may transmit and receive a signal of at least one of the cosmetic manufacturing device 1 and the server 3.

The memory 208 may store various information related to cosmetics manufacturing. For example, the memory 208 may store a code generation algorithm indicating discharge information for cosmetics manufacturing according to at least one of the color information, the coverage level information, and the texture information.

The controller 210 may control the overall operation of the terminal 2. The controller 210 may control at least one of the input unit 201, the camera 202, the color sensing unit 203, the image processing unit 204, the display unit 206, the communication unit 207, and the memory 208.

Figure 25:
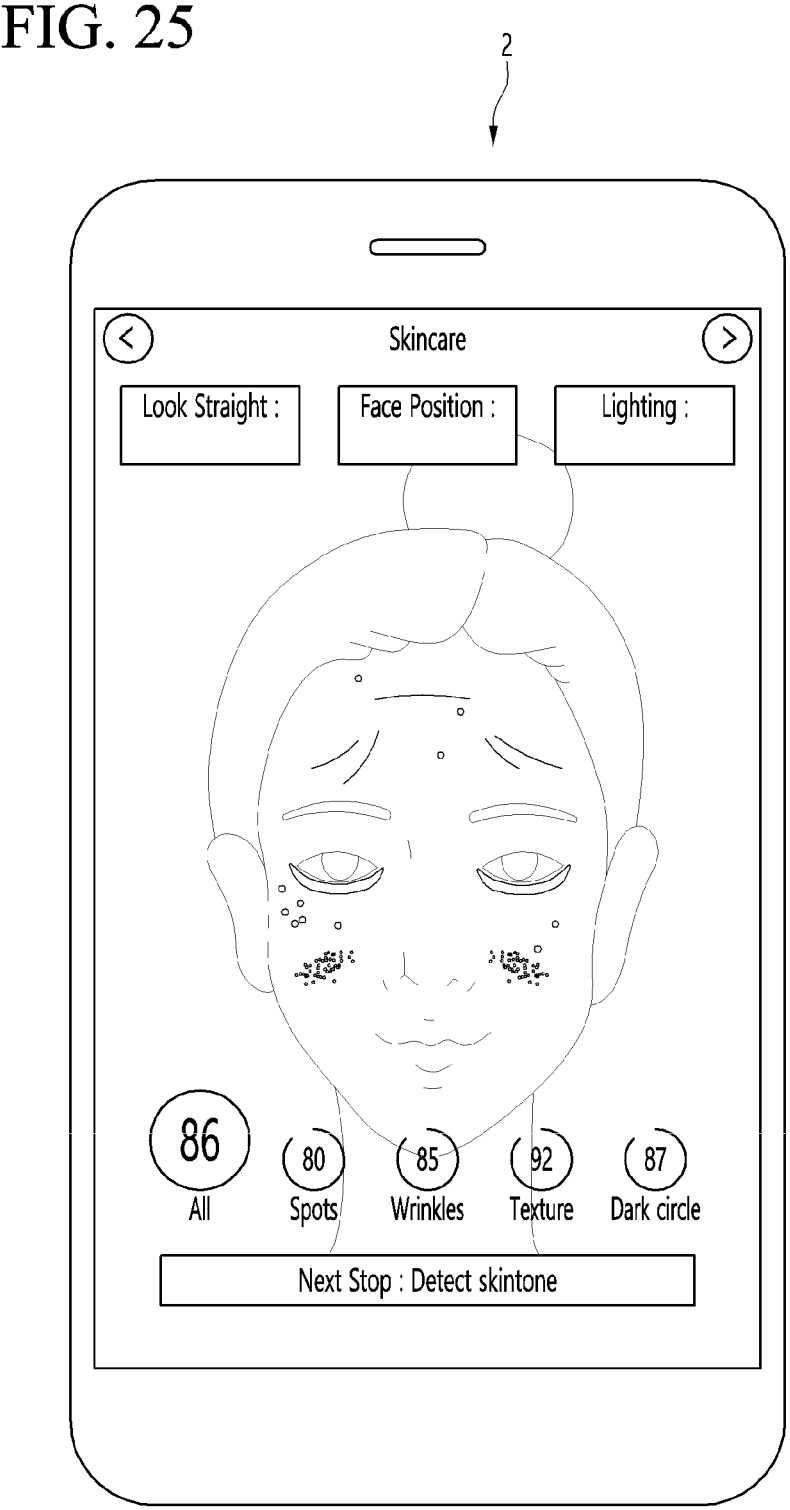
FIG. 25 is an exemplary view of a screen for a terminal to analyze skin information of a user according to an embodiment of the present disclosure.

FIG. 25 is an exemplary view of a screen for a terminal to analyze skin information of a user according to the embodiment of the present disclosure.

The terminal 2 may acquire a facial image of the user. The terminal 2 may acquire the facial image of the user through a pre-captured picture or capturing of the camera 202 provided in the terminal 2.

The terminal 2 may analyze the facial image of the user. For example, the terminal 2 may acquire a position, distribution, degree, etc. of spots, wrinkles, skin texture, dark circles, etc. through analysis of the facial image.

Figure 26:
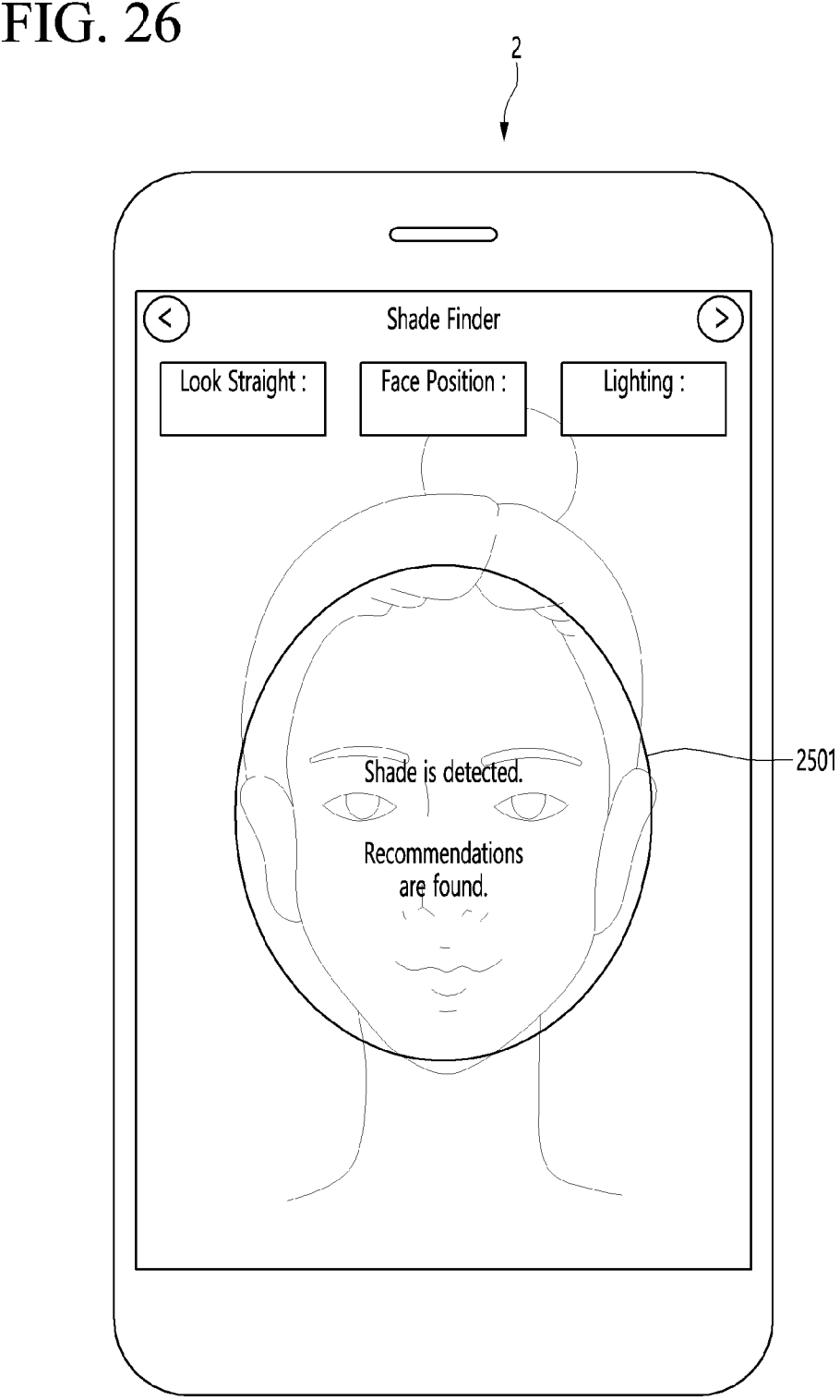
FIG. 26 is an exemplary view of a screen for the terminal to analyze user's color information according to the embodiment of the present disclosure.

FIG. 26 is an exemplary view of a screen for the terminal to analyze user's color information according to the embodiment of the present disclosure.

The controller 210 may control the color sensing unit 203 to acquire the color information through the facial image of the user.

The color information may include at least one of user's skin color information and foundation color information according to the user's skin color.

The controller 203 may capture the user's face to acquire the color information.

The controller 203 may control the display unit 206 to display a guide 2501 for capturing the user's face.

The controller 203 may control the image processing unit 204 to perform calibration on the facial image captured by the camera 202.

Meanwhile, the controller 203 may determine whether the image satisfies a preset condition and may control the image processing unit 204 so as to perform calibration on the image when the image does not satisfy the preset condition, and not to perform calibration on the image when the image meets the preset condition.

In this case, the preset condition may include at least one of color temperature, illuminance, face position, presence/absence of shadow, presence/absence of backlight, and presence/absence of irregular reflection. For example, the preset condition may be a color temperature of 5,500-5,800K, an illuminance of 500-540 lux and may be a state in which two light sources having different color temperatures do not affect the face, the camera 202 and the face are positioned parallel to each other, light is evenly reflected on the user's face, there are no shadows on the face, no flare in the screen, no light source within a predetermined distance, no spot light, and no backlight.

The controller 210 may acquire the color information of the user by analyzing an image on which calibration is performed or an image captured under the preset condition.

Figure 27:
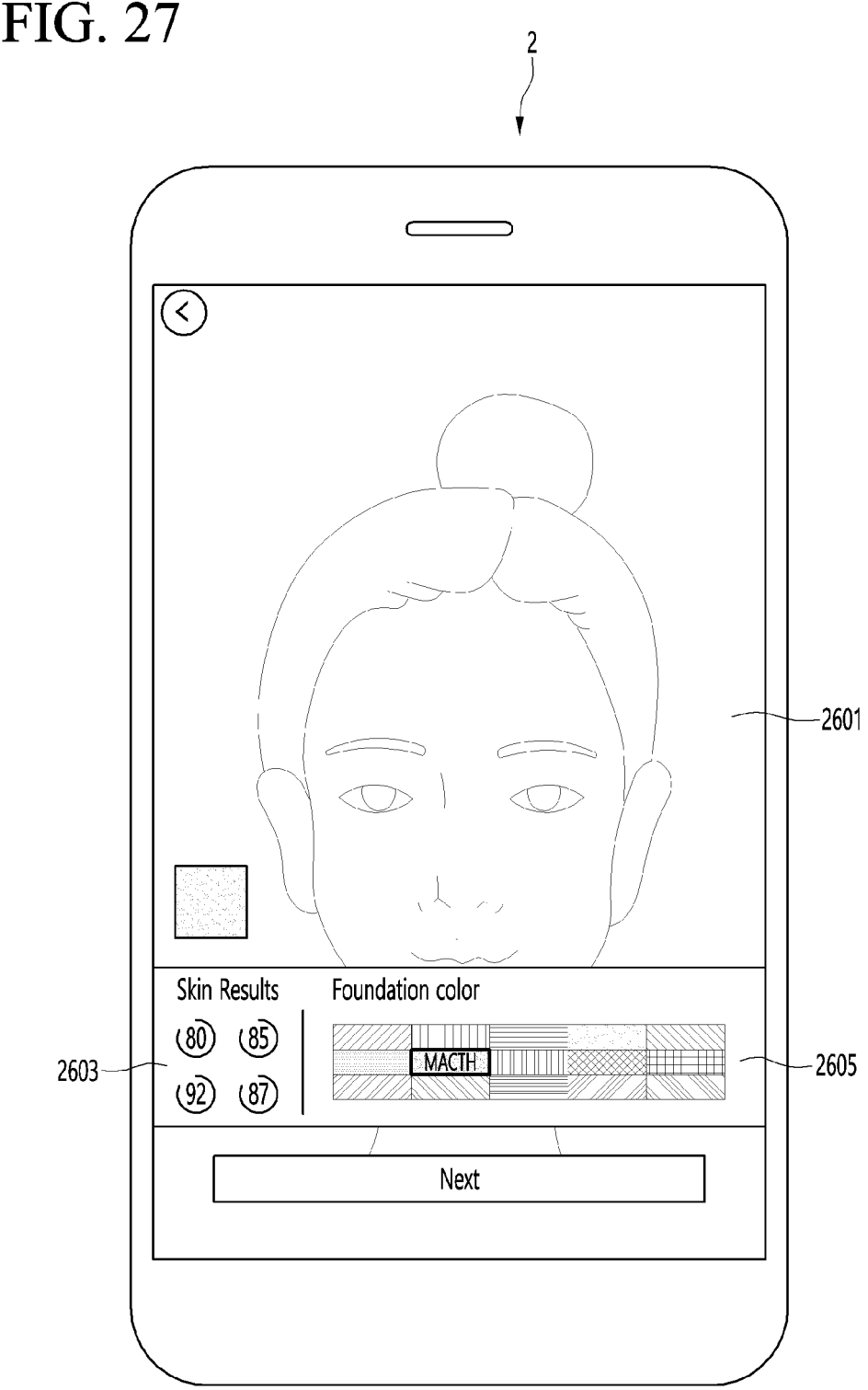
FIG. 27 is an exemplary view of a screen on which the terminal displays skin information and color information according to the embodiment of the present disclosure.

FIG. 27 is an exemplary view of a screen on which the terminal displays skin information and color information according to the embodiment of the present disclosure.

The controller 210 may control the display unit 206 so as to display at least some or all of an image 2601, a skin information 2603, and a color information 2605.

The image 2601 may be a facial image of a user who is an analysis target.

The skin information 2603 may include information on spots, wrinkles, skin texture, dark circles, and the like that are analyzed in the image 2601. The skin information 2603 may include scores acquired by quantifying the spots, the wrinkles, the skin texture, the dark circles, and the like.

The color information 2605 may include a foundation color according to the skin color of the user analyzed in the image 2601. In addition, the color information 2605 may further display at least one other foundation color that may be manufactured through the cosmetic manufacturing device 1.

The user may select a foundation color other than the foundation color according to an analysis result of the image 2601.

Figure 28:
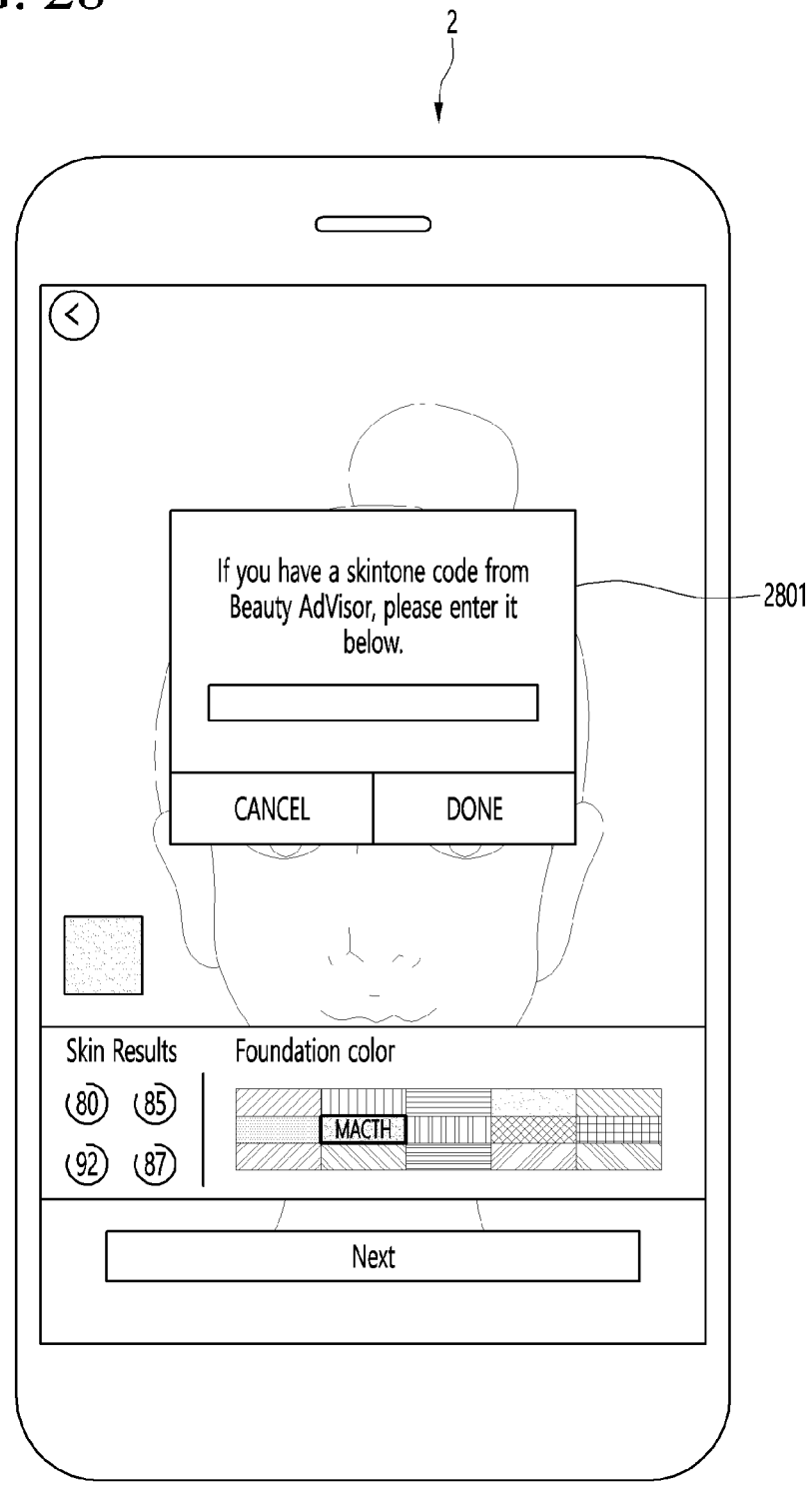
FIG. 28 is an exemplary view of a screen for the terminal to directly receive color information according to the embodiment of the present disclosure.

FIG. 28 is an exemplary view of a screen for the terminal to directly receive color information according to the embodiment of the present disclosure.

The controller 210 may receive color information measured by a separate skin diagnosis device such as a skin colorimeter (not shown) or a skin diagnosis device (not shown), rather than a result of analyzing the color information through the image 2601. For example, as shown in FIG. 28, the display unit 206 may display a pop-up screen 2701 for receiving a skin tone code and may receive the skin tone code through the pop-up screen 2701 to acquire the color information.

Figure 29:
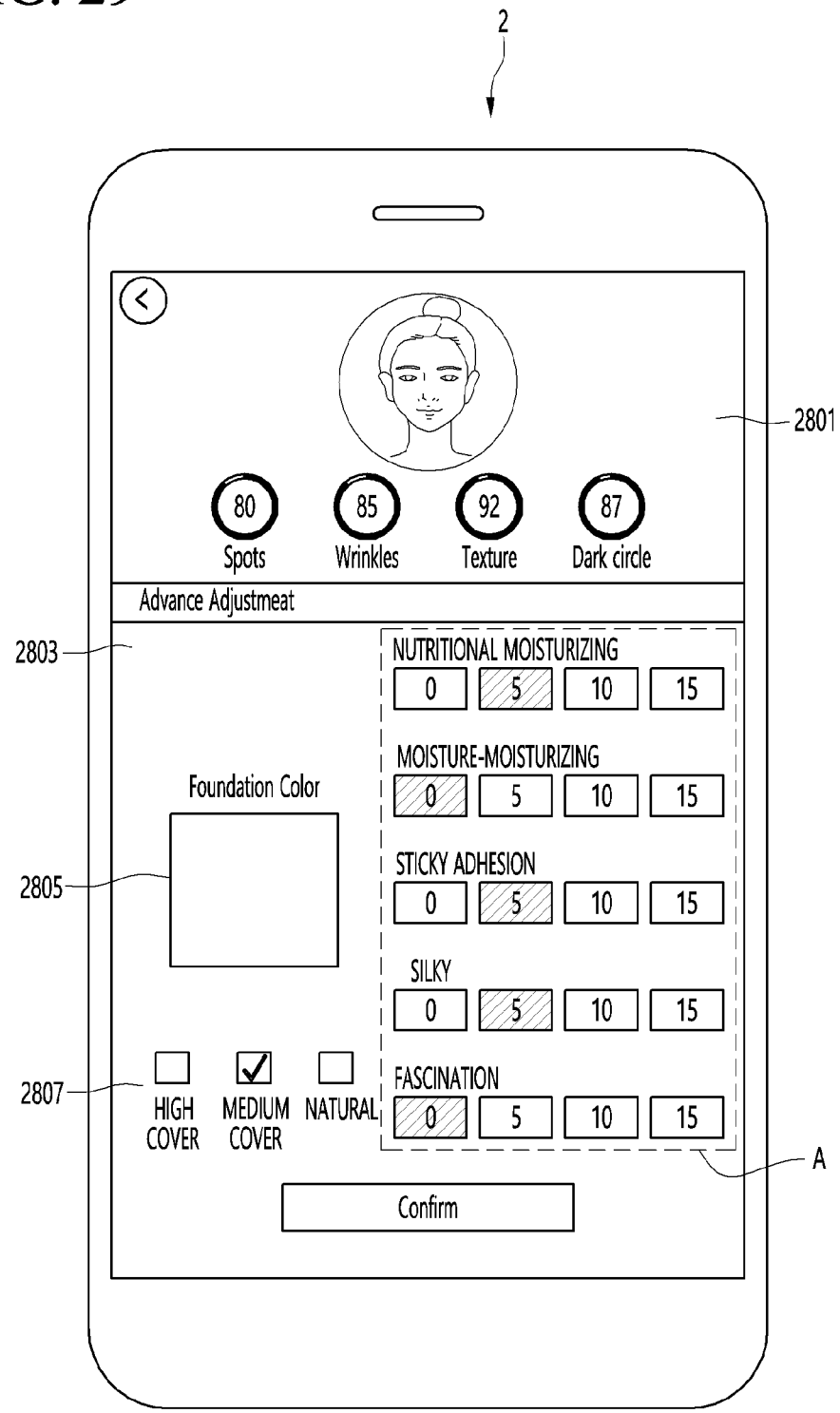
FIG. 29 is an exemplary view of a screen for the terminal to set discharge information according to the embodiment of the present disclosure.

FIG. 29 is an exemplary view of a screen for the terminal to set discharge information according to the embodiment of the present disclosure;

The display unit 206 may display the screen for setting the discharge information as shown in FIG. 29.

The display unit 206 may display at least one of skin information 2801 and cosmetic adjustment information 2803.

The cosmetic adjustment information 2803 may include color information 2805, a coverage level selection icon 2807, and a texture selection icon A.

The color information 2805 may include the color information determined through the screen shown in FIG. 26 or the screen shown in FIG. 27.

The coverage level selection icon 2807 may be an icon for the user to select the coverage level. The controller 210 may receive a command for selecting any one of high coverage, medium coverage, and natural through the coverage level selection icon 2807 as the coverage level, but the type of the coverage level and the number thereof are merely an example, and thus the present disclosure is not limited thereto.

The controller 210 may acquire the coverage level information of the cosmetic to be manufactured through the coverage level selection icon 2807.

The texture selection icon A may be an icon for the user to select the texture. According to an example of FIG. 29, at least one of nutritional moisturizing, moisture-moisturizing, sticky adhesion, silky, and fascination may be selected as the texture, but this is merely an example. The texture displayed on the texture selection icon (A) may vary depending on ingredients of the cosmetic composition of the cartridge having the cosmetic composition related to the texture among the cartridges provided in the cosmetic manufacturing device 1.

The controller 210 may acquire the texture information on the cosmetic to be manufactured through the texture selection icon A.

The controller 210 may acquire the discharge information based on the color information, the coverage level information, and the texture information acquired through a screen as shown in FIG. 29. For example, the controller 210 may generate discharge information such as a cartridge discharging the cosmetic composition according to at least one of the color information, the coverage level information, and the texture information, a code indicating the discharging amount from the cartridge, and the like.

The controller 210 may control the communication unit 207 so as to transmit the discharge information to the cosmetic manufacturing device 1, and the cosmetic manufacturing device 1 may manufacture cosmetics by discharging the cosmetic composition accommodated in the plurality of cartridges 11 according to the discharge information.

Next, various modified examples of the texture selection icon A will be described with reference to FIGS. 30 to 35.

Figure 30:
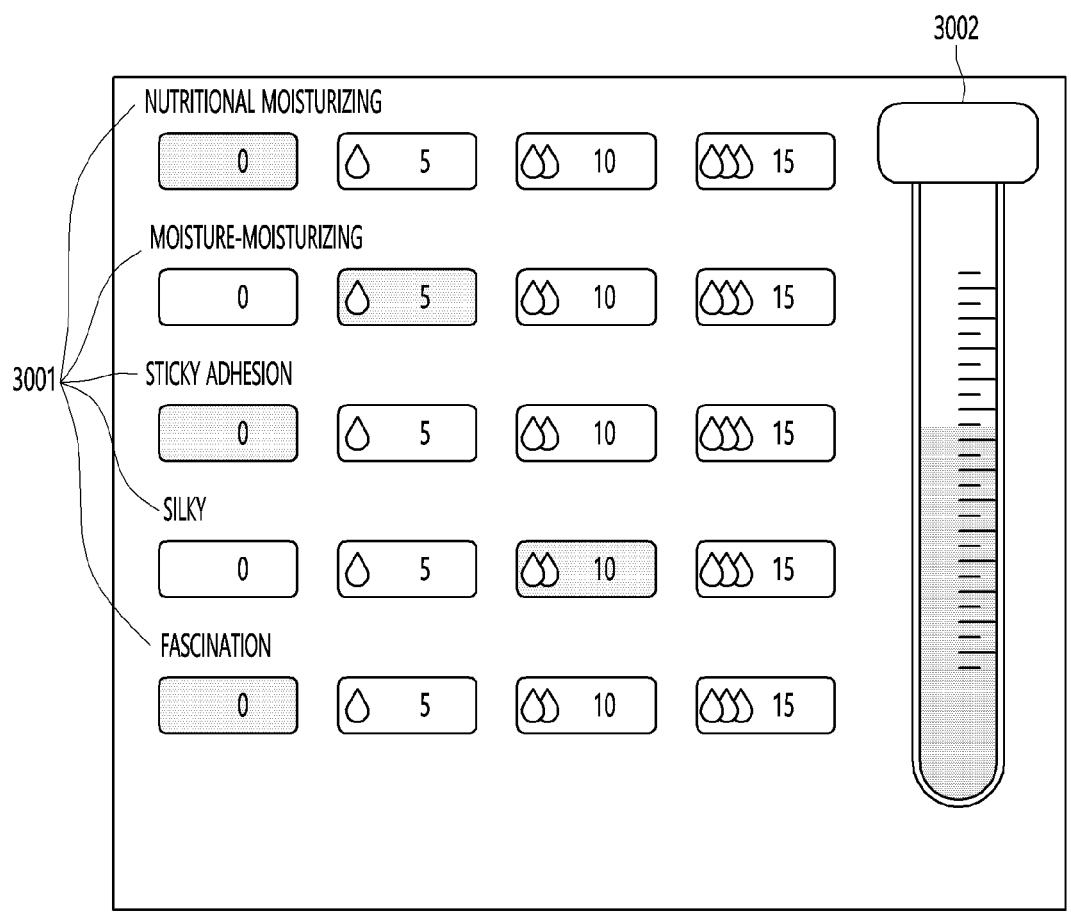
FIG. 30 is a view illustrating a first modified example of a texture selection icon according to an embodiment of the present disclosure.

FIG. 30 is a view illustrating a first modified example of a texture selection icon according to an embodiment of the present disclosure.

According to an embodiment, when cosmetics are manufactured, a total discharge amount of the cosmetic composition that determines the texture may be determined.

The display unit 206 may display an icon 3001 in which a texture type is selected and an image 3002 in which a maximum capacity is determined, and according to an example of FIG. 30, the image 3002 may be a test tube. The controller 210 may control the image 3002 so that a substance is filled with whenever the cosmetic composition that determines the texture is selected through the icon 3001 in which the texture type is selected.

In this case, there is an advantage that the user may more easily confirm an amount of a cosmetic material that determine an already selected texture and an amount of a cosmetic material that determine a remaining texture.

Figure 31:
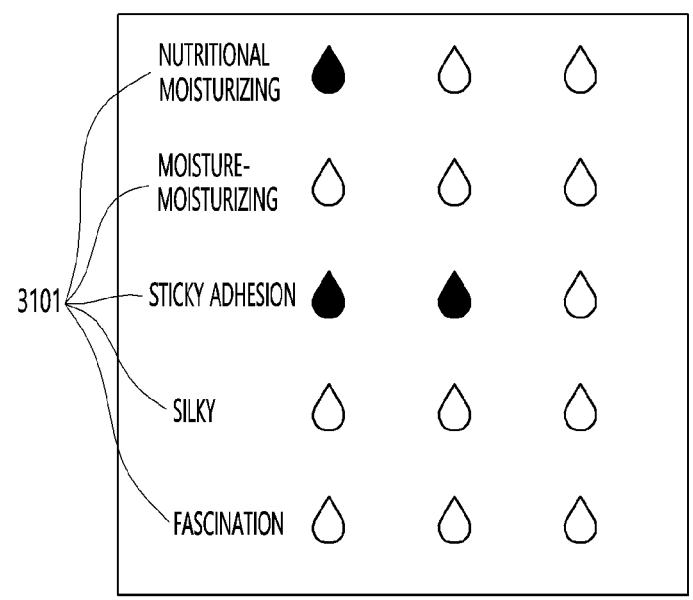
FIG. 31 is a view illustrating a second modified example of the texture selection icon according to the embodiment of the present disclosure.

FIG. 31 is a view illustrating a second modified example of the texture selection icon according to the embodiment of the present disclosure.

The display unit 206 may display an icon 3101 for which the texture type is selected as an image instead of a number, and according to the example of FIG. 31, the image may be a water droplet.

Figure 32:
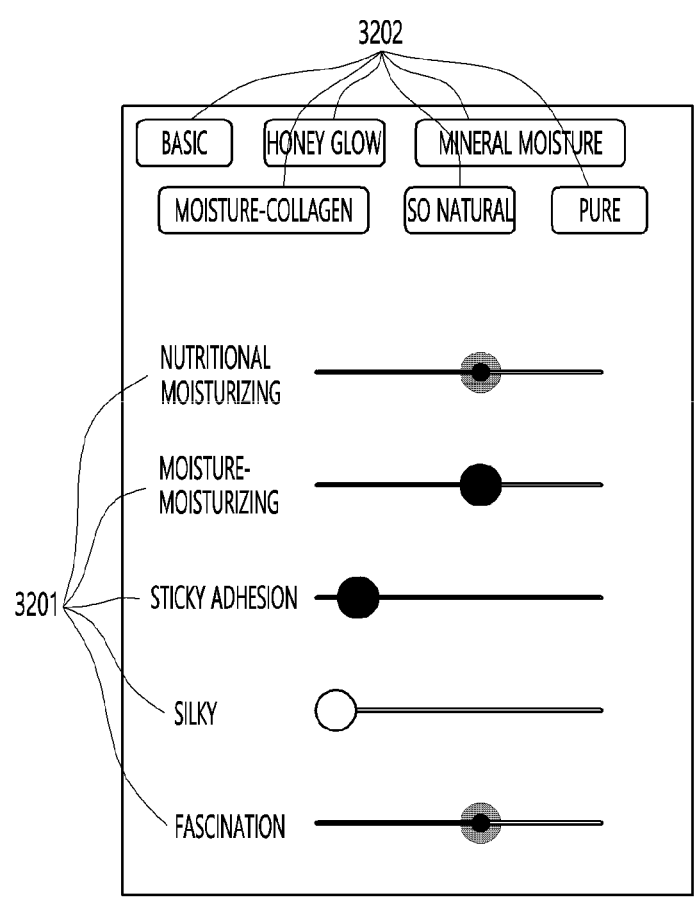
FIG. 32 is a view illustrating a third modified example of the texture selection icon according to the embodiment of the present disclosure.

FIG. 32 is a view illustrating a third modified example of the texture selection icon according to the embodiment of the present disclosure.

The display unit 206 may display an icon 3201 for which the texture type is selected as a slide bar.

When the total amount of the cosmetic composition that determines the texture is determined, the controller 210 may divide the total amount of the cosmetic composition by a ratio determined according to the slide bar to adjust the amount of the cosmetic material that determines each texture.

In this case, since the user may determine the texture as desired without worrying about the total discharge amount, there is an advantage of providing convenience of use.

In addition, the display unit 206 may further display a basic setting icon 3202, and the controller 210 may automatically adjust the slide bar when the basic setting icon 3202 is selected.

In this case, there is an advantage that it is possible to minimize the difficulty in determining the texture that the user may experience.

Figure 33:
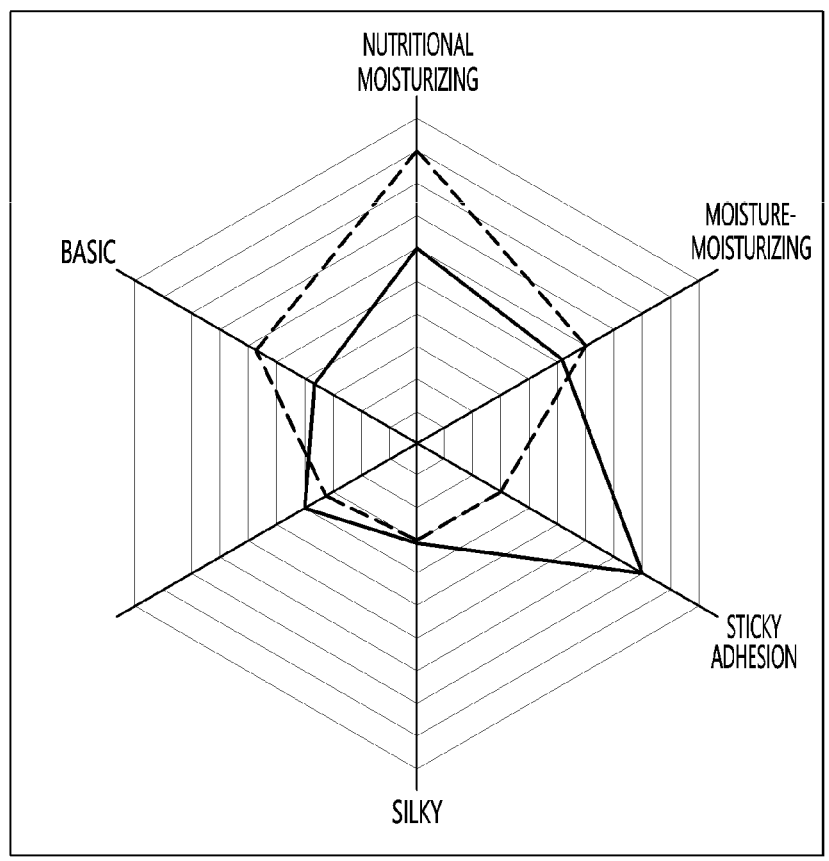
FIG. 33 is a view illustrating a fourth modified example of the texture selection icon according to the embodiment of the present disclosure.

FIG. 33 is a view illustrating a fourth modified example of the texture selection icon according to the embodiment of the present disclosure.

The display unit 206 may display an icon for which the texture type is selected as a radial icon as shown in FIG. 32.

When an amount of a cosmetic material indicating one texture is reduced, the controller 210 may reduce an amount of a cosmetic material indicating the other texture.

Therefore, since the user may determine the texture as desired without worrying about the total discharge amount, there is an advantage of providing convenience of use.

Figure 34:
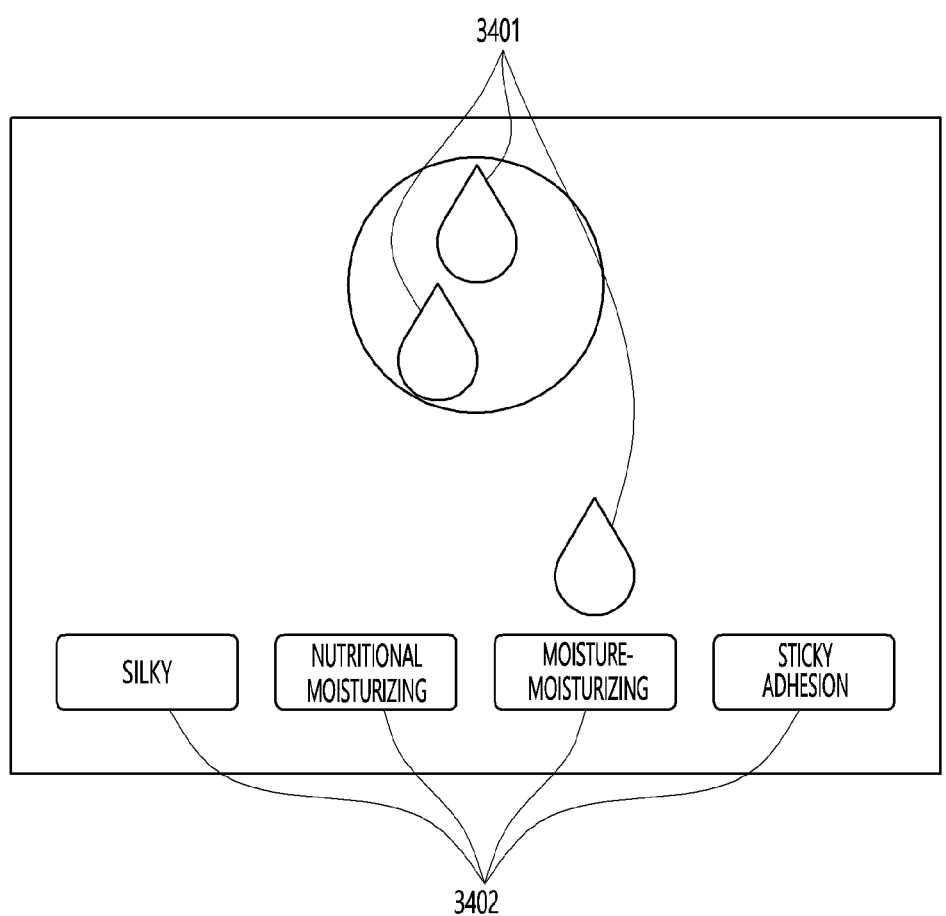
FIG. 34 is a view illustrating a fifth modified example of the texture selection icon according to the embodiment of the present disclosure.

FIG. 34 is a view illustrating a fifth modified example of the texture selection icon according to the embodiment of the present disclosure.

According to an embodiment, when cosmetics are manufactured, the total discharge amount of the cosmetic composition that determines the texture may be determined.

The display unit 206 may display a predetermined number of icons 3401 and icons 3402 indicating the texture.

The controller 210 may receive a command for distributing each of the predetermined number of icons 3401 to the icons 3402 indicating the texture.

FIG. 35 is a view illustrating a sixth modified example of the texture selection icon according to the embodiment of the present disclosure.

The display unit 206 may display a '−' icon and a '+' icon on each of the icons indicating the texture. The controller 210 may select an amount of a cosmetic material that determines the texture through the '−' icon and the '+' icon.

Figure 36:
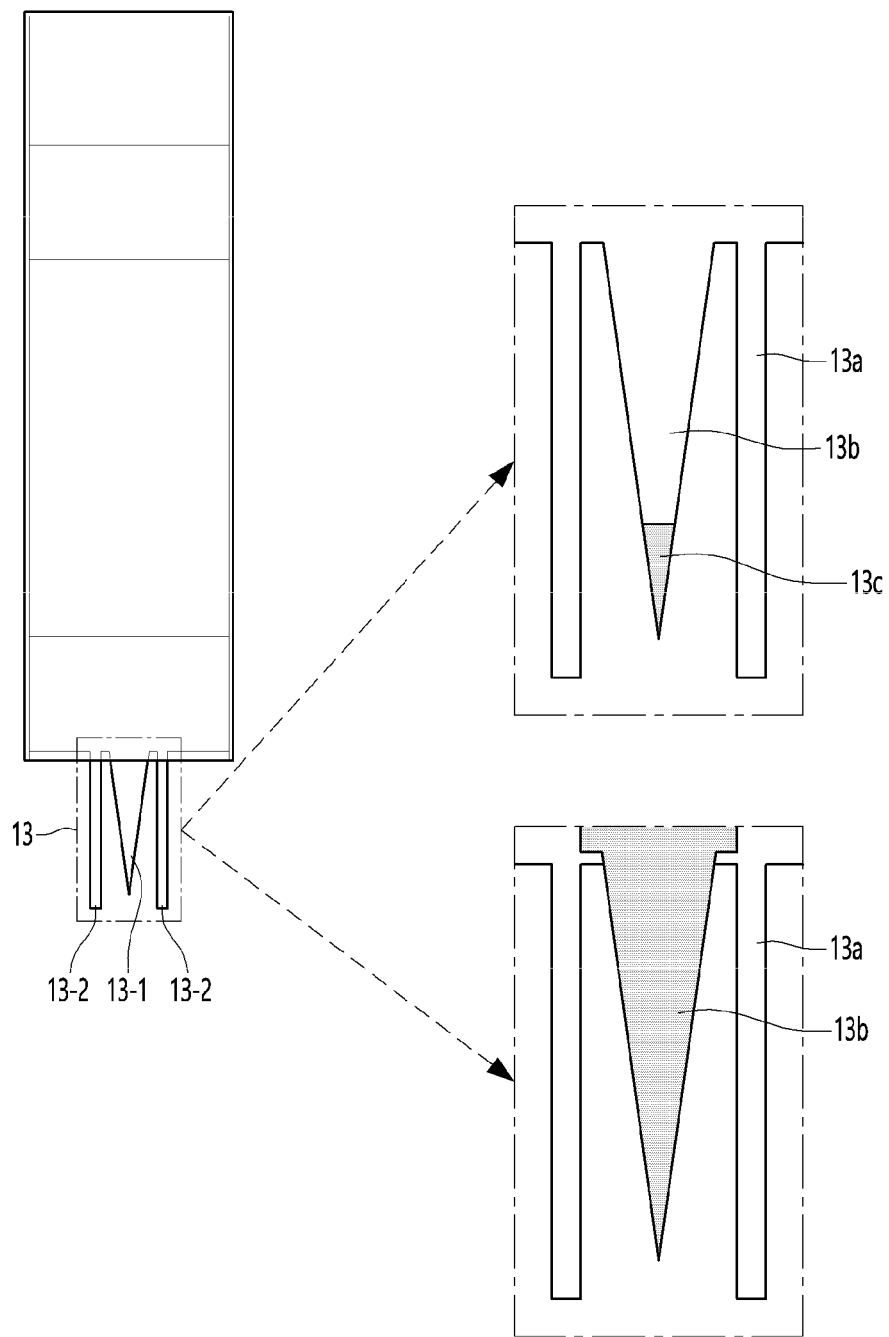
FIG. 36 is a view illustrating a modified example of a nozzle part according to an embodiment of the present disclosure.

Next, FIG. 36 is a view illustrating a modified example of a nozzle part according to an embodiment of the present disclosure.

The nozzle part 13 of the cartridge 11 according to the embodiment of the present disclosure may include a nozzle 13-1 that is a passage for the cosmetic composition and a nozzle guide 13-2 that surrounds the nozzle 13-1.

A length of the nozzle guide 13-2 may be greater than or equal to a length of the nozzle 13-1. Since the nozzle guide 13-2 surrounds the nozzle 13-1, it is possible to prevent a case in which the cosmetic composition at a tip of the nozzle 13-1 falls on or adhere to other components.

In addition, the nozzle guide 13-2 may minimize a case in which the nozzle 13-1 is damaged while colliding with other components.

That is, the nozzle guide 13-2 may minimize contamination to protect the nozzle 13-1.

Meanwhile, the nozzle part 13 may have a double injection structure in which a nozzle guide 13*a* and a nozzle upper part 13*b* are a first piece, and a nozzle lower part 13*c* is a second piece. Alternatively, the nozzle part 13 may have a double injection structure in which the nozzle guide 13*a* is the first piece and a nozzle 13*b* is the second piece. Here, the first piece may be made of a material harder than that of the second piece.

The nozzle part 13 of the double injection structure as described above may be easily removed even when contents around the nozzle 13-1 are hardened because the nozzle 13-1 is soft, and. There is an advantage that it is possible to reduce manufacturing costs through double injection in which only necessary parts are manufactured as a soft piece.

Next, with reference to FIGS. 37 to 45, the container 51 for receiving the cosmetic composition and a method of mixing the container 51 will be described.

The container to be described later may be a container provided at the user position P3.

Figure 37:
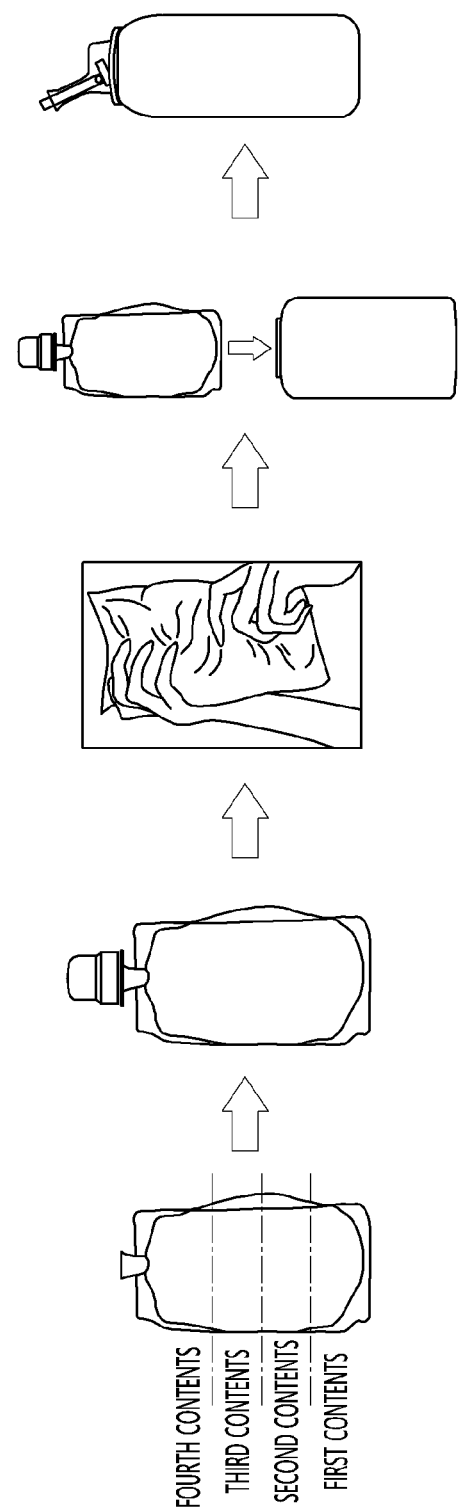
FIG. 37 is an exemplary view illustrating a container in which a cosmetic composition is accommodated and a method of mixing a cosmetic composition according to a first embodiment of the present disclosure.

FIG. 37 is an exemplary view illustrating a container in which a cosmetic composition is accommodated and a method of mixing a cosmetic composition according to the first embodiment of the present disclosure.

Referring to the example of FIG. 37, the container may be made of a material that may be wrinkled. For example, the container may be made of a vinyl material, but this is merely an example, and thus the present disclosure is not limited thereto.

1) The container may accommodate the cosmetic composition sequentially, and 2) When all the cosmetic composition is accommodated, the container may be closed by a cap.
3) The user may mix the cosmetic composition in the container using his/her hand after closing the container accommodating all the cosmetic compositions by the cap.
4) The cap of the container may be replaced with a pump, and the container itself replaced with the pump may be accommodated in a pouch.
5) The user may use the cosmetics through the pouch.

Figure 38:
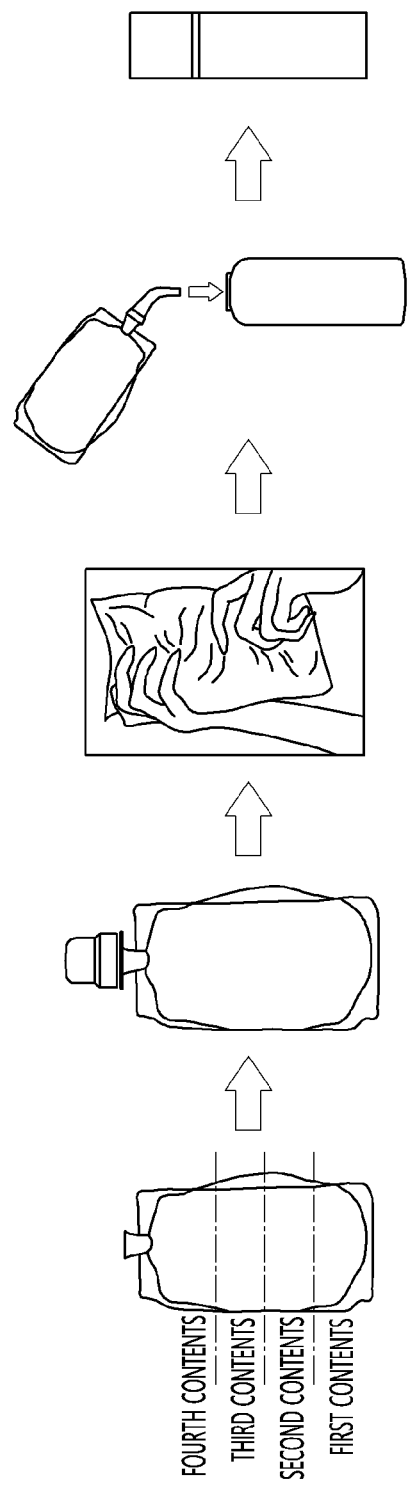
FIG. 38 is an exemplary view illustrating a container in which a cosmetic composition is accommodated and a method of mixing a cosmetic composition according to a second embodiment of the present disclosure.

FIG. 38 is an exemplary view illustrating a container in which a cosmetic composition is accommodated and a method of mixing a cosmetic composition according to the second embodiment of the present disclosure.

Referring to the example of FIG. 38, the container may be made of a material that may be wrinkled. For example, the container may be made of a vinyl material, but this is merely an example, and thus the present disclosure is not limited thereto.

1) The container may accommodate the cosmetic composition sequentially, and
2) When all the cosmetic composition is accommodated, the container may be closed by the cap.
3) The user may mix the cosmetic composition in the container using his/her hand after closing the container accommodating all the cosmetic compositions by the cap.
4) Contents of the container in which an internal cosmetic composition is mixed may be accommodated in a container made of plastic or glass material. In this case, a static mixing nozzle may be used.
5) Cosmetics may be used through the plastic or glass container accommodating the contents.

Figure 39:
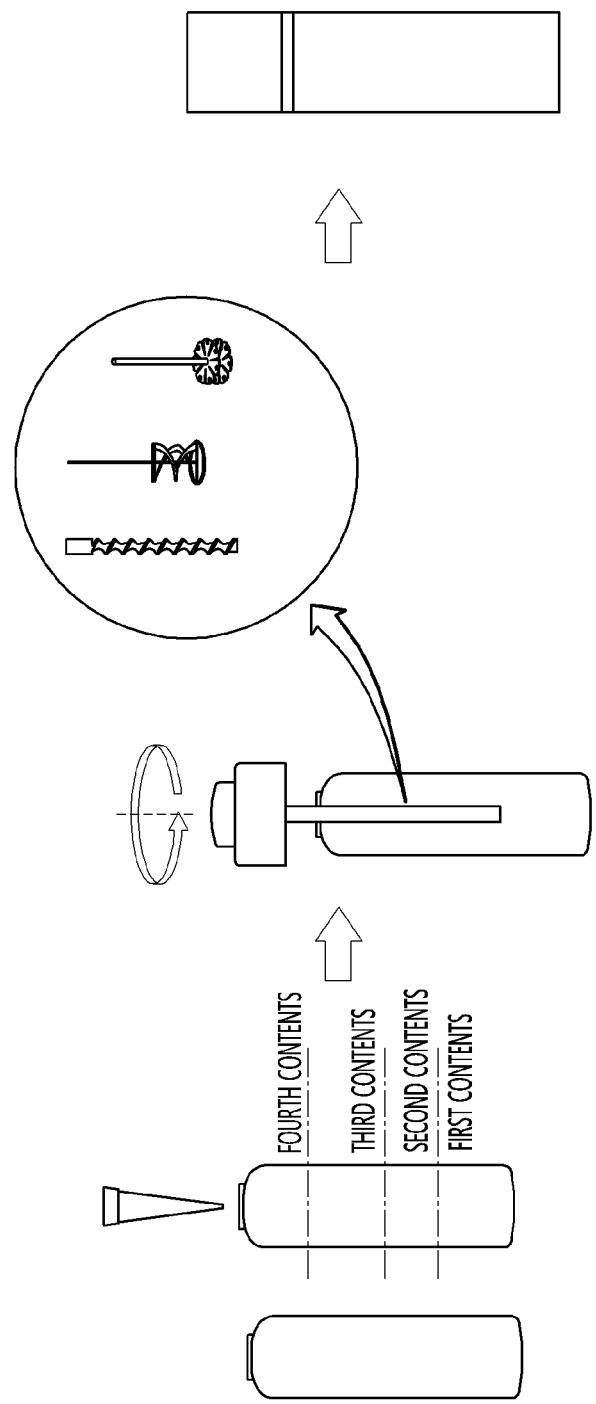
FIG. 39 is an exemplary view illustrating a container in which a cosmetic composition is accommodated and a method of mixing a cosmetic composition according to a third embodiment of the present disclosure.

FIG. 39 is an exemplary view illustrating a container in which a cosmetic composition is accommodated and a method of mixing a cosmetic composition according to a third embodiment of the present disclosure.

1) The container may accommodate the cosmetic composition sequentially. In this case, the container may be made of a plastic or glass material.
2) The cosmetic composition inside the container may be mixed by a tube pump equipped with a small rotating machine.
3) The container in which the cosmetic composition is mixed may be opened and closed by the cap, and the user may use the cosmetics through the container in which the cosmetic composition is mixed.

Figure 40:
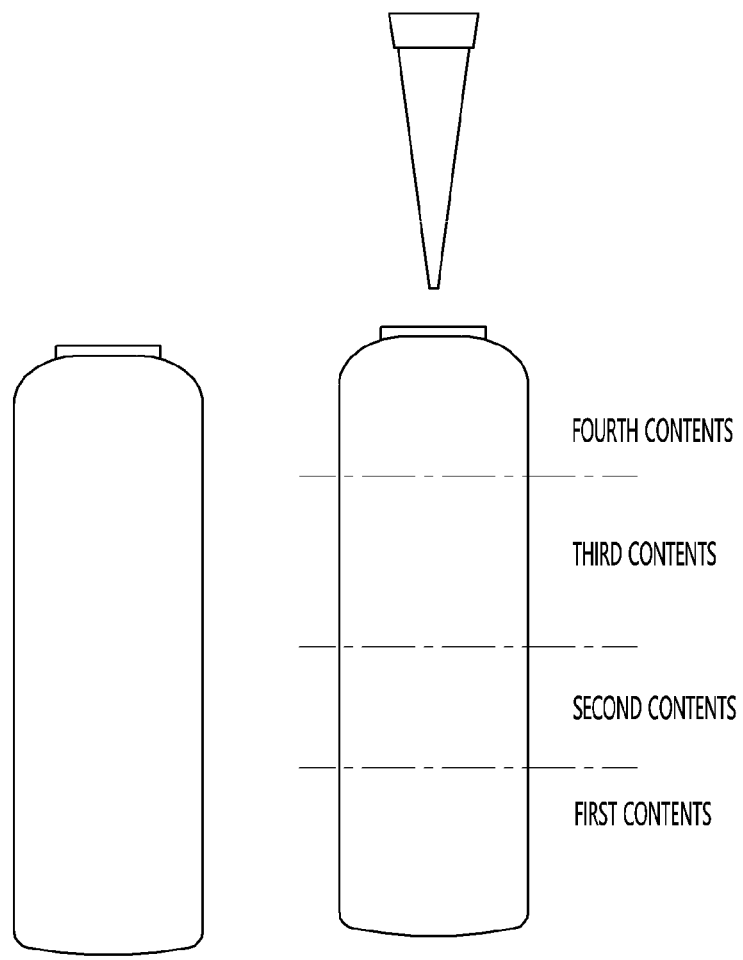
FIG. 40 is an exemplary view illustrating a container in which a cosmetic composition is accommodated and a method of mixing a cosmetic composition according to a fourth embodiment of the present disclosure.

FIG. 40 is an exemplary view illustrating a container in which a cosmetic composition is accommodated and a method of mixing a cosmetic composition according to a fourth embodiment of the present disclosure.

The container may accommodate the cosmetic composition sequentially. When there are a plurality of target cartridges for discharging the cosmetic composition according to the discharge information, the cosmetic manufacturing device 1 may sequentially discharge the cosmetic composition to the container from each of the plurality of target cartridges.

For example, when the target cartridge is first to fourth cartridges, the cosmetic manufacturing device 1 may discharge the cosmetic composition from the first cartridge, discharge the cosmetic composition from the second cartridge, discharge the cosmetic composition from the third cartridge, and discharge the cosmetic composition from the fourth cartridge.

Meanwhile, the cosmetic manufacturing device 1 may set a discharge order of the cosmetic composition according to a viscosity of the cosmetic composition included in each cartridge. Specifically, when there are the plurality of target cartridges for discharging the cosmetic composition according to the discharge information, the cosmetic manufacturing device 1 may sequentially discharge the cosmetic composition from the cartridge accommodating a cosmetic composition with high viscosity.

For example, in the cosmetic manufacturing device 1, the target cartridge is the first to fourth cartridges, when the viscosity of the cosmetic composition accommodated in the first cartridge is the highest, the viscosity of the cosmetic composition accommodated in the second cartridge is the largest, the viscosity of the cosmetic composition accommodated in the third cartridge is large, and the viscosity of the cosmetic composition accommodated in the fourth cartridge is the lowest, the cosmetic composition may be discharged from the first cartridge, the cosmetic composition may be discharged from the second cartridge, the cosmetic composition may be discharged from the third cartridge, and the cosmetic composition may be discharged from the fourth cartridge.

In this case, the cosmetic composition discharged earlier has higher viscosity and may be vertically stacked rather than horizontally spread inside the container, and the cosmetic composition discharged later has lower viscosity and horizontally spreads, and thus the cosmetic composition discharged later mixes well with the cosmetic composition discharged earlier, there is an advantage that cosmetic compositions are well mixed without a separate mixing module.

Figure 41:
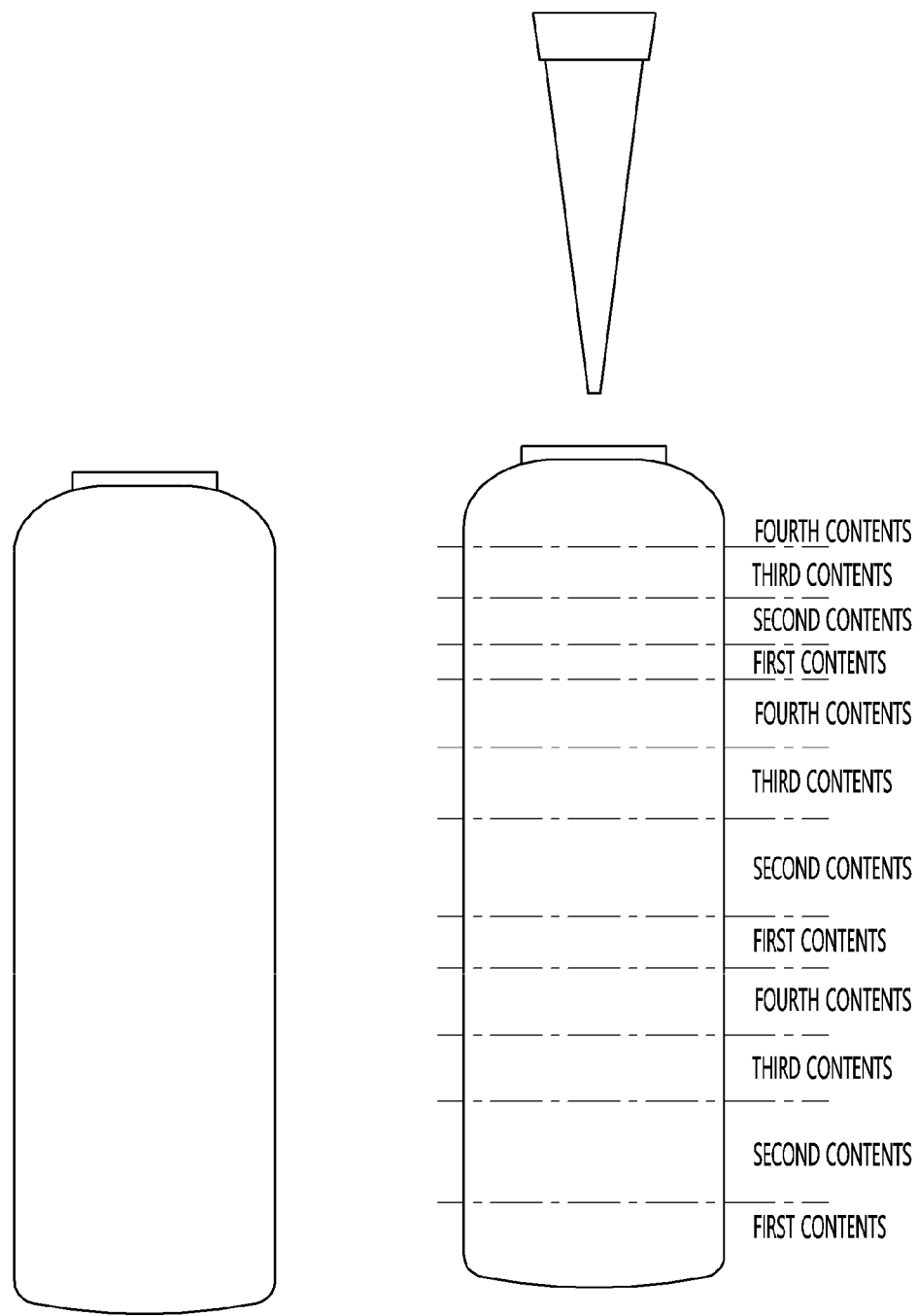
FIG. 41 is an exemplary view illustrating a container in which a cosmetic composition is accommodated and a method of mixing a cosmetic composition according to a fifth embodiment of the present disclosure.

FIG. 41 is an exemplary view illustrating a container in which a cosmetic composition is accommodated and a method of mixing a cosmetic composition according to a fifth embodiment of the present disclosure.

When there are the plurality of target cartridges for discharging the cosmetic composition according to the discharge information, the cosmetic manufacturing device 1 may repeatedly perform a small amount discharging operation of sequentially discharging a predetermined small amount of the cosmetic composition from each of the plurality of target cartridges.

Referring to the example of FIG. 41, when the target cartridge is the first to fourth cartridges, the cosmetic manufacturing device 1 may repeatedly perform a small amount discharging operation of discharging a predetermined small amount of the cosmetic composition from the first cartridge, discharging a predetermined small amount of the cosmetic composition from the second cartridge, discharging a predetermined small amount of the cosmetic composition from the third cartridge, and discharging a predetermined small amount of the cosmetic composition from the fourth cartridge. Here, the predetermined small amount may be smaller than the target discharge amount.

In this case, there is an advantage that the cosmetic composition in the container is automatically mixed without a separate operation for mixing.

Although not shown in the drawing, according to a sixth embodiment of the present disclosure, the container in which the cosmetic composition is accommodated may be mixed through a stirrer (not shown).

Meanwhile, according to a seventh embodiment of the present disclosure, the cosmetic composition in the container 51 may be mixed through a mixing device.

Figure 42:
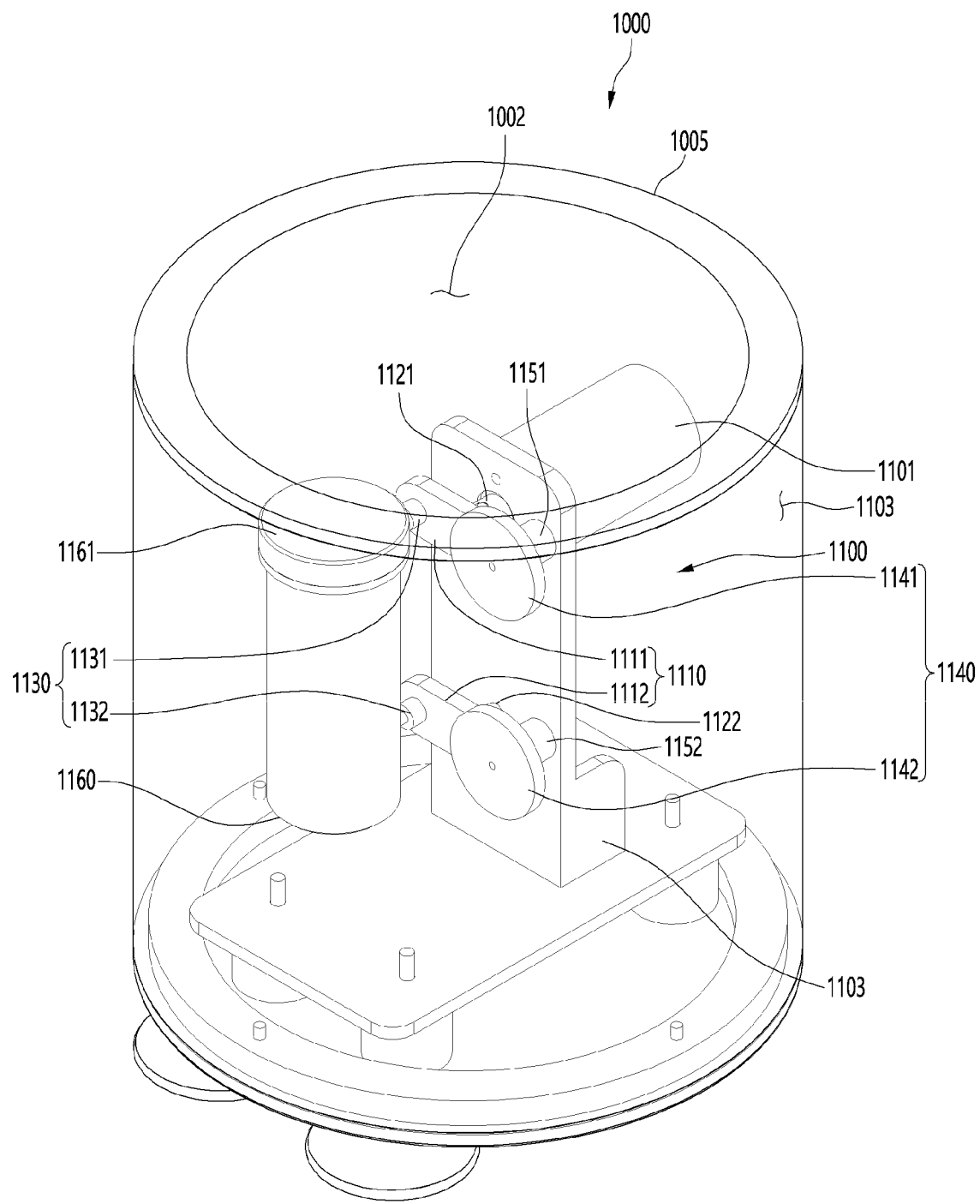
FIG. 42 is a perspective view illustrating a mixing device of a cosmetic manufacturing system according to the present disclosure.
Figure 43:
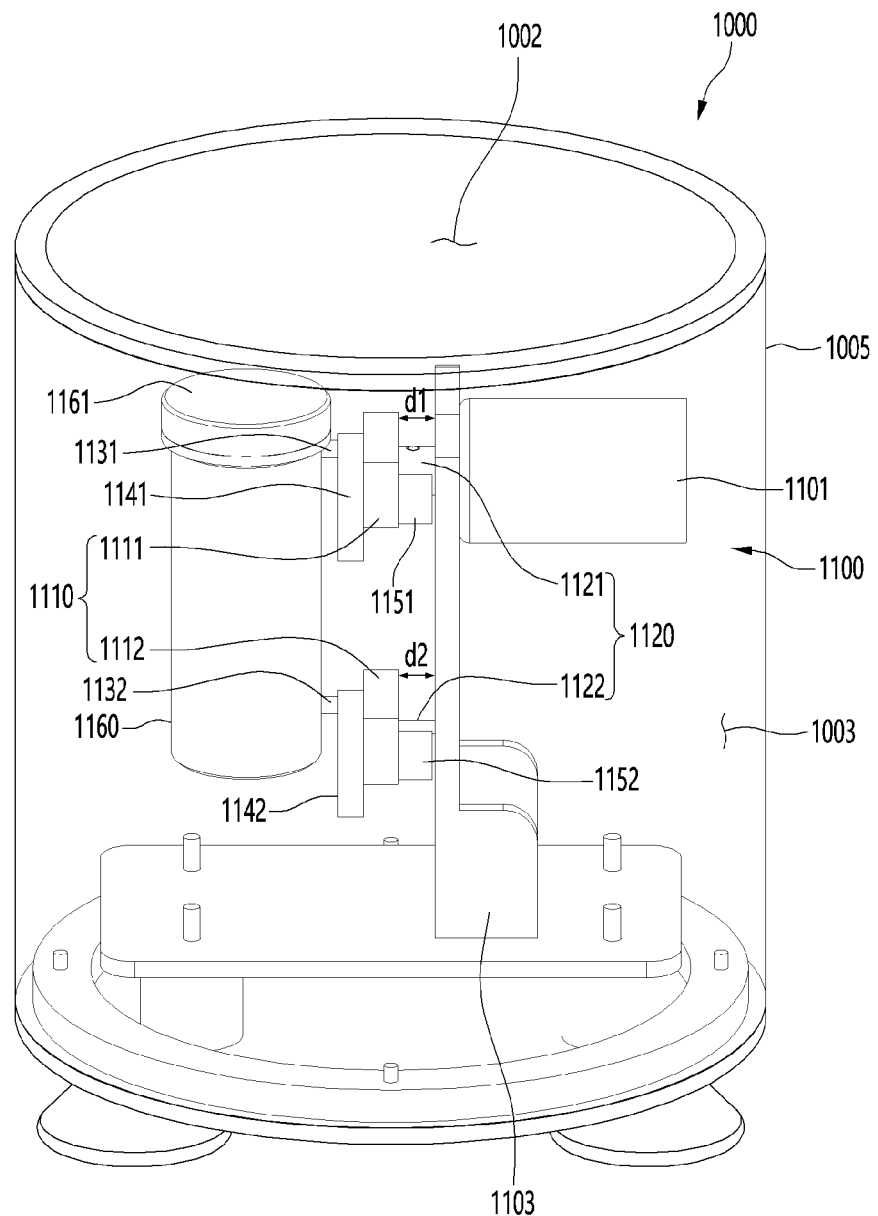
FIG. 43 is a side view illustrating the mixing device of the cosmetic manufacturing system according to the present disclosure.
Figure 44:
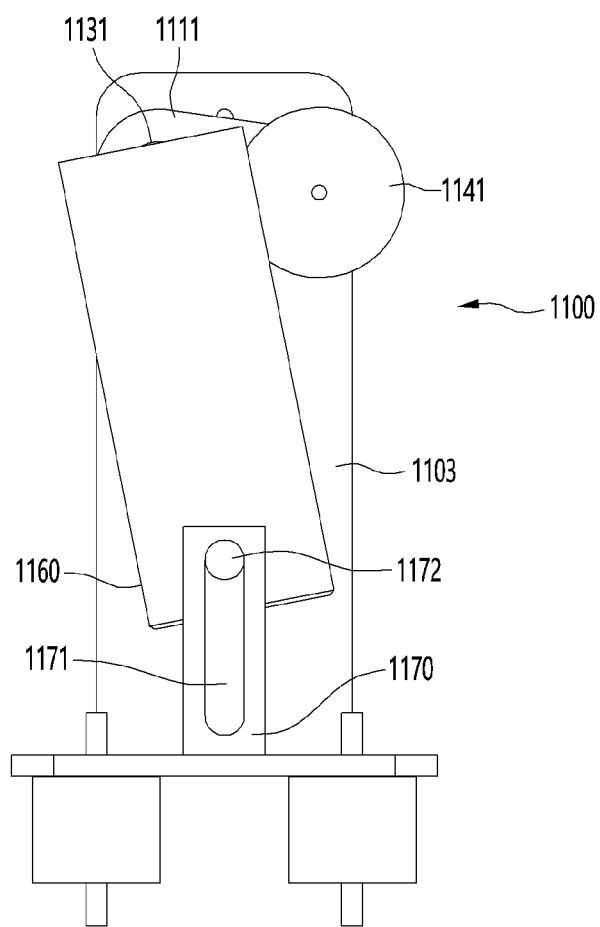
FIG. 44 is a view illustrating a second modified example of a mixing assembly shown in FIG. 42.
Figure 45:
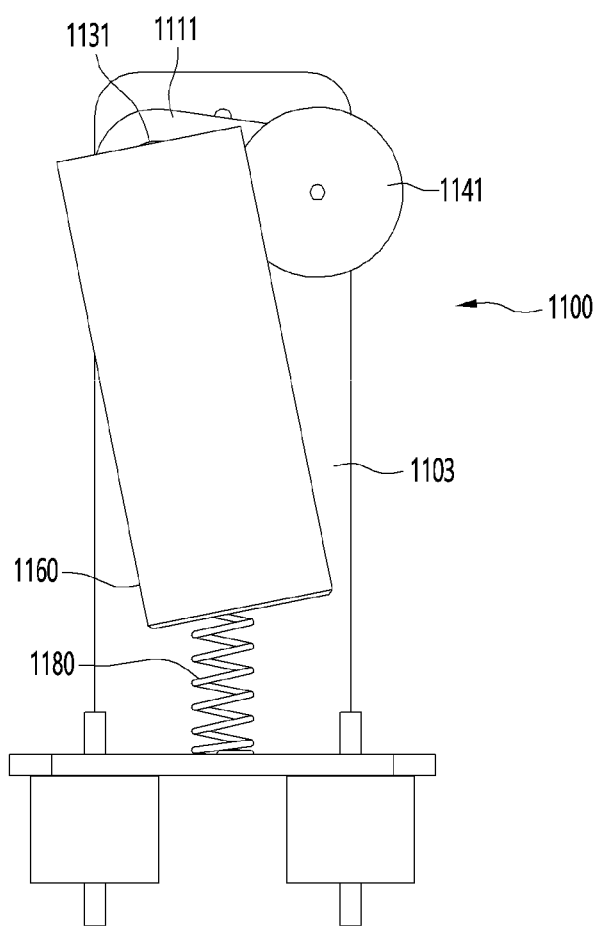
FIG. 45 is a view illustrating a third modified example of the mixing assembly shown in FIG. 42.

FIG. 42 is a perspective view illustrating a mixing device of a cosmetic manufacturing system according to the present disclosure, FIG. 43 is a side view illustrating the mixing device of the cosmetic manufacturing system according to the present disclosure, and FIG. 44 is a view illustrating a second modified example of a mixing assembly shown in FIG. 42, and FIG. 45 is a view illustrating a third modified example of the mixing assembly shown in FIG. 42.

The cosmetic manufacturing system may further include a mixing device 1000.

The mixing device 1000 may be a device for mixing the cosmetic composition in the container 51 provided through the cosmetic manufacturing device 1. That is, the mixing device 1000 may be a device for controlling the container 51 so that the cosmetic compositions discharged from the cosmetic manufacturing device 1 to the container 51 are well mixed in the container 51.

The mixing device 1000 may include a mixing assembly 1100 and a housing 1005 in which the mixing assembly 1100 is accommodated.

An accommodation space 1003 in which the mixing assembly 1100 is accommodated may be formed in the housing 1005.

In addition, an inlet 1002 through which the container 51 may enter and exit the inside of the housing 1005 may be formed on an upper surface of the housing 1005.

The accommodation space 1003 and the inlet 1002 may communicate in the vertical direction. The user may mount and remove the container 51 on and from the mixing assembly 1100 through the inlet 1002.

At least a portion of an outer surface of the housing 1005 may be transparent or translucent.

The mixing assembly 1100 may include at least some or all of a motor 1101, a rotation member 1110, a rotation shaft 1120, a fixing member 1130, a container accommodating part 1160, and a supporting member 1103.

The motor 1101 may provide a rotational force to the rotation member 1110 through the rotation shaft 1120.

The rotation member 1110 may rotate by receiving rotational force from the motor 1101. The rotation member 1110 may rotate in a clockwise or counterclockwise direction.

The fixing member 1130 may be connected to the rotation member 1110.

The fixing member 1130 may be connected between the rotation member 1110 and the container accommodating part 1160. The fixing member 1130 may fix the container accommodating part 1160 to the rotation member 1110.

The container accommodating part 1160 may be moved by rotation of the rotation member 1110. That is, the container accommodating part 1160 may rotate together with the rotation member 1110.

The container 51 may be accommodated in the container accommodating part 1160. The container accommodating part 1160 may have an accommodating part cap 1161 formed therein.

The accommodating part cap 1161 may prevent the cosmetic composition in the container 51 from splashing into the accommodating space 1003 by rotation of the container accommodating part 1160. That is, the accommodating part cap 1161 may block the container accommodating part 1160 and the accommodating space 1003.

The container 51 accommodated in the container accommodating part 1160 may rotate by rotation of the container accommodating part 1160, and accordingly, the cosmetic compositions in the container 51 may be mixed with each other.

Meanwhile, since the container 51 is accommodated in the container accommodating part 1160, the weight may be considerable, and for this reason, the fixing member 1130 or the rotation member 1110 connected to the container accommodating part 1160 may be damaged. Therefore, the mixing assembly 1100 may further include a balancing member 1140 for weight balancing of the rotation member 1110.

The balancing member 1140 may be further connected to the rotation member 1110.

For example, the fixing member 1130 may be connected to one end of the rotation member 1110, and the balancing member 1140 may be connected to the other end of the rotation member 1110. That is, the fixing member 1130 and the balancing member 1140 may be connected in an opposite direction based on a center of the rotation member 1110.

The balancing member 1140 may be connected to the rotation member 1110 by connection members 1151 and 1152.

The support member 1103 may support the mixing assembly 1100. The supporting member 1103 may support at least some or all of the motor 1101, the rotation member 1110, the rotation shaft 1120, the fixing member 1130, and the container accommodating part 1160.

Meanwhile, when the container accommodating part 1160 is rotated, each of upper and lower sides thereof may be fixed to the rotation member 1110 so that vibration of the container accommodating part 1160 itself is minimized. To this end, the fixing member 1130 may include an upper fixing member 1131 and a lower fixing member 1132 connected to the upper side of the container accommodating part 1160, the rotation member 1110 may include an upper rotation member 1111 connected to the upper fixing member 1131 and a lower rotation member 1112 connected to the lower fixing member 1132, the rotation shaft 1120 may include an upper rotation shaft 1121 connected to the upper rotation member 1111 and a lower rotation shaft 1122 connected to the lower rotation member 1112, the balancing member 1140 may include an upper balancing member 1141 connected to the upper rotation member 1111 and a lower balancing member 1142 connected to the lower rotation member 111. The connection members 1151 and 1152 may include an upper connection member 1151 for fixing the upper balancing member 1141 to the upper rotation member 1111 and a lower connection member 1152 for fixing the lower balancing member 1142 to the lower rotation member 1112.

In addition, a length d1 of the upper rotation shaft 1121 and a length d2 of the lower rotation shaft 1122 may be the same. Meanwhile, according to another embodiment, the length d1 of the upper rotation shaft 1121 and the length d2 of the lower rotation shaft 1122 may be different, which will be described with reference to the first modified example below.

As such, when the upper and lower sides of the container accommodating part 1160 are respectively supported by the rotation support member 1103, the durability of the mixing assembly 1100 may be improved.

Meanwhile, the mixing assembly 1100 may be deformed in various forms.

Next, a first modified example of the mixing assembly 1100 will be described.

According to the first modified example, the length d1 of the upper rotation shaft 1121 and the length d2 of the lower rotation shaft 1122 in the mixing assembly 1100 may be different from each other. For example, the length d1 of the upper rotation shaft 1121 may be greater than the length d2 of the lower rotation shaft 1122, or, conversely, the length d1 of the upper rotation shaft 1121 may be smaller than the length d2 of the lower rotation shaft 1122.

As such, when the length d1 of the upper rotational shaft 1121 and the length d2 of the lower rotational shaft 1122 are different from each other, the container accommodating part 1160 may be connected to the rotational member 1110 while being inclined, and when the container accommodating part 1160 rotates in the inclined state, the cosmetic compositions in the container 51 move in more various angles and directions, and thus there is an advantage of mixing better.

Meanwhile, in the first modified example, the remaining configurations except for the relationship between the length d1 of the upper rotational shaft 1121 and the length d2 of the lower rotational shaft 1122 are the same as described above.

Next, a second modified example of the mixing assembly 1100 will be described.

According to the second modified example, the upper side of the container accommodating part 1160 may be connected to the upper rotation member 1111 through the upper fixing member 1131 as described above. Therefore, the container accommodating part 1160 may be moved by the upper rotation member 1111 rotating by the rotational force transmitted through the upper rotation shaft 1121.

Meanwhile, the mixing assembly 1100 according to the second modified example may not include the lower fixing member 1132, the lower rotation member 1112, the lower balancing member 1142, the lower rotation shaft 1122, and the lower connection member 1152. Instead, the mixing assembly 1100 according to the second modified example may further include a guide rail 1170.

The guide rail 1170 may be connected to the lower side of the container accommodating part 1160 and may guide the lower side of the container accommodating part 1160 in the vertical direction.

The guide rail 1170 may be formed with a guide part 1172 connected to the lower side of the container accommodating part 1160 and a rail part 1171 for guiding the guide part 1172 in the vertical direction.

In this case, the upper side of the container accommodating part 1160 is rotated by the motor 1101, and when the upper side of the container accommodating part 1160 rotates, the lower side of the container accommodating part 1160 may move up and down in a direction in which the rail part 1171 guides.

Accordingly, the container accommodating part 1160 has the advantage that the cosmetic compositions in the container 51 are well mixed because the upper and lower sides of the container accommodating part 1160 are stably supported and move in the vertical and horizontal directions. Specifically, the container accommodating part 1160 may be inclined in the first direction when the guide part 1172 moves from top to bottom and may be inclined in the second direction when the guide part 1172 moves from bottom to top, and accordingly, the cosmetic composition in the container 51 moves in all directions, and thus there is an advantage of better mixing.

Next, a third modified example of the mixing assembly 1100 will be described.

According to the third modified example, the upper side of the container accommodating part 1160 may be connected to the upper rotation member 1111 through the upper fixing member 1131 as described above. Therefore, the container accommodating part 1160 may be moved by the upper rotation member 1111 rotating by the rotational force transmitted through the upper rotation shaft 1121.

Meanwhile, the mixing assembly 1100 according to the third modified example may not include the lower fixing member 1132, the lower rotation member 1112, the lower balancing member 1142, the lower rotation shaft 1122, and the lower connection member 1152. Instead, the mixing assembly 1100 according to the third modified example may further include a spring member 1180.

The spring member 1180 may be connected to the lower side of the container accommodating part 1160 to support the container accommodating part 1160. In addition, the spring member 1180 may guide the lower side of the container accommodating part 1160 in various directions.

In this case, the upper side of the container accommodating part 1160 is rotated by the motor 1101, and when the upper side of the container accommodating part 1160 rotates, the lower side of the container accommodating part 1160 may be moved by the spring member 1180 in various directions.

Accordingly, the container accommodating part 1160 has an advantage that the cosmetic compositions in the container 51 are well mixed because the upper and lower sides of the container accommodating part 1160 are stably supported and the lower side of the container accommodating part 1160 moves in various directions.

Next, a modified example of the cosmetic manufacturing device 1 will be described with reference to FIGS. 46 to 47.

Figure 46:
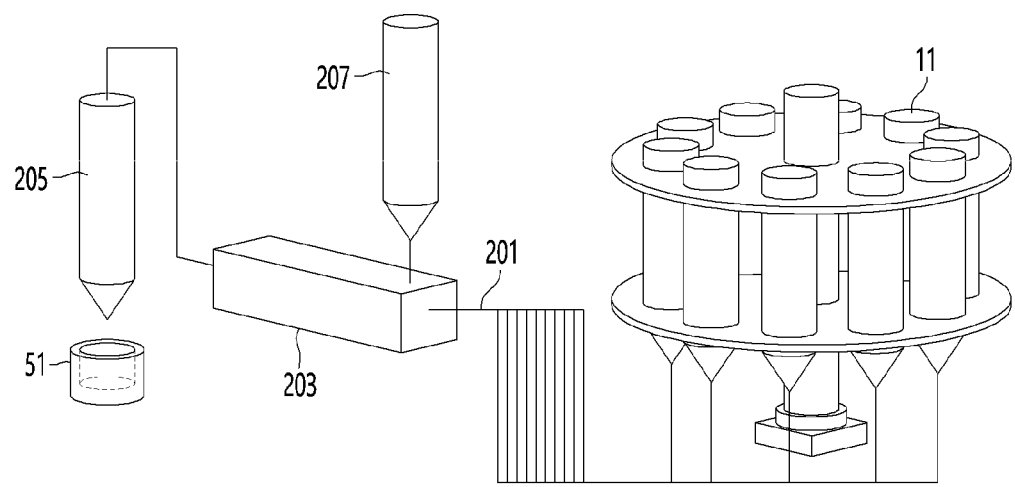
FIG. 46 is a view illustrating a first modified example of a cosmetic manufacturing device according to an embodiment of the present disclosure.

FIG. 46 is a view illustrating a first modified example of a cosmetic manufacturing device according to an embodiment of the present disclosure.

According to the first modified example, the cosmetic manufacturing device 1 may further include a passage 201 through which the cosmetic composition discharged from the plurality of cartridges 11 passes, a mixing module 203 in which the cosmetic composition passing through the passage 201 is mixed, a dispenser 205 for discharging the cosmetics mixed in the mixing module 203 to the container 51, and a cleaning module 207.

In this case, the cosmetic manufacturing device 1 may discharge the cosmetic composition from at least one of the plurality of cartridges 11 according to the discharge information, and the discharged cosmetic composition and the cosmetic composition passing through passes through the passage 201 may be mixed in the mixing module 203. The dispenser 205 may discharge the cosmetic composition mixed in the mixing module 203 into the container 51. The container 51 may accommodate the cosmetic composition mixed by the mixing module 203.

After discharging the cosmetic composition mixed in the mixing module 203 into the container 51, the cleaning module 207 may apply pressure or inject a cleaning solution to remove the cosmetic composition left in the mixing module 203.

Figure 47:
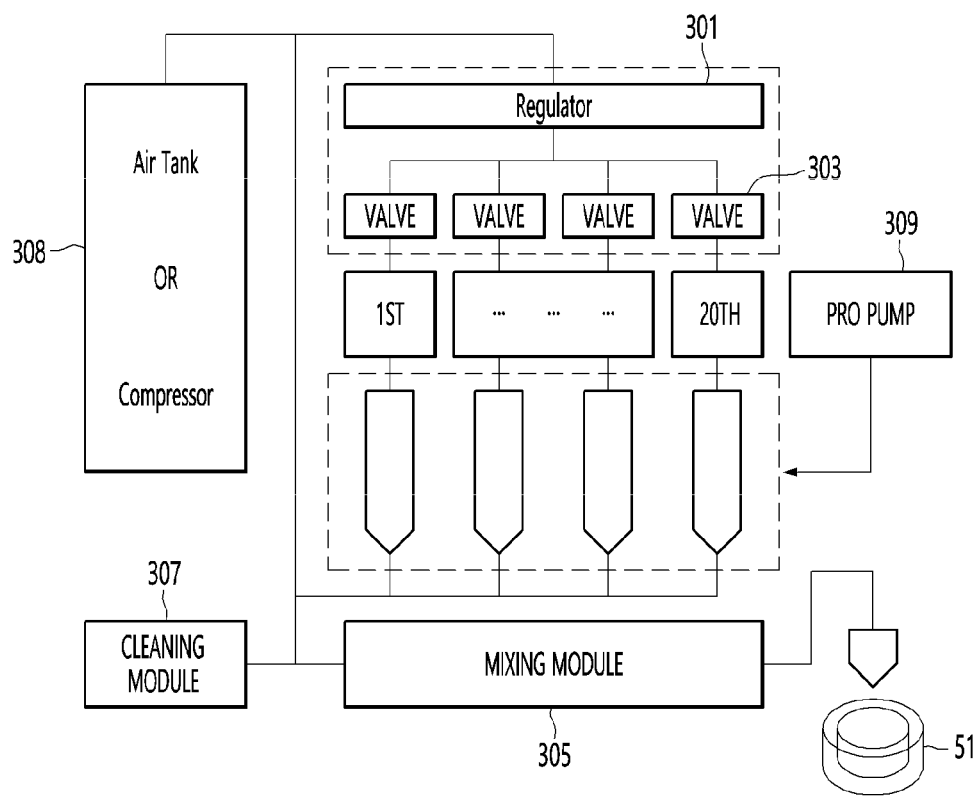
FIG. 47 is a view illustrating a second modified example of the cosmetic manufacturing device according to the embodiment of the present disclosure.

FIG. 47 is a view illustrating a second modified example of the cosmetic manufacturing device according the embodiment of the present disclosure.

According to the second modified example, the cosmetic manufacturing device 1 may include at least some or all of a regulator 301 and a valve 303 for discharging the cosmetic composition from the plurality of cartridges 11, a mixing module 305, a cleaning module 307, air the tank 308, and a pro pump 309.

According to an embodiment, the cosmetic manufacturing device 1 may control the regulator 301 and the valve 303 to discharge the cosmetic composition according to the discharge information. The cosmetic composition discharged from the cartridge 11 by the regulator 301 and the valve 303 may pass through the mixing module 305, and the cosmetic composition mixed in the mixing module 305 may be accommodated in the container 51. After the mixture mixed in the mixing module 305 is accommodated in the container 51, the cleaning module 307 may apply pressure or inject a cleaning solution to remove the cosmetic composition left in the mixing module 305.

According to another embodiment, in the cosmetic manufacturing device 1, the air tank 308 may apply pneumatic pressure for movement of the cosmetic composition. The air tank 308 may be a compressor. After discharging the cosmetic composition in a fixed amount through the pro pump 309, the discharged cosmetic composition may be mixed in the mixing module 305 and accommodated in the container 51. After the mixture mixed in the mixing module 305 is accommodated in the container 51, the cleaning module 307 may apply pressure or inject a cleaning solution to remove the cosmetic composition left in the mixing module 305.

Meanwhile, the cosmetic manufacturing device 1 according to the present disclosure may determine the discharge information in the following method in order to manufacture cosmetics so that each color, coverage level, and texture meet the user's preference.

FIG. 48 is a flowchart illustrating a method in which the cosmetic manufacturing device according to the present disclosure determines the discharge information.

The controller 150 may determine whether a barcode is input (S201).

The barcode may be a code including the discharge information. For example, the barcode may consist of at least one letter, at least one number, or a combination of at least one letter and number. The controller 150 may receive the barcode input through the barcode reader 136.

For example, the barcode may be attached to the container 51. The controller 150 may receive the barcode attached to the container 51.

Such a barcode may be a barcode generated when a user previously manufactured the cosmetics. To this end, the controller 150 may generate the barcode including the discharge information. In this case, When the user wants to use the manufactured cosmetic again after using use the manufactured cosmetic, there is an advantage that the cosmetics may be easily manufactured using only the barcode. That is, the user may more conveniently order the same product later through the barcode. Meanwhile, this is merely an example, and a method of generating the barcode, an attachment position of the barcode, and the like may vary.

When the barcode is input, the controller 150 may determine the discharge information according to the barcode (S203).

That is, when the barcode is input, the controller 150 may determine the discharge information based on information read from the barcode.

Meanwhile, when the barcode is not input, the controller 150 may determine a target color (S205), determine a coverage level (S207), and determine a texture (S209).

Each of the target color, the coverage level, or the texture may be received from the terminal 2 or may be input through the input unit 112.

The controller 150 may determine the target color, the coverage level, and the texture based on information received from the terminal 2 or information input through the input unit 112.

Next, an example of receiving the target color through the input unit 112 will be described with reference to FIG. 49.

FIG. 49 is a view for describing an example of a method of determining a target color by the cosmetic manufacturing device according to the present disclosure.

The display 111 may display a color table as shown in FIG. 49. In the FIG. 49, color types are limited to 45 types, but this is merely an example. A gradation may be applied between colors displayed on the color table.

Each of A, B, C, and D may be expressed as an RGB color value, but the RGB color value is merely an example. Hereinafter, for convenience of description, it is assumed that RGB color value is expressed.

The user may select any one color from the color table. According to an embodiment, when the controller 150 receives an input for selecting one of the color tables through the input unit 112, an RGB color value of T which is the target color may be calculated through (A*a)+(B*b)/(a+b). In this case, a and b may refer to a weighted value. For example, a may represent a distance between A and T in the color table, and b may represent a distance between B and T in the color table, but this is merely an example.

According to another embodiment, when the controller 150 receives an input for selecting one of the color table through the input unit 112, the RGB color value of T which is the target color may be calculated through (A*a)+(B*b)+(C*c)+(D*d)/(a+b+c+d). In this case, a, b, c, and d may refer to a weight. As an example, a may represent the distance between A and T in the color table, b may represent the distance between B and T in the color table, c may represent a distance between C and T in the color table, and d may represent a distance between D and T in the color table, but this is merely an example. As another example, at least one of a, b, c, and d may be a weight determined by the user's skin color, the user's skin condition, and the like, but similarly, this is merely an example.

As such, the controller 150 may determine the target color through a calculation formula. When the target color is determined in this way, there is an advantage that the user's preferred color may be more accurately acquired as the target color even when there are many types of colors.

Again, FIG. 48 will be described.

The controller 150 may determine the discharge information based on the target color, the coverage level, and the texture (S211).

Hereinafter, a method in which the controller 150 determines the discharge information based on the target color, the coverage level, and the texture will be described in detail.

First, the controller 150 may select at least one of the plurality of cartridges as the target cartridge for discharging the cosmetic material.

At this time, the plurality of cartridges may include a plurality of cartridges for determining the color and a plurality of cartridges for determining the texture. Referring to FIG. 23, the plurality of cartridges for determining the color may be composed of cartridges of a first group for a first coverage level, cartridges of a second group for a second coverage level, and cartridges of a third group for a third coverage level.

The first coverage level may refer to a high coverage level, and the cartridges of the first group may include A cartridge representing color A, B cartridge representing color B, C cartridge representing color C, D cartridge representing color D, and E cartridge representing color E.

The second coverage level may refer to medium coverage, and the cartridges of the second group may include F cartridge representing color F, G cartridge representing color G, H cartridge representing color H, I cartridge representing color I, and J cartridge representing color J.

The third coverage may refer to low coverage, and the cartridges of the third group may include K cartridge representing color K, L cartridge representing color L, M cartridge representing color M, N cartridge representing color N, and O cartridge representing color O.

In this case, the color A, the color F, and the color K may be the same. Hereinafter, it is assumed that the color A, the color F, and the color K are a first color (e.g., pink), respectively. However, a content of titanium dioxide contained in the cosmetic material in the A cartridge representing the color A, a content of titanium dioxide contained in the cosmetic material in the F cartridge representing the color F, and a content of titanium dioxide contained in the cosmetic material in the K cartridge representing the color K may be different from each other.

Similarly, the color B, the color G, and the color L may be the same. Hereinafter, it is assumed that the color B, the color G, and the color L are a second color (e.g., yellow), respectively. However, a content of titanium dioxide contained in the cosmetic material in the B cartridge representing the color B, a content of titanium dioxide contained in the cosmetic material in the G cartridge representing the color G, and a content of titanium dioxide contained in the cosmetic material in the L cartridge representing the color L may be different from each other.

The color C, the color H, and the color M may be the same. Hereinafter, it is assumed that the color C, the color H, and the color M are a third color (e.g., dark pink), respectively. However, a content of titanium dioxide contained in the cosmetic material in the C cartridge representing the color C, a content of titanium dioxide contained in the cosmetic material in the H cartridge representing the color H, and a content of titanium dioxide contained in the cosmetic material in the M cartridge representing the color M may be different from each other.

The color D, the color I, and the color N may be the same. Hereinafter, it is assumed that the color D, the color I, and the color N are a fourth color (e.g., dark yellow), respectively. However, a content of titanium dioxide contained in the cosmetic material in the D cartridge representing the color D, a content of titanium dioxide contained in the cosmetic material in the I cartridge representing the color I, and a content of titanium dioxide contained in the cosmetic material in the N cartridge representing the color N may be different from each other.

The color E, the color J, and the color O may be the same. Hereinafter, it is assumed that the color E, the color J, and the color O are a fifteenth color (e.g., beige). However, a content of titanium dioxide contained in the cosmetic material in the E cartridge representing the color E, a content of titanium dioxide contained in the cosmetic material in the J cartridge representing the color J, and a content of titanium dioxide contained in the cosmetic material in the O cartridge representing the color O may be different from each other.

Here, titanium dioxide ($TiO_2$) is a white powder and may determine the coverage level.

In addition, the cartridge for determining the color may contain a pigment for representing a color in addition to titanium dioxide. The cartridge for determining the color may contain different contents of red iron oxide, yellow iron oxide, black iron oxide, or the like depending on the color to be expressed.

Therefore, the controller 150 may determine the target cartridge so that the cartridge for discharging the cosmetic material is different according to the coverage level even when the target color is the same. For example, the controller 150 may select the target cartridge from the cartridges of the first group when the coverage level is determined to be the high coverage level even though the target color is the same, select the target cartridge from the cartridges of the second group when the coverage level is determined to be the medium coverage level, and select the target cartridge from the cartridges of the third group when the coverage level is determined to be the low coverage level. That is, even when the target color is the same, the controller 150 may select any one of the first to third groups according to the determined coverage level and select the target cartridge according to the target color determined within the selected group.

As such, when the target cartridge is selected from within a group having the same coverage level, there is an advantage that the possibility of manufacturing cosmetics according to the target color is increased. Specifically, since the content of titanium dioxide is different in cosmetic compositions having different coverage levels, when the cosmetic compositions having different coverage levels are mixed, a problem that the coverage level or color is not manufactured as designed may occur. Therefore, there is an advantage that cosmetics of a color desired by the user may be manufactured by determining the discharge information so that the target cartridge is selected within the group having the same coverage level.

Meanwhile, when the target color is the same, a mixing ratio of colors and cosmetic materials represented by the cartridges selected in each group may be the same.

For example, when the target color is the same, it is possible to select the target cartridge so that when the coverage level is the high coverage level, the cosmetic material is discharged with A cartridge:B cartridge:C cartridge:D cartridge:E cartridge=X1:X2:X3:X4:X5, when the coverage level is the medium coverage level, the cosmetic material is discharged with F Cartridge:G Cartridge:H Cartridge:I Cartridge:J Cartridge=X1:X2:X3:X4:X5, and when the coverage level is the low coverage level, the cosmetic material is discharged with K Cartridge:L Cartridge:M Cartridge:N Cartridge:O Cartridges=X1:X2:X3:X4:X5.

According to an embodiment, the controller 150 may select a cartridge group according to the coverage level, and then select the mixing ratio of the cosmetic material to be discharged by the cartridges in the group. That is, the controller 150 may select a mixing ratio corresponding to the target color determined from a predetermined table.

FIG. 50 is a first exemplary view of a table illustrating a mixing ratio according to a target color according to the present disclosure.

The cosmetic manufacturing device 100 may store a table in which a mixing ratio of cosmetic materials corresponding to each target color is mapped. Referring to an example shown in FIG. 50, each cell constituting the table refers to the target color, and the mixing ratio is mapped to each cell.

As shown in FIG. 50, the controller 150 may determine the target cartridge and the discharge amount from each of the target cartridges by selecting the mixing ratio corresponding to the target color determined from the predetermined table.

FIG. 51 is a second exemplary view of a table illustrating a mixing ratio according to a target color according to the present disclosure.

In particular, FIG. 51 may be a table in which a target color according to a possible mixing ratio is mapped when it is assumed that a minimum of 0 g and a maximum of 20 g may be discharged in units of 5 g from each of the plurality of cartridges according to the present disclosure, and a total of 20 g may be discharged.

In this case, similarly, the controller 150 may determine the target cartridge and the discharge amount from each of the target cartridges by selecting a mixing ratio corresponding to the target color determined from a predetermined table as shown in FIG. 51.

In addition, in this case, the target color may be the same, but the mixing ratio may be plural. When there are a plurality of mixing ratios corresponding to the target color determined in the predetermined table, the controller 150 may select any one of the plurality of mixing ratios based on the remaining amount of each of the selected target cartridges. For example, when the controller 150 intends to manufacture the cosmetics with colors corresponding to brightness 4 and color 4, any one of six mixing ratios may be selected based on the remaining amount of the cartridge. For example, the controller 150 may select any one of the plurality of mixing ratios through a method in which when the remaining amount of the cartridge is smaller than the discharge amount according to the mixing ratio, the corresponding mixing ratio is excluded, and when a remaining amount of a specific cartridge is more than the reference amount, the mixing ratio in which the cosmetic material is discharged the most from the cartridge is selected, or the like. Specifically, the controller 150 may compare the discharge amount and the remaining amount of each cartridge according to the mixing ratio for each of the plurality of mixing ratios, exclude a mixing ratio of a cartridge with the remaining amount smaller than the discharge amount, and select one of the remaining mixing ratios. Alternatively, the controller 150 may calculate the remaining amount of each cartridge according to the mixing ratio for each of the plurality of mixing ratios and select a mixing ratio of a cartridge calculated as the most remaining amount.

As described above, after determining the color cartridge for discharging the cosmetic material, the controller 150 may set at least one of the plurality of cartridges for determining the texture according to the determined texture as the target cartridge for discharging the cosmetic material.

For example, the number of cartridges that determine the texture may be five, but this is merely an example.

As in the above example, when the cartridge group is divided into three according to the coverage level, and a total of 20 g of the cosmetic material is discharged in units of 5 g from the plurality of cartridges that determine a color in which each cartridge group is provided with five cartridges representing different colors. it is possible to combine a total of 70 colors, and when a total of 15 g of the cosmetic material is discharged in 5 g units from the cartridge that determines the five textures, it is possible to combine a total of 35 textures, and accordingly, it is possible to combine a total of 7,350 combination. As described above, since a very variety of combinations are possible with 20 cartridges, the possibility of providing cosmetics desired by the user while minimizing the number of cartridges is increased, and thus user satisfaction may be improved. Meanwhile, since the above-described number of cartridges and a discharge unit are merely an example, and thus the present disclosure is not limited thereto.

The controller 150 may discharge the cosmetic material according to the determined discharge information. The discharged cosmetic materials may be mixed, and the user may use the mixed cosmetics.

Meanwhile, in some cases, the cosmetics manufactured in the cosmetic manufacturing device 1 may not fit to the user. In this case, waste such as already manufactured cosmetics must be discarded may occur.

In order to minimize this problem, the cosmetic manufacturing device 1 may first discharge the sample cosmetics when the discharge information is determined.

Figure 52:
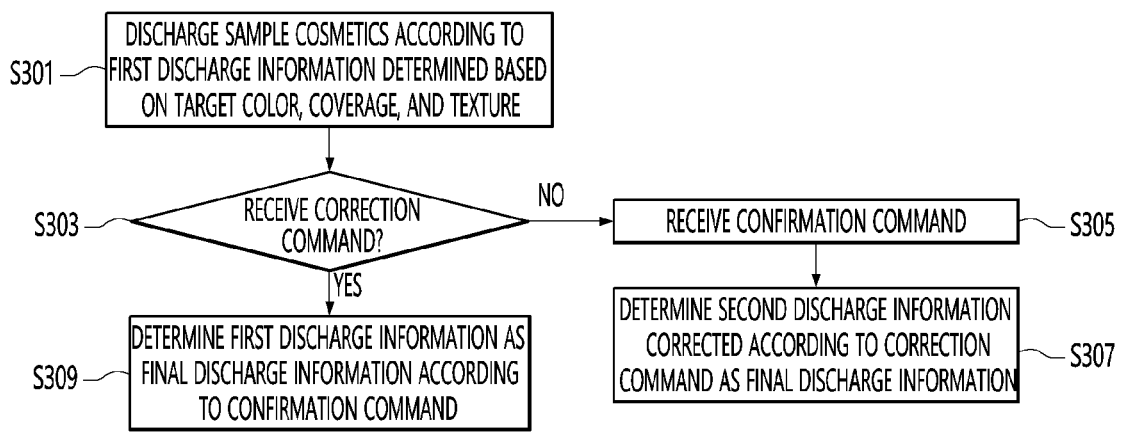
FIG. 52 is a flowchart illustrating a method of correcting and finally determining discharge information by the cosmetic manufacturing device according to the present disclosure.

Next, FIG. 52 is a flowchart illustrating a method of correcting and finally determining discharge information by the cosmetic manufacturing device according to the present disclosure.

The controller 150 may discharge the sample cosmetics according to first discharge information determined based on the target color, the coverage level, and the texture (S301).

Here, the sample cosmetics may refer to a cosmetic material in which the mixing ratio is the same as the mixing ratio according to the determined discharge information, but the total discharge amount is a sample weight. For example, the sample weight may be about 4 to 7 g, but this is merely an example, and thus the present disclosure is not limited thereto.

The user may try the sample cosmetics in advance. The user may confirm whether the desired color is correct by comparing the sample cosmetics with the color board. The user may determine which cosmetics will be finally manufactured after using the sample cosmetics. As a result of using the sample cosmetics, when there is a point that the user wants to change, the user may request correction to the cosmetic manufacturing device 1.

The controller 150 may determine whether a correction command is received (S303).

When the correction command is not received, the controller 150 may receive a confirmation command (S305) and determine the first discharge information as final discharge information according to the confirmation command (S307).

The receiving of the confirmation command (S305) may be omitted. That is, when the correction command is not received, the controller 150 may recognize that the confirmation command is received.

In addition, the order of steps S303 and S305 may be changed. In this case, similarly, when the confirmation command is received, the controller 150 may perform step S307, and when the confirmation command is not received, the controller 150 may perform step S309 after determining whether the correction command is received.

Meanwhile, when the correction command is received, the controller 150 may determine the second discharge information corrected according to the correction command as the final discharge information (S309).

In this case, the controller 150 may discharge the cosmetic composition according to the finally determined discharge information.

The present disclosure described above may be implemented as computer-readable codes in a medium on which a program is recorded. The computer-readable medium includes all kinds of recording devices in which computer-readable data is stored. Examples of the computer-readable medium include a hard disk drive (HDD), a solid state disk (SSD), a silicon disk drive (SDD), a ROM, a RAM, a CD-ROM, a magnetic tape, a floppy disk, and an optical data storage, etc. In addition, the computer may include a control unit of a diagnosis device, a control unit of a skin management server, or a control unit of a manufacturing apparatus. Therefore, the above detailed description should not be construed in a limiting sense in all respects, and should be considered as examples. The scope of the present invention should be determined by rational interpretation of the appended claims, and encompasses all alterations falling within the equivalent scope of the appended claims.

The above description is merely illustrative of the technical spirit of the present invention, and various modifications and variations will be possible without departing from the essential characteristics of the present invention by those skilled in the art to which the present invention pertains.

Therefore, the embodiments disclosed in the present invention are not intended to limit the technical spirit of the present invention, but to explain, and the scope of the technical spirit of the present invention is not limited by these embodiments.

The protection scope of the present invention should be construed by the following claims, and all technical ideas within the equivalent range should be construed as being included in the scope of the present invention.

The invention claimed is:

1. A method for determining discharge information of a cosmetic manufacturing device having a plurality of cartridges, at least one discharge module for discharging a cosmetic composition accommodated in any one of the plurality of cartridges and a controller for controlling the discharge module, the method comprising:
   determining, by the controller of the cosmetic manufacturing device, a target color, a coverage level, and a texture; and
   determining, by the controller, the discharge information based on the target color, the coverage level, and the texture, wherein the determining of the discharge information, even when the target color is the same, includes determining a target cartridge of the cosmetic manufacturing device so that a cartridge for discharging a cosmetic material is different according to the coverage level, wherein the plurality of cartridges of the cosmetic manufacturing device include a plurality of cartridges for determining a color and a plurality of cartridges for determining the texture, wherein the plurality of cartridges for determining the color include cartridges of a first group for a first coverage level and cartridges of a second group for a second coverage level, and wherein the determining of the target cartridge includes:
   selecting one of the first group and the second group according to the determined coverage level;
   selecting at least one of the cartridges in the group selected according to the determined target color as the target cartridge for discharging the cosmetic material;
   selecting at least one of the plurality of cartridges that determine the texture according to the determined texture as the target cartridge for discharging the cosmetic material; and
   controlling, by the controller, the at least one discharge module to discharge the cosmetic composition accommodated in the determined target cartridge based on the determined discharge information.

2. The method of claim 1, wherein the determining of the target cartridge includes determining the target cartridge within cartridges of the first group when the coverage level is the first coverage level, and determining the target cartridge within cartridges of the second group when the coverage level is the second coverage level.

3. The method of claim 2, wherein a titanium dioxide content of the cosmetic material representing a first color among the cartridges of the first group is different from a titanium dioxide content of the cosmetic material representing the first color among the cartridges of the second group.

4. The method of claim 1, further comprising generating a barcode including the discharge information.

5. The method of claim 1, further comprising receiving an input of a barcode, wherein the determining of the discharge information includes determining the discharge information according to the input of the barcode.

6. The method of claim 1, further comprising discharging the cosmetic material according to the determined discharge information.

7. The method of claim 1, wherein the determining of the discharge information further includes discharging sample cosmetics so that a total discharge amount becomes a sample weight with a mixing ratio according to the determined discharge information; and receiving a correction command or a confirmation command of the discharge information after discharging the sample cosmetics, wherein the discharge information is determined according to the correction command or the confirmation command.

8. The method of claim 1, wherein the determining of the discharge information further includes selecting a mixing ratio corresponding to the target color determined from a predetermined table.

9. The method of claim 8, wherein the selecting of the mixing ratio includes, when there are a plurality of mixing ratios corresponding to the determined target color in the predetermined table, selecting any one of the plurality of mixing ratios based on a remaining amount of each selected target cartridge.

10. The method of claim 9, wherein the selecting of any one of the plurality of mixing ratios includes comparing a discharge amount and the remaining amount of each cartridge according to the mixing ratio for each of the plurality of mixing ratios, and excluding a mixing ratio of a cartridge with the remaining amount smaller than the discharge amount.

11. The method of claim 9, wherein the selecting of any one of the plurality of mixing ratios includes calculating the remaining amount of each cartridge according to the mixing ratio for each of the plurality of mixing ratios, and selecting a mixing ratio of a cartridge calculated as a most remaining amount.

12. A cosmetic manufacturing device comprising:

a plurality of cartridges;

at least one discharge module for discharging a cosmetic composition accommodated in any one of the plurality of cartridges; and a controller for controlling the at least one discharge module, wherein the controller is configured to determine a target color, a coverage level, and a texture and determining discharge information based on the target color, the coverage level, and the texture, wherein the controller, even when the target color is the same, determines a target cartridge so that a cartridge for discharging the cosmetic material is different according to the coverage level, wherein the plurality of cartridges include a plurality of cartridges for determining a color and a plurality of cartridges for determining the texture, wherein the plurality of cartridges for determining the color include cartridges of a first group for a first coverage level and cartridges of a second group for a second coverage level, and wherein the controller selects any one of the first group and the second group according to the determined coverage level, selects at least one of the cartridges in the selected group according to the determined target color as the target cartridge for discharging the cosmetic material, and selects at least one of the plurality of cartridges that determine the texture according to the determined texture as the target cartridge for discharging the cosmetic material; and wherein the controller controls the at least one discharge module to discharge the cosmetic composition accommodated in the determined target cartridge based on the determined discharge information.

13. The cosmetic manufacturing device of claim 12, wherein the controller determines the target cartridge within cartridges of the first group when the coverage level is the first coverage level and determines the target cartridge within cartridges of the second group when the coverage level is the second coverage level.

14. The cosmetic manufacturing device of claim 13, wherein a titanium dioxide content of the cosmetic material representing a first color among the cartridges of the first group is different from a titanium dioxide content of the cosmetic material representing the first color among the cartridges of the second group.

15. The cosmetic manufacturing device of claim 12, wherein the controller generates a barcode including the discharge information.

16. The cosmetic manufacturing device of claim 12, wherein the controller discharges sample cosmetics so that a total discharge amount is a first weight with a mixing ratio according to the determined discharge information, receives a correction command or a confirmation command of the discharge information after discharging the sample cosmetics, and determines the discharge information according to the correction command or the confirmation command.

17. The cosmetic manufacturing device of claim 12, wherein the controller selects a mixing ratio corresponding to the target color determined from a predetermined table.

18. The cosmetic manufacturing device of claim 12, wherein when there are a plurality of mixing ratios corresponding to the determined target color in a predetermined table, the controller selects any one of a plurality of mixing ratios based on a remaining amount of each selected target cartridge.

19. The cosmetic manufacturing device of claim 12, further comprising:

a sensor configured to sense a remaining amount information in each of the plurality of cartridges; and a driver configured to move the plurality of cartridges, wherein the controller is configured to receive the remaining amount information from the sensor and control the driver based on the received remaining amount information.

20. The cosmetic manufacturing device of claim 19, wherein the driver includes:

a first discharger configured to discharge a cartridge located at a first position, and a second discharger configured to discharge a cartridge located at a second position different from the first position, and wherein the first and second dischargers are configured to discharge a cartridge of the plurality of cartridges based on the discharge information.

* * * * *